(12) United States Patent
Onizuka et al.

(10) Patent No.: US 11,303,755 B2
(45) Date of Patent: *Apr. 12, 2022

(54) CONFERENCE SYSTEM

(71) Applicant: Audio-Technica Corporation, Tokyo (JP)

(72) Inventors: Kazuhiro Onizuka, Tokyo (JP); Toru Aikawa, Chiba (JP)

(73) Assignee: AUDIO-TECHNICA CORPORATION, Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 16/845,143

(22) Filed: Apr. 10, 2020

(65) Prior Publication Data

US 2020/0396338 A1  Dec. 17, 2020

Related U.S. Application Data

(63) Continuation of application No. 15/738,814, filed as application No. PCT/JP2016/083441 on Nov. 10, 2016, now Pat. No. 10,666,809.

(30) Foreign Application Priority Data

Feb. 29, 2016 (JP) ................................ 2016-038400

(51) Int. Cl.
*H04M 3/56* (2006.01)
*H04L 12/18* (2006.01)
(Continued)

(52) U.S. Cl.
CPC ........ *H04M 3/561* (2013.01); *H04L 12/1813* (2013.01); *H04L 12/1827* (2013.01);
(Continued)

(58) Field of Classification Search
CPC .... H04L 69/22; H04L 12/1813; H04L 65/403
See application file for complete search history.

(56) References Cited

U.S. PATENT DOCUMENTS 5,930,237 A * 7/1999 Horiuchi ............ H04Q 11/0478
                                                          370/260
8,948,059 B2    2/2015 Rodman et al.
(Continued)

FOREIGN PATENT DOCUMENTS

| CN | 1777217 A | 5/2006 |
| CN | 1934861 A | 3/2007 |

(Continued)

OTHER PUBLICATIONS

ATUC-50, "Full-Featured Digital Conference System" Audio-Technica.

*Primary Examiner* — Barbara B Anyan
(74) *Attorney, Agent, or Firm* — WC&F IP

(57) ABSTRACT

A conference system, capable of reliably managing a connection state of a discussion unit and a control unit and continuously acquiring information from the discussion unit when a connection abnormality occurs, is provided.

A conference system S includes a control unit 1 and a discussion unit 2, a running packet is repeatedly transmitted and received between both units, the running packet includes a counter flag, the control unit includes a CU communication portion 11, a CU storage portion 13, and a CU control portion 16, the discussion unit includes a DU control portion 26, the DU control portion increments the count value of the counter flag, and each time the running packet is received from the discussion unit, the CU control portion compares a count value stored in the CU storage portion and the count value of the counter flag included in the running packet received from the discussion unit.

9 Claims, 49 Drawing Sheets

(51) Int. Cl.
*H04L 12/42* (2006.01)
*H04L 12/437* (2006.01)
*H04L 69/22* (2022.01)
*H04L 65/403* (2022.01)

(52) U.S. Cl.
CPC .......... *H04L 12/1863* (2013.01); *H04L 12/42* (2013.01); *H04L 12/437* (2013.01); *H04L 12/1822* (2013.01); *H04L 12/1881* (2013.01); *H04L 65/403* (2013.01); *H04L 69/22* (2013.01)

(56) References Cited

U.S. PATENT DOCUMENTS

| | | | |
|---|---|---|---|
| 9,755,983 B1* | 9/2017 | Swartzentruber | H04L 47/39 |
| 2003/0128007 A1* | 7/2003 | Fujisaki | H02P 31/00 |
| | | | 318/560 |
| 2004/0193683 A1* | 9/2004 | Blumofe | H04L 12/1831 |
| | | | 709/204 |
| 2006/0029087 A1* | 2/2006 | Ooi | H04L 12/6418 |
| | | | 370/402 |
| 2010/0164072 A1 | 7/2010 | Kumada et al. | |
| 2010/0165072 A1 | 7/2010 | Oike | |
| 2011/0004901 A1* | 1/2011 | Schultz | H04H 20/62 |
| | | | 725/39 |
| 2011/0238792 A1* | 9/2011 | Phillips | G06F 9/44505 |
| | | | 709/220 |
| 2014/0201795 A1* | 7/2014 | Huber | H04N 21/4349 |
| | | | 725/110 |
| 2015/0124631 A1* | 5/2015 | Edsall | H04W 28/0231 |
| | | | 370/252 |
| 2017/0094225 A1* | 3/2017 | Morita | H04L 65/403 |
| 2019/0020923 A1* | 1/2019 | Joye | H04N 21/47217 |

FOREIGN PATENT DOCUMENTS

| | | |
|---|---|---|
| CN | 102006176 A | 4/2011 |
| CN | 202035054 U | 11/2011 |
| CN | 103109529 A | 5/2013 |
| CN | 103516456 A | 1/2014 |
| CN | 103534977 A | 1/2014 |
| JP | 2007-259406 A | 10/2007 |

* cited by examiner

| Absolute ID | Unit setting information |
|---|---|
| A | X 1 |
| B | X 2 |
| C | X 3 |
| . . . | . . . |

FIG. 4

| Terminal No. | Connection mode | Number of units | ID (relative/absolute) | | | | |
|---|---|---|---|---|---|---|---|
| 1 | Ring | 4 | 1 | 2 | 3 | 4 | |
| | | | A | B | C | D | |
| 2 | Ring | 4 | | | | | |
| | | | | | | | |
| 3 | Daisy | 5 | 1 | 2 | 3 | 4 | 5 |
| | | | E | F | G | H | I |
| 4 | Unconnected | 0 | | | | | |
| | | | | | | | |

FIG. 5

| Terminal No. | Connection mode | Number of units | ID (relative/absolute) | | | | |
|---|---|---|---|---|---|---|---|
| 1 | Ring | 4 | 1 | 2 | 3 | 4 | |
| 2 | Ring | 4 | | | | | |
| 3 | Unconnected | 0 | | | | | |
| 4 | Unconnected | 0 | | | | | |

FIG. 16

| Terminal No. | Connection mode | Number of units | ID (relative/absolute) | | | | |
|---|---|---|---|---|---|---|---|
| 1 | Ring | 4 | 1 | 2 | 3 | 4 | |
| | | | A | B | C | D | |
| 2 | Ring | 4 | | | | | |
| | | | | | | | |
| 3 | Unconnected | 0 | | | | | |
| | | | | | | | |
| 4 | Unconnected | 0 | | | | | |
| | | | | | | | |

FIG. 19

| Terminal No. | Connection mode | Number of units | ID (relative/absolute) | | | | |
|---|---|---|---|---|---|---|---|
| 1 | Daisy | 2 | 1 | 2 | | | |
| | | | A | B | | | |
| 2 | Daisy | 1 | 3 | | | | |
| | | | D | | | | |
| 3 | Unconnected | 0 | | | | | |
| | | | | | | | |
| 4 | Unconnected | 0 | | | | | |
| | | | | | | | |

FIG. 27

| Absolute ID of CU | Terminal No. | Connection mode | Number of units | ID (relative/absolute) | | | | |
|---|---|---|---|---|---|---|---|---|
| 1 | 1 | Ring | 4 | 1 | 2 | 3 | 4 | |
| | | | | A | B | C | D | |
| | 2 | Ring | 4 | | | | | |
| | | | | | | | | |
| | 3 | Daisy (CU) | 1 | 1 | | | | |
| | | | | β | | | | |
| | 4 | Unconnected | 0 | | | | | |
| | | | | | | | | |
| 2 | 1 | Ring | 4 | 5 | 6 | 7 | 8 | |
| | | | | E | F | G | H | |
| | 2 | Ring | 4 | | | | | |
| | | | | | | | | |
| | 3 | Daisy (CU) | 1 | | | | | |
| | | | | | | | | |
| | 4 | Unconnected | 0 | | | | | |
| | | | | | | | | |

FIG. 36

| Setting item | Conference modes | | |
|---|---|---|---|
| | Free conversation mode | Request talk mode | Full remote mode |
| Override | Off<br>On/FIFO<br>On/LIFO | On/FIFO<br>On/LIFO | On/FIFO<br>On/LIFO |
| Mic on trigger (priority set) | Manual trigger<br>Automatic trigger | Manual trigger<br>Automatic trigger | Manual trigger<br>Automatic trigger |
| Mic on trigger (priority not set) | Manual trigger<br>Automatic trigger | Manual trigger | — |

FIG. 40

Preparation Screen

| DU Settings | | | |
|---|---|---|---|
| Relative ID | Light emitting color | Priority | . . . |
| 1 | Red | On | . . . |
| 2 | Red | On | . . . |
| 3 | Red | On | . . . |
| . . . | . . . | . . . | . . . |
| 10 | Blue | Off | . . . |
| 11 | Blue | Off | . . . |
| . . . | . . . | . . . | . . . |

Register

FIG. 48

Progress Screen

| Speech Request List | ・・・ | ・・・ |
|---|---|---|
| DU with speech request | Permission/rejection of speech |
| 2 | Permit |
| 3 | Permit |
| ・・・ | ・・・ |
| 1 0 | Reject |
| 1 2 | Permit/Reject |
| ・・・ | ・・・ |
| ・・・ | ・・・ |

Register

FIG. 49

CONFERENCE SYSTEM

TECHNICAL FIELD

The present invention relates to a conference system.

BACKGROUND ART

A conference system is used, for example, in an assembly or other conference, etc., attended by a large number of participants. The conference system is configured, for example, of a single control unit, a plurality of discussion units, connected via a communication line (wired or wireless) to the control unit, and microphones mounted on the discussion units.

The control unit controls operations of each discussion unit and controls operations of the entire conference system. The discussion unit collects the voice of a user of the discussion unit (referred to hereinafter as "user") by means of a microphone to generate audio information and transmits the audio information to the control unit. The discussion unit is assigned to each participant.

Modes of connecting the control unit and the discussion units include a ring connection mode (referred to hereinafter as "ring connection") and a daisy chain connection mode (referred to hereinafter as "daisy connection") (see, for example, Non-Patent Document 1).

A ring connection is a connection mode where the discussion units are connected to the control unit in a ring. A daisy connection is a connection mode where the discussion units are connected sequentially in a chain to the control unit.

CITATION LIST

Non-Patent Document

Non-Patent Document 1: "Installation and User Manual," p. 89, televic conference, [online], [search Feb. 9, 2016], Internet <http://www.manualslib.com/manual/642651/Televic-Confidea.html#manual>

SUMMARY OF INVENTION

Technical Problem

With a conventional conference system, there are cases where a discussion unit or the communication line malfunctions or becomes disconnected (such a case will be referred to hereinafter as "connection abnormality") during the progress of a conference. When such a connection abnormality occurs, the number of discussion units or the connection mode of the discussion units, as recognized by the control unit, changes. The conventional conference system does not include a function that reliably specifies the occurrence of a connection abnormality, the location of occurrence of the connection abnormality, etc. The conventional conference system thus cannot continuously manage information, such as user information, audio information, setting information, etc., of each discussion unit before and after the occurrence of a connection abnormality.

An object of the present invention is to solve the problem described above and to provide a conference system capable of reliably managing a connection state of a discussion unit and a control unit and continuously acquiring information from the discussion unit when a connection abnormality occurs.

Solution to Problem

The conference system according to the present invention includes a control unit and a discussion unit, the discussion unit is connected via a communication line to the control unit, the control unit repeatedly transmits and receives a running packet to and from the discussion unit, the running packet includes a counter flag, the control unit includes a CU communication portion, a CU storage portion, and a CU control portion, the discussion unit includes a DU control portion and a DU communication portion, the CU control portion resets a count value of the counter flag included in the running packet transmitted to the discussion unit, the CU communication portion transmits the running packet to the discussion unit, the DU control portion increments the count value of the counter flag, the DU communication portion transmits the running packet, which includes the counter flag with the incremented count value, to the control unit, the CU storage portion stores the count value of the counter flag included in the running packet received by the control unit from the discussion unit, and each time the control unit receives the running packet from the discussion unit, the CU control portion compares the count value stored in the CU storage portion and the count value of the counter flag included in the running packet received by the control unit from the discussion unit.

Advantageous Effects of Invention

According to the present invention, a conference system, capable of reliably managing a connection state of a discussion unit and a control unit and continuously acquiring information from the discussion unit when a connection abnormality occurs, can be provided.

BRIEF DESCRIPTION OF DRAWINGS

FIG. 4 is a schematic diagram of an example of information stored in a storage portion of the control unit of FIG. 2.

FIG. 5 is a schematic diagram of other information stored in the storage portion of the control unit of FIG. 2.

FIG. 16 is a schematic diagram of an example of information stored in a storage portion of the control unit after the initialization processing of FIG. 12.

FIG. 19 is a schematic diagram of an example of information stored in the storage portion of the control unit after the DU information acquisition processing of FIG. 17.

FIG. 27 is a schematic diagram of an example of information stored in the storage portion of the control unit after the change processing of FIG. 25.

FIG. 36 is a schematic diagram of an example of information stored in the storage portion of a control unit after the secondary DU information acquisition processing of FIG. 35.

FIG. 40 is a schematic diagram of an example of conference modes included in the conference system of FIG. 1.

FIG. 48 is a schematic diagram of the preparation screen after input of information in the preparation screen of FIG. 47.

FIG. 49 is a schematic diagram of a progress screen, which is yet another example of an input screen of FIG. 45.

DESCRIPTION OF EMBODIMENTS

Conference System (1)

Embodiments of a conference system according to the present invention will now be described with reference to the attached drawings.

Configuration of the Conference System

Figure 1:
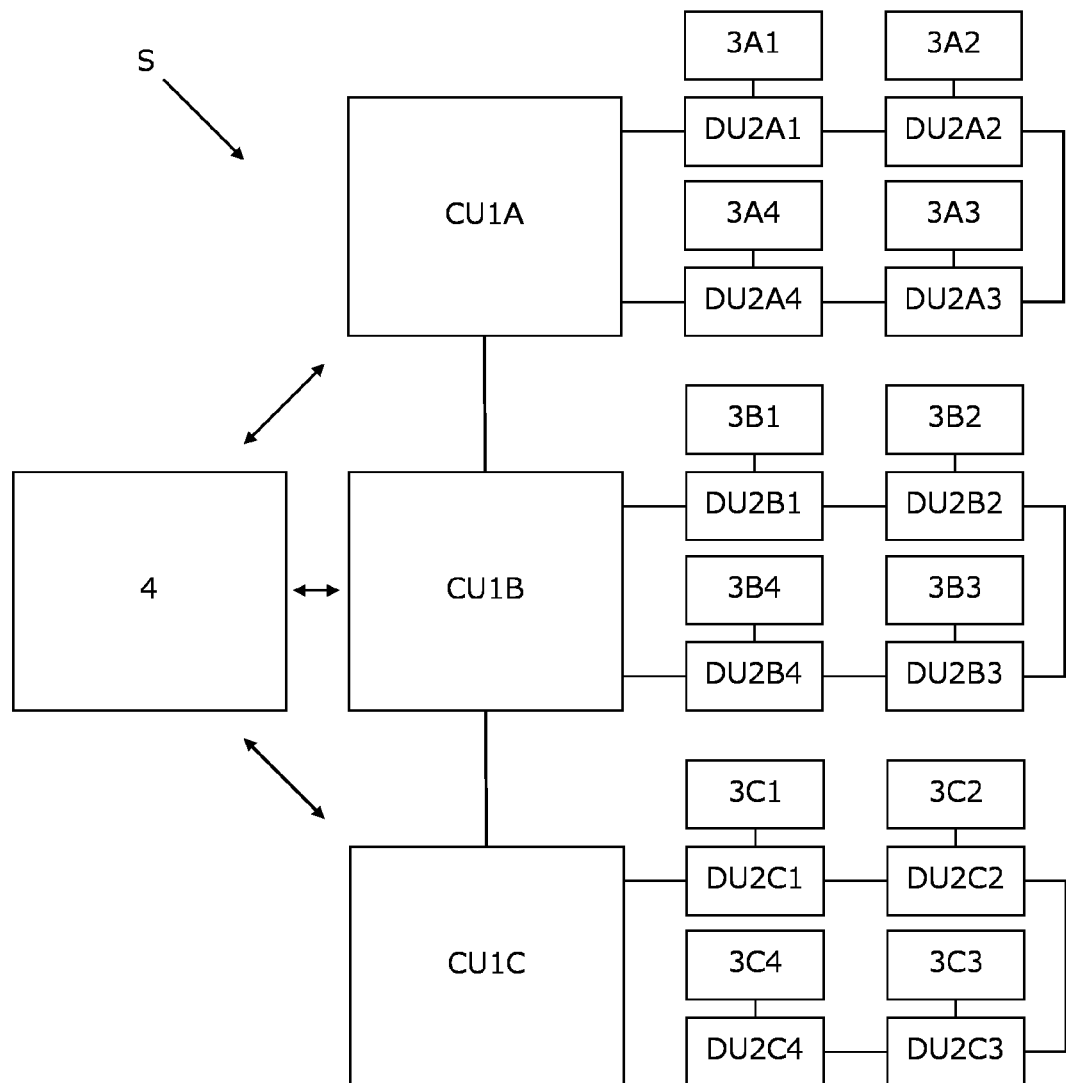
FIG. 1 is a network configuration diagram of an embodiment of a conference system according to the present invention.

FIG. 1 is a network configuration diagram of an embodiment of a conference system according to the present invention.

The conference system S is used, for example, in an assembly or other conference, etc., attended by a large number of participants. The conference system S facilitates smooth progress of the conference and performs preparation of conference minutes, etc. The conference system S includes control units (referred to hereinafter as "CUs") 1A to 1C, discussion units (referred to hereinafter as "DUs")

2A1 to 2A4, 2B1 to 2B4, and 2C1 to 2C4, microphones 3A1 to 3A4, 3B1 to 3B4, and 3C1 to 3C4, and an operating station 4.

The CUs 1A to 1C are all the same in configuration. The DUs 2A1 to 2A4, 2B1 to 2B4, and 2C1 to 2C4 are all the same in configuration. The microphones 3A1 to 3A4, 3B1 to 3B4, and 3C1 to 3C4 are all the same in configuration.

In the description that follows, when there is no need to distinguish among each of the CUs 1A to 1C, each will be referred to generically as "CU 1." When there is no need to distinguish among each of the DUs 2A1 to 2A4, 2B1 to 2B4, and 2C1 to 2C4, each will be referred to generically as "DU 2." When there is no need to distinguish among each of the microphones 3A1 to 3A4, 3B1 to 3B4, and 3C1 to 3C4, each will be referred to generically as "microphone 3."

The number of CUs 1 and the number of DUs 2 that configure the conference system S are not restricted to those of the present embodiment. That is, for example, the number of DUs 2 connected to each CUs 1 may differ.

Mode of Connection of the DUs to the CUs

Next, the mode of connection of a plurality of DUs 2 to a CU 1 will be described.

A plurality of DUs 2 are connected to a CU 1 by a connection mode that is either a ring connection mode (referred to hereinafter as "ring connection") or a daisy chain connection mode (referred to hereinafter as "daisy connection").

A ring connection is a connection mode where a plurality of DUs 2 are connected to a CU 1 in a ring. For example, the DUs 2A1 to 2A4 are connected by a ring connection to the CU 1A. When DUs 2 are connected to a CU 1 by a ring connection, two terminals of a unit connection portion of the CU 1, to be described below, are used.

A daisy connection is a connection mode where a plurality of DUs 2 are connected sequentially in a chain to a CU 1. For example, the DUs 2C1 to 2C4 are connected by a daisy connection to the CU 1C. When DUs 2 are connected to a CU 1 by a daisy connection, one terminal of the unit connection portion of the CU 1, to be described below, is used.

The form of connection of the CUs 1 and the DUs 2 is not restricted to that of the present embodiment. That is, for example, a plurality of DUs 2 may be connected to a single CU 1 with the two connection modes of ring connection and daisy connection being mixed. That is, some DUs 2 may be ring-connected to the CU 1 and other DUs 2 may be daisy-connected to the same CU 1.

Connection of the CUs to the CUs

Next, the connection of the CUs 1 to each other will be described.

The three CUs 1 are connected by a daisy connection. For example, the CU 1B and the CU 1C are connected by a daisy connection to the CU 1A. In this case, the CU 1A is set to be a primary unit and each of CU 1B and CU 1C is set to be secondary units. The primary and secondary units will be described below.

Power is supplied to each CU 1 individually via an AC adapter, etc. That is, the supplying of power among the CUs 1 is not performed. Therefore, in the conference system S, the respective CUs 1 are installable, without restriction of power supply, at locations that are mutually separated physically.

Configuration of the CU

Figure 2:
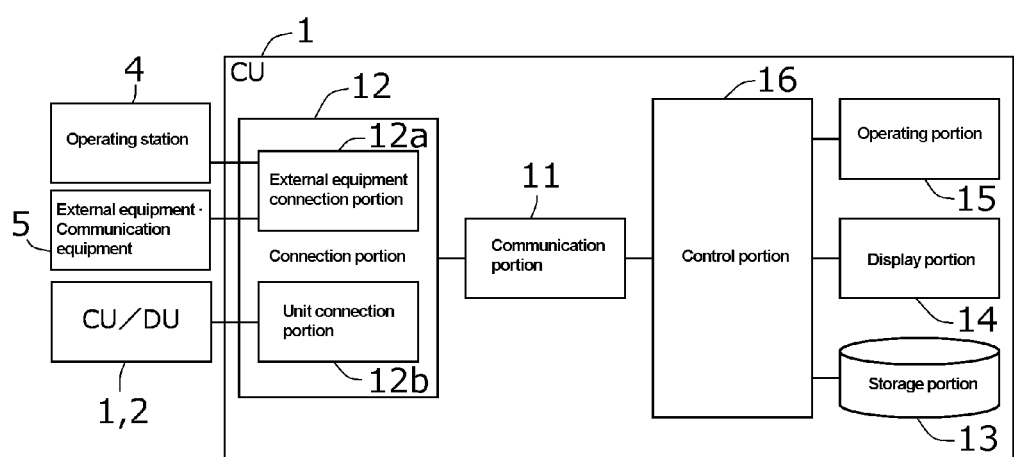
FIG. 2 is a functional block diagram of a hardware configuration of a control unit included in the conference system of FIG. 1.

FIG. 2 is a functional block diagram of a hardware configuration of a CU 1.

The CU 1 controls operations of the DUs 2 and controls operations of the entire conference system S. The CU 1 includes a communication portion 11, a connection portion 12, a storage portion 13, a display portion 14, an operating portion 15, and a control portion 16.

The communication portion 11 realizes communication with the other CUs 1, the DUs 2, the operating station 4, an external equipment 5, etc., via the connection portion 12. The communication portion 11 performs communication, for example, in compliance with IEEE (Institute of Electrical and Electronics Engineers) 802.3.

Communication between the CU 1 and a DU 2 or between the CU 1 that is the primary unit and a CU 1 that is a secondary unit, etc., is executed by transmission and reception of a packet. The packet includes a header portion and a data portion.

Figure 3:
FIG. 3 is a data structure diagram of a packet transmitted and received by the control unit of FIG. 2.

FIG. 3 is a data structure diagram of the packet.

The header portion includes an address used for communication and a counter flag to be described below. The data portion includes regions storing a control command, audio information, unit information, etc., to be described below, and a request flag to be described below. The control command is a command by which the CU 1 instructs a DU 2 or a command by which the CU 1 that is the primary unit instructs a CU 1 that is a secondary unit, etc. The data portion does not include the control command when there is no instruction from the CU 1 to a DU 2 or when there is no instruction from the CU 1 that is the primary unit to a CU 1 that is a secondary unit. The audio information is information generated by the DUs 2 based on audio signals from the microphones 3. The audio information is stored in the data portion of the packet transmitted from the DUs 2 to the CU 1.

The data portion includes a plurality of regions (referred to hereinafter as "audio regions") in which the audio information is stored. The audio regions are frames that define the number of DUs 2, among the plurality of DUs 2 included in the conference system S, enabling speech at the same time. The number of audio regions included in the data portion is the same as a set maximum number of speakers to be described below. The CU 1 assigns a unique number (for example, 1, 2, 3, . . . ) to each audio region. Details of the audio regions will be described below.

FIG. 2 is referred to again.

The connection portion 12 is an interface connecting to the other CUs 1, the DUs 2, the operating station 4, the external equipment 5, etc. The connection portion 12 includes an external equipment connection portion 12a and a unit connection portion 12b.

The external equipment connection portion 12a is an interface connecting to, for example, the operating station 4, the external equipment 5, a communication equipment, etc. The external equipment connection portion 12a is, for example, a USB (Universal Serial Bus) terminal, a network terminal, or an analog input/output terminal, etc. The external equipment 5 is, for example, a USB memory, a microphone, a loudspeaker, or a translation system, etc. The communication equipment is a hub, a router, or a wireless LAN (Local Area Network) access point, etc.

The unit connection portion 12b is an interface connecting to the other CUs 1 and the DUs 2. The unit connection portion 12b includes, for example, a first terminal, a second terminal, a third terminal, and a fourth terminal. The first terminal and the second terminal are, for example, connection terminals connectable only to DUs 2. The third terminal and the fourth terminal are, for example, connection terminals connectable to either other CUs 1 or DUs 2.

The configuration of the terminals of the unit connection portion 12b is not restricted to that of the present embodiment. That is, for example, the number of terminals may be "6."

The storage portion 13 stores information required by the CU 1 and the DUs 2 to realize information processing to be described below. The storage portion 13 is configured of a RAM (Random Access Memory), temporarily storing various information and programs, etc., a ROM (Read Only Memory), or a hard disk, etc.

The information stored in the storage portion 13 includes, for example, control information, for controlling operations of the CU 1 and the DUs 2 and other operations of the conference system S, etc. The control information includes, for example, unit setting information, unit connection information, information related to system setting of the conference system S to be described below, a speech request list, etc.

The unit setting information is information related, for example, to settings of DUs 2 connected to the CU 1 in the past. The unit setting information includes, for example, parameter information and mode information. The unit setting information is stored in a unit setting information database (referred to hereinafter as "unit setting information DB").

FIG. 4 is a schematic diagram of an example of information stored in the unit setting information DB.

The unit setting information DB is a database in which, for example, an absolute ID, configured from a serial number of a DU 2, and the unit setting information of the DU 2 are stored in association. The unit setting information of the DU 2 is stored in the unit setting information DB via the CU 1, for example, by a system administrator. During this time, the unit setting information of the DU 2 is stored in the unit setting information DB upon being associated with the absolute ID of the DU 2.

FIG. 4 shows, for example, that the absolute ID "A" and the unit setting information "X1" are stored in association in the unit setting information DB.

The parameter information includes, for example, setting information (for example, an equalizer setting, a volume setting, etc.) of the microphone 3 mounted on the DU 2, information related to a light emitting state of a light emitting portion 28 to be described below, and priority setting information to be described below.

The mode information is information related to an operation state of each DU 2. The information related to the operation state includes, for example, a conference mode to be described below, a mic on trigger to be described below, etc.

The unit connection information is information related to connection of the DUs 2 that are connected to the CU 1. The unit connection information is information related to the connection mode and the number of connected units of DUs 2 connected to the CU 1. The unit connection information is stored in a unit connection information database (referred to hereinafter as "unit connection information DB").

FIG. 5 is a schematic diagram of information stored in the unit connection information DB.

The unit connection information DB is a database in which information related to the connection of the DUs 2 that are connected to the CU 1 is stored. The unit connection information DB is prepared each time the CU 1 is started. "Terminal No." is the number of a terminal of the unit connection portion 12b. "Connection mode" indicates the modes of connection of the DUs 2 to the four terminals of the unit connection portion 12b. "Number of units" is the number of DUs 2 connected to each terminal. "Relative ID" is an ID (for example, a consecutive number starting from 1) assigned in a relative manner to each DU 2. "Absolute ID" is an ID that is assigned in an absolute manner to each DU 2.

FIG. 5 shows, for example, that the terminal No. "1," the connection mode "Ring," the number of units "4," the relative IDs "1" to "4," and the absolute IDs "A" to "D" are stored in association in the unit connection information DB. The same figure shows that the relative IDs "1," "2," "3," and "4," and the absolute IDs "A," "B," "C," and "D" are stored in association in the unit connection information DB.

FIG. 2 is referred to again.

The display portion 14 displays for example, a volume, an audio recording status, a preset pattern, alarm information, etc., of the entire conference system S. The display portion 14 is a display represented, for example, by an LCD (Liquid Crystal Display) or an organic EL (Organic Electroluminescence) display, etc.

The operating portion 15 performs change of display contents displayed on the display portion 14, etc. The operating portion 15 is configured, for example, of a dial, a button, etc.

The control portion 16 performs control of operations of the CU 1, control of operations of the DUs 2 connected to the CU 1, calculation and processing of information, etc. The control portion 16 controls operations of the communication portion 11, the storage portion 13, the display portion 14, and the operating portion 15. The control portion 16 is configured, for example, of a microprocessor, such as a CPU (Central Processing Unit), etc., and its peripheral circuit.

For example, if when the CU 1B and the CU 1C are connected to the CU 1A as shown in FIG. 1, the CU 1A is set as the primary unit, the control portion 16 of the CU 1A also performs control of operations of the CU 1B and the CU 1C and operations of the DUs 2B1 to 2B4 and the DUs 2C1 to 2C4. That is, the control portion 16 of the CU 1 that is the primary unit also performs control of operations of the CUs 1 that are secondary units and control of operations of the DUs 2 connected to the CUs 1 that are secondary units.

Configuration of the DU

Figure 6:
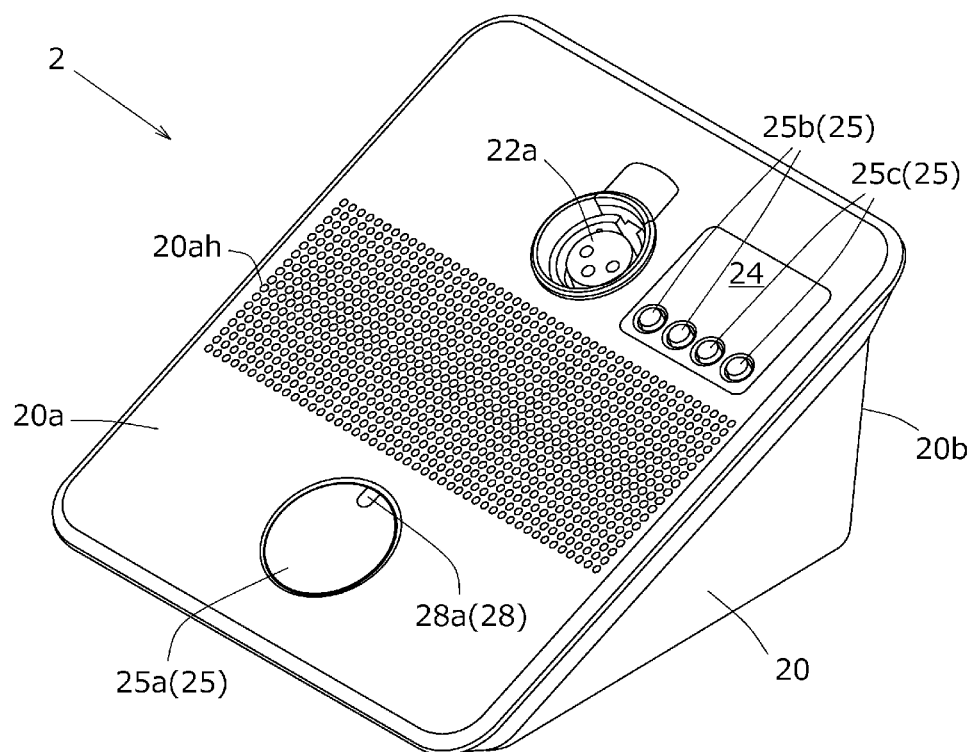
FIG. 6 is a perspective view of a discussion unit included in the conference system of FIG. 1.

FIG. 6 is a perspective view of a DU 2.

Figure 7:
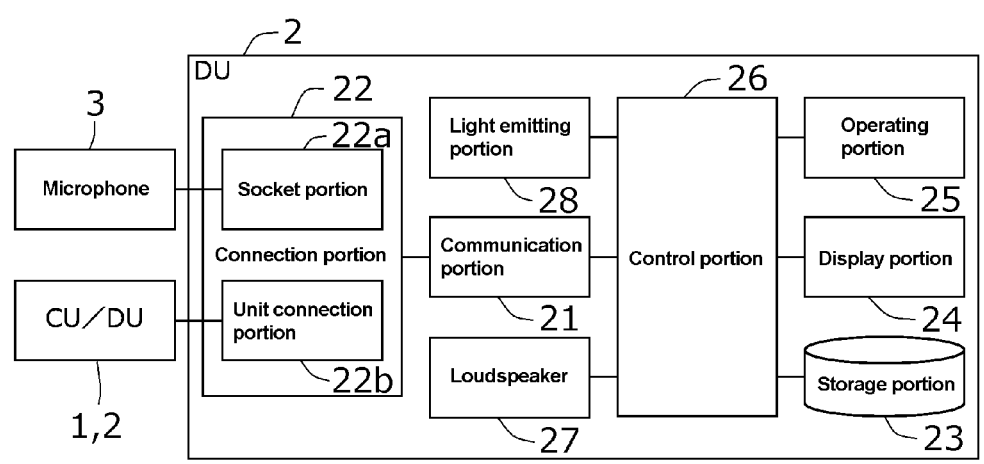
FIG. 7 is a functional block diagram of a hardware configuration of the discussion unit of FIG. 6.

FIG. 7 is a functional block diagram of a hardware configuration of the DU 2.

Figure 8:
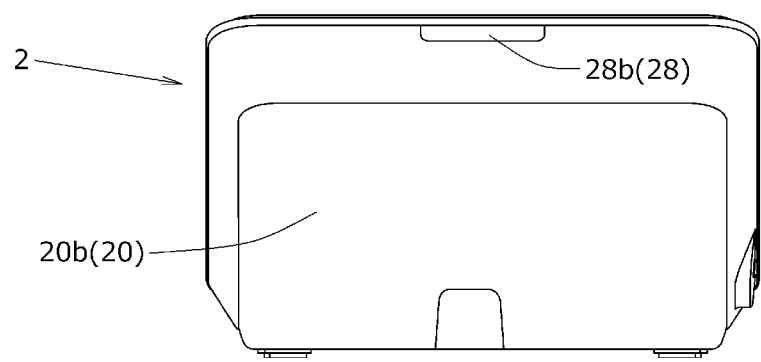
FIG. 8 is a rear view of the discussion unit of FIG. 6.

FIG. 8 is a rear view of the DU 2.

The DU 2 generates audio information based on audio signals input from the microphone 3, transmits the audio information to the CU 1, receives synthesized audio information (audio information transmitted to the CU 1 by the other DUs 2), to be described below, from the CU 1, and outputs sound waves. The DU 2 is, for example, assigned to each participant of a conference. The DU 2 is connected via a communication line to the CU 1 and the other DUs 2. The DU 2 includes a housing 20, a communication portion 21, a connection portion 22, a storage portion 23, a display portion 24, an operating portion 25, a control portion 26, a loudspeaker 27, and a light emitting portion 28.

The housing 20 houses the communication portion 21, the storage portion 23, the control portion 26, and the loudspeaker 27. The housing 20 includes at least a first surface 20a and a second surface 20b.

The first surface 20a is disposed at a front side of the housing 20. The first surface 20a is disposed at a position visible to a user of the DU 2 (referred to hereinafter as "user") during use of the DU 2. The first surface 20a includes a plurality of emission holes 20ah.

The emission holes 20*ah* emit sound waves from the loudspeaker 27 to the exterior of the DU 2. The emission holes 20*ah* are disposed at the first surface 20*a*.

The second surface 20*b* is disposed at a rear side of the housing 20. The second surface 20*b* is disposed at a position (rear of the DU 2, etc.) visible to a user of another DU 2, etc. (referred to hereinafter as "third party") during use of the DU 2.

The communication portion 21 realizes communication with the CU 1. The communication portion 21 performs communication in compliance, for example, with IEEE 802.3. Information transmitted and received by the communication portion 21 includes, for example, the audio information generated based on the audio signals from the microphone 3, the unit setting information, the audio information from the other DUs 2, etc.

The connection portion 22 is connected to the CU 1, the other DUs 2, the microphone 3, etc. The connection portion 22 includes a socket portion 22*a* and a unit connection portion 22*b*. The socket portion 22*a* is a socket to which the microphone 3 is connected. The socket portion 22*a* is, for example, a socket for three-pin plug defined in JEITA RC-5236 "Circular connectors, latch lock type for audio equipment." The socket portion 22*a* is disposed at the first surface 20*a*.

The unit connection portion 22*b* is an interface connected to the CU 1 and the other DUs 2. The unit connection portion 22*b* includes two terminals. With the exception of the DU 2 at a terminal end of a daisy connection, each of the two terminals is connected either to the CU 1 or another DU 2. Transmission and reception of information between two terminals are controlled by the communication portion 21.

The storage portion 23 stores information required by the DU 2 to realize the information processing to be described below. The storage portion 23 is configured, for example, of a RAM or a ROM, etc. The storage portion 23 stores the unit setting information, etc., received by the communication portion 21. The unit setting information stored in the storage portion 23 includes, for example, parameter information of the DU 2, information determining the light emitting state of the light emitting portion 28 to be described below, etc.

The display portion 24 displays, for example, the volume of a headphone (not shown), etc., connected to the DU 2, a channel for secondary audio (for example, the voice of an interpreter, etc.). The display portion 24 is a display represented, for example, by an LCD or an organic EL display, etc. The display portion 24 is disposed on the first surface 20*a* of the housing 20.

The operating portion 25 outputs a detection signal, which is in accordance with operating by the user, to the control portion 26. The operating portion 25 includes an operating button 25*a*, a volume adjustment button 25*b*, and a channel change button 25*c*. The operating portion 25 is disposed on the first surface 20*a* of the housing 20.

The operating button 25*a* is depressed by the user, for example, when the user makes a speech request to be described below. The volume adjustment button 25*b* is operated by the user when the user adjusts the volume of the headphone, etc., connected to the DU 2. The channel change button 25*c* is operated by the user when the channel for secondary audio (interpretation, etc.) is to be changed.

The control portion 26 performs processing of the audio signals from the microphone 3, control of operations of the DU 2, generation of the audio information, etc. The control portion 26 performs control of operations of the communication portion 21, the storage portion 23, the display portion 24, the operating portion 25, the loudspeaker 27, and the light emitting portion 28. The control portion 26 is configured, for example, of a microprocessor, such as a CPU, etc., and its peripheral circuit.

The loudspeaker 27 converts the audio signals from the communication portion 21 to sound waves and outputs the sound waves. The sound waves from the loudspeaker 27 are emitted to the exterior of the DU 2 from the emission holes 20*ah* of the first surface 20*a*.

The light emitting portion 28 emits light based on a signal from the control portion 26 to notify status information using light. The light emitting portion 28 is, for example, a multi-color LED (Light-Emitting Diode). That is, the light emitting portion 28 is capable of emitting light at a plurality of colors. The light emitting portion 28 includes a first light emitting portion 28*a* and a second light emitting portion 28*b*.

The status information includes, for example, information indicating an operation state of the microphone 3, such as on/off of the microphone 3, etc., information indicating the operation state of the DU 2, such as information indicating whether or not the speech request, to be described below, is being executed, etc., group information to be described below, etc. The speech request is a request for turning on the microphone 3 to enable speech by the user. The speech request is made from the DU 2 to the CU 1.

The first light emitting portion 28*a* notifies the status information to the user. The first light emitting portion 28*a* is disposed at the operating button 25*a*.

The second light emitting portion 28*b* notifies the status information to a third party. The second light emitting portion 28*b* is disposed on the second surface 20*b* of the housing 20. That is, the second light emitting portion 28*b* is visible to the third party.

The light emitting state of the light emitting portion 28 is controlled, based on the unit setting information, by the control portion 26. The light emitting state of the light emitting portion 28 includes a light emitting pattern and a light emitting color. The light emitting state of the light emitting portion 28 is stored as unit setting information in the storage portion 23. The light emitting pattern includes an unlit pattern, a lit pattern, a blinking pattern, and a dimmer (dimmed) lit pattern.

The light emitting color is selected, for example, from among ten colors set in advance by a system administrator, etc. By differences in the light emitting color, the light emitting portion 28 can display, for example, the group information. The group information is information indicating for example, contents classified in groups based on affiliation (country, political party, etc.) of a participant of a conference, etc., a participant's language, a priority level to be described below, etc. Therefore, for example, the system administrator can readily execute a change of setting, etc., based on the light emitting color of the second light emitting portion 28*b*.

Power is supplied to the DU 2 via a communication line cable from the CU 1 connected to the respective DUs 2.

Configuration of the Microphone

Figure 9:
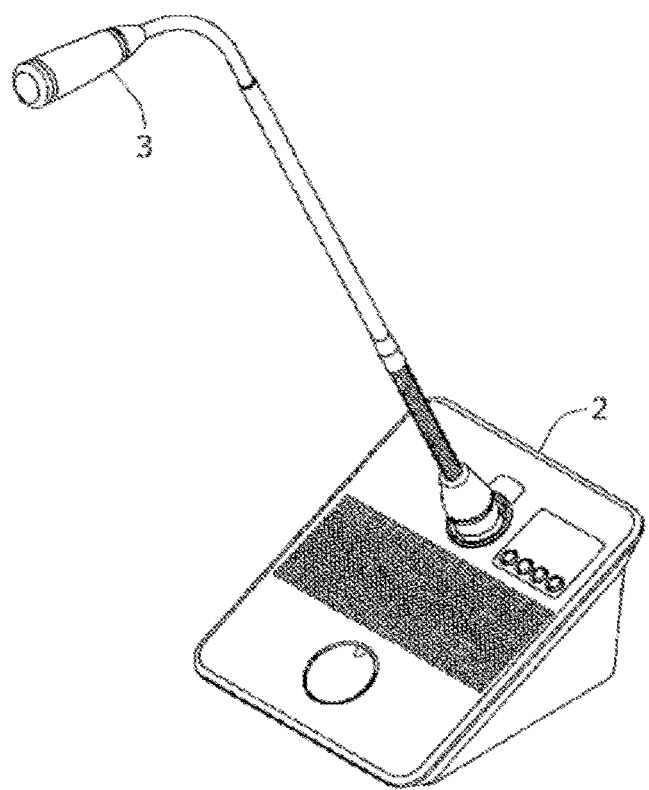
FIG. 9 is a perspective view of the discussion unit of FIG. 6 with a microphone mounted thereon.

FIG. 9 is a perspective view of the DU 2 with the microphone 3 mounted thereon.

The microphone 3 collects the voice (sound waves) of the user. That is, the microphone 3 converts sound waves to electric signals. The microphone 3 is, for example, a gooseneck type condenser microphone. The directivity of the microphone 3 is, for example, unidirectional. The microphone 3 is mounted on the socket portion 22*a* of the DU 2. Power is supplied to the microphone 3 from the DU 2, for example, by a phantom power supply. The microphone collects the voice and outputs audio signals in an "On" state and does not collect the voice in the "Off" state.

The microphone 3 may include, for example, a single color LED ring. In this case, power is supplied to the LED ring from the DU 2 via the socket portion 22a of the DU 2.

Configuration of the Operating Device

Figure 10:
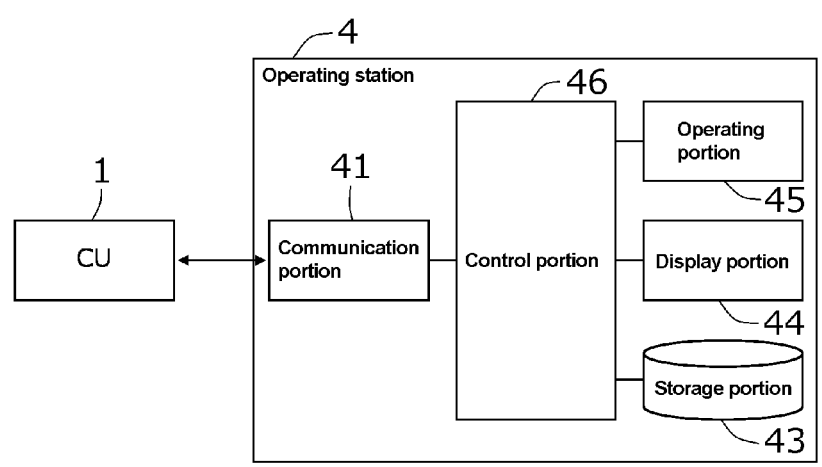
FIG. 10 is a functional block diagram of a hardware configuration of an operating station included in the conference system of FIG. 1.

FIG. 10 is a functional block diagram of a hardware configuration of the operating station 4.

The operating station 4 is a station at which running of the conference system S, setting of the CUs 1, setting of the DUs 2, remote control of the CUs 1 and the DUs 2, etc., are performed. The setting of the CUs 1 and the setting of the DUs 2 are performed, for example, by a system administrator or a chairman of the conference, etc., operating the operating station 4.

The operating station 4 is, for example, a general-purpose information processing device, such as a PC (Personal Computer), a tablet device, or a smartphone, etc. The operating station 4 is connected to the CUs 1 via the communication line and connected to the DUs 2 via the CUs 1 and the communication line. The operating station 4 includes a communication portion 41, a storage portion 43, a display portion 44, an operating portion 45, and a control portion 46.

The communication portion 41 realizes communication with the CUs 1. The communication portion 41 is an interface connected to the CUs 1 via a communication network, such as a LAN or WAN (Wide Area Network), etc.

The storage portion 43 stores information required by the operating station 4 to realize the information processing to be described below. The storage portion 43 is configured, for example, of a RAM, a ROM, or a hard disk, etc. The information stored in the storage portion 43 includes various databases read from the CUs 1, the speech request list to be described below, etc.

The display portion 44 displays an operating screen of the conference system S, various databases, the speech request list, etc., in accordance with an instruction (control) from the control portion 46. The display portion 44 is, for example, a display, such as an LCD.

The operating portion 45 outputs a detection signal, which is in accordance with the system administrator, etc., operating the operating station 4, to the control portion 46. The operating portion 45 is, for example, a keyboard, a mouse, or a software keyboard, etc.

The control portion 46 performs control of operations of the operating station 4. The control portion 46 is configured, for example, of a microprocessor, such as a CPU, etc., and its peripheral circuit.

The operating station 4 may be a station dedicated to a conference system instead of a general-purpose information processing station.

Also, it suffices for the conference system S to include at least a CU 1, a DU 2, and a microphone 3. That is, for example, the conference system S does not have to include the operating station 4.

Priority

Priority is information, which, for example, the system administrator sets for the respective DUs 2 via the CUs 1 and is, so to speak, a priority right related to restriction of functions of each DU 2. A DU 2, for which the priority is set, always has an audio slot and an above-described audio region assigned thereto and is controlled to enable speech. With a DU 2 that is controlled to enable speech, the microphone 3 can be turned on and audio information can be transmitted to the CU 1. The priority setting of each speech-enabled DU 2 is stored in the unit setting information DB in the storage portion 13.

The audio slots are, so to speak, frames that define the number of DUs 2, among the plurality of DUs 2 included in the conference system S, enabling speech at the same time. The conference system S includes audio slots of the same number as the set maximum number of speakers to be described below, that is, the same number as the number of audio regions described above. The conference system S assigns a unique number (for example, 1, 2, 3, . . . ) to each audio slot. The audio slots are included, for example, in the control portions 16 of the CUs 1.

Each CU 1 assigns an audio slot and an audio region to each DU 2 with which speech is permitted. That is, the CU 1 assigns an audio slot number and an audio region number to each DU 2 with which speech is permitted. A DU 2, to which the audio slot and the audio region are assigned, enables speech. The CU 1 stores the number assigned to the audio slot and the number assigned to the audio region in association in the storage portion 13. The CU 1 assigns the audio slot and the audio region to each DU 2, associates the assigned audio slot number and audio region number, and performs a synthesis process to be described below.

The plurality of audio regions included in the data portion of a single packet are respectively assigned to different DUs 2. In other words, the CU 1 receives a single packet storing audio information from a plurality of DUs 2. The CU 1 specifies a DU 2 that generated audio information by the number of the audio region in which the audio information is stored. The CU 1 specifies the number assigned to an audio slot based on the number assigned to the audio region. That is, the CU 1 specifies the audio slot and the audio region corresponding to each of the speech-enabled DUs 2 by the audio slot number and the audio region number. The CU 1 receives the audio information, stored in the audio regions of the received packet, via the audio slots corresponding to the audio regions. The CU 1 transmits audio information received from a certain DU 2 to all of the DUs 2, including the certain DU 2, that are connected to the CU 1.

The conference system S restricts the number of DUs 2 enabling speech at the same time to reduce the information processing load of the conference system S and reduce network traffic. The maximum number of DUs 2 enabling speech at the same time (referred to hereinafter as "set maximum number of speakers") is determined, for example, based on settings of the CU 1 that is the primary unit. The set maximum number of speakers does not depend on the number of CUs 1 connected and is determined to be a predetermined number of units in the conference system S. As mentioned above, the speech-enabled DUs 2 are the DUs 2 to each of which the audio slot and the audio region are assigned.

The number of DUs 2 for which the priority is set (DUs 2 with which speech is always enabled) is set to be less than the set maximum number of speakers. This is done for the conference system S to secure a vacancy in audio slot and audio region to enable a speech request from a DU 2 for which the priority is not set to be received as well.

The priority right of a DU 2 for which the priority is set is classified according to a priority ranking of the four levels of a first right, a second right, a third right, and a fourth right. These rights are determined, for example, by a combination of whether or not en bloc muting of the other DUs 2 is enabled and whether or not the DU 2 is subject to en bloc muting by another DU 2.

The first right is a priority right of being enabled to perform en bloc muting and not being subject to en bloc muting. The first right is the highest right and is, for example, set for a DU 2 assigned to the chairman of the conference, etc. The second right is a priority right of being enabled to perform en bloc muting but being subject to en bloc muting. The second right is, for example, set for a DU 2 assigned to a vice-chairman of the conference, etc. The third right is a priority right of not being enabled to perform en bloc muting and not being subject to en bloc muting. The fourth right is a priority right of not being enabled to perform en bloc muting and being subject to en bloc muting.

The conference system according to the present invention thus enables the priority details to be suitably set in accordance with the rights of the users of the DUs 2.

Operations of the Conference System

Next, operations of the conference system S will be described. The operations of the conference system S, that is, the information processing executed by the conference system S differ in part between a case where there is one CU 1 and a case where there are a plurality of CUs 1.

Operations of the Conference System Including a Single CU

First, the operations of the conference system S that includes a single CU will be described.

Figure 11:
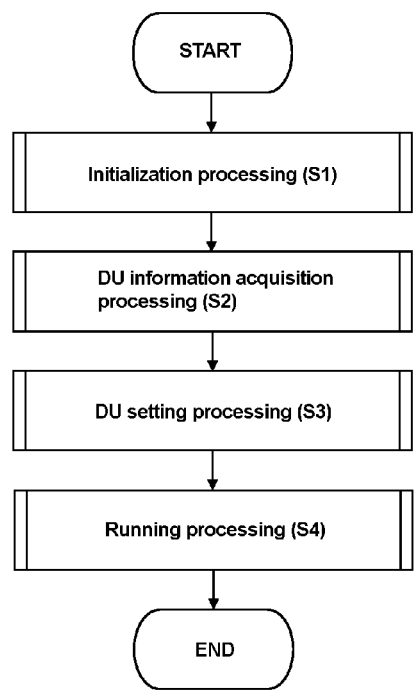
FIG. 11 is a flowchart of information processing by a conference system according to the present invention that includes a single control unit.

FIG. 11 is a flowchart of information processing by the conference system S that includes the single CU.

After starting of the conference system S, the conference system S executes initialization processing (S1), DU information acquisition processing (S2), DU setting processing (S3), and running processing (S4).

In the conference system S, the CU 1 transmits a packet from all terminals of the unit connection portion 12b. Therefore, in the case of a ring connection, a packet is transmitted to the DUs 2 bidirectionally from each of the two terminals connected to the DUs 2. In the description that follows, the forward direction is the direction in which a packet flows from a terminal of small number among the terminals of the ring-connected CU 1 toward a terminal of large number. The backward direction is the direction opposite the forward direction.

The information of the various packets received by the respective terminals is synthesized by the control portion 16 of the CU 1. In this process, in the case of the ring connection, the information from either one of the terminals is muted (ignored) and not used in the synthesis by the control portion 16. Redundancy due to synthesis of information from both directions is thus excluded.

Each DU 2 receives a packet at one terminal (referred to as "a") among the two terminals and transmits a packet from the other terminal (referred to as "b"). The terminal (b), from which a packet is transmitted in the forward direction, receives a packet in the backward direction, and terminal (a), which receives a packet in the forward direction, transmits a packet in the backward direction.

Each processing in FIG. 11 will now be described with the CU 1A of FIG. 1 and the DUs 2A1 to 2A4, connected to the CU 1A, as an example. The DU 2A1 is connected to the first terminal of the CU 1A, and the DU 2A4 is connected to the second terminal of the CU 1A.

Initialization Processing

First, the conference system S performs the initialization processing (S1). The initialization processing (S1) is processing by which the unit settings (information) of the DUs 2, connected to the CU 1, are initialized and the conference system S recognizes (specifies) the connection mode and the number of connected units of DUs 2 connected to the CU 1.

Figure 12:
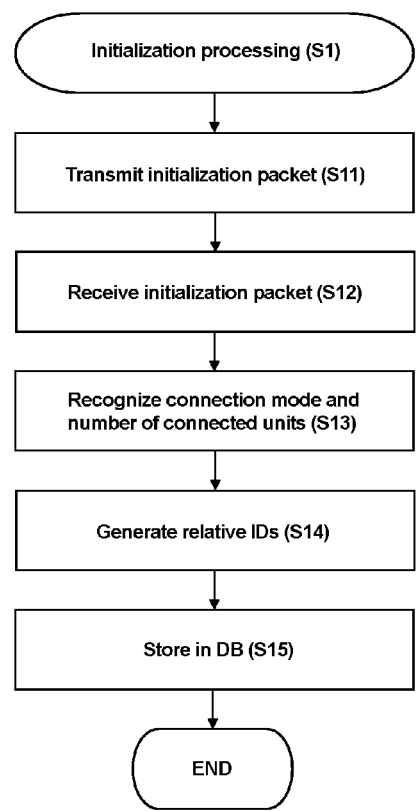
FIG. 12 is a flowchart of information processing by the control unit in initialization processing of the information processing of FIG. 11.

FIG. 12 is a flowchart of information processing by the CU 1A in the initialization processing (S1).

Figure 13:
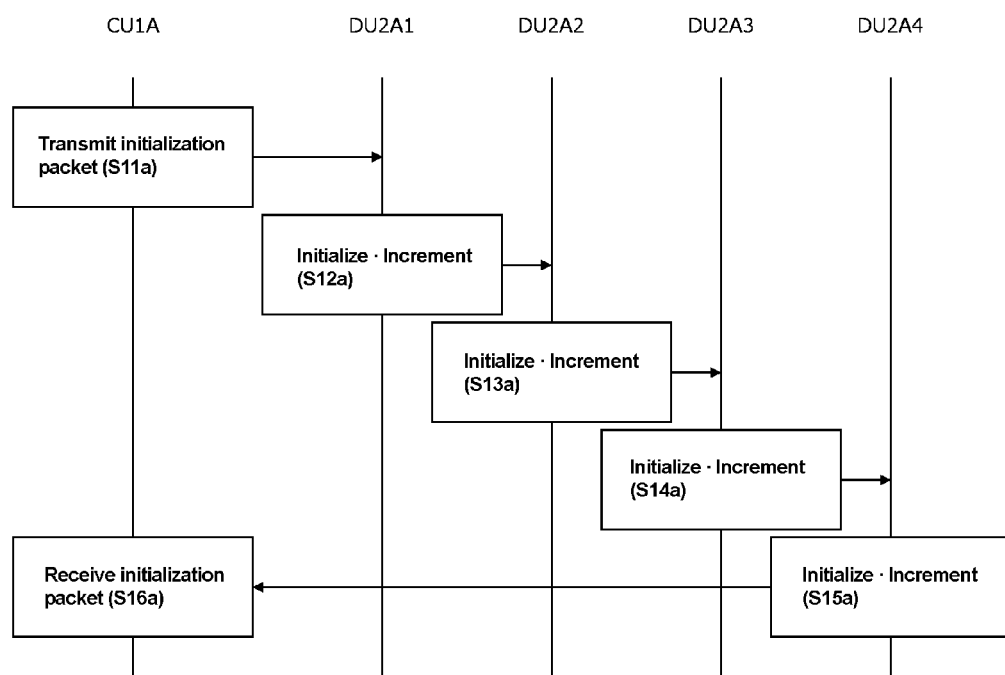
FIG. 13 is a sequence diagram of information processing by the conference system in the initialization processing of FIG. 12.

FIG. 13 is a sequence diagram of information processing by the conference system S in the initialization processing (S1).

The control portion 16 of the CU 1A transmits an initialization command, to perform initialization of the DUs 2A1 to 2A4, to the communication portion 11. The communication portion 11 transmits an initialization packet carrying (including) the initialization command from the first terminal to the DU 2A1 (S11a). As mentioned above, each packet includes the counter flag in the header portion. The counter flag is information such that, each time the packet is transmitted to a DU 2, a count value is incremented (has "1" added thereto) by the DU 2 receiving the packet. The control portion 16 resets the count value of the counter flag included in the packet transmitted to the DU 2 to initialize the count value. That is, the count value of the counter flag of the initialization packet transmitted from the CU 1A to the DU 2A1 is "0."

The DU 2A1 that received the initialization packet initializes the unit settings in accordance with the initialization command, that is, renews the unit setting information in the storage portion 23 to initial values. The control portion 26 of the DU 2A1 that received the initialization packet increments the count value of the counter flag (S12a). The communication portion 21 of the DU 2A1 transmits the initialization packet, with the count value of the counter flag being "1," to the DU 2A2.

The DU 2A2 that received the initialization packet initializes the unit settings in accordance with the initialization command, that is, renews the unit setting information in the storage portion 23 to initial values. The control portion 26 of the DU 2A2 that received the initialization packet increments the count value of the counter flag (S13a). The communication portion 21 of the DU 2A2 transmits the initialization packet, with the count value of the counter flag being "2," to the DU 2A3.

The DU 2A3 that received the initialization packet initializes the unit settings in accordance with the initialization command, that is, renews the unit setting information in the storage portion 23 to initial values. The control portion 26 of the DU 2A3 that received the initialization packet increments the count value of the counter flag (S14a). The communication portion 21 of the DU 2A3 transmits the initialization packet, with the count value of the counter flag being "3," to the DU 2A4.

The DU 2A4 that received the initialization packet initializes the unit settings in accordance with the initialization command, that is, renews the unit setting information in the storage portion 23 to initial values. The control portion 26 of the DU 2A4 that received the initialization packet increments the count value of the counter flag (S15a). The communication portion 21 of the DU 2A4 transmits the initialization packet, with the count value of the counter flag being "4," to the second terminal of the CU 1A.

The communication portion 11 receives the initialization packet from the DU 2A4 via the second terminal (S16a).

As mentioned above, in the case of the ring connection, the initialization packet (with the initial value of the counter flag being "0") is also transmitted in the backward direction from the second terminal.

Figure 14:
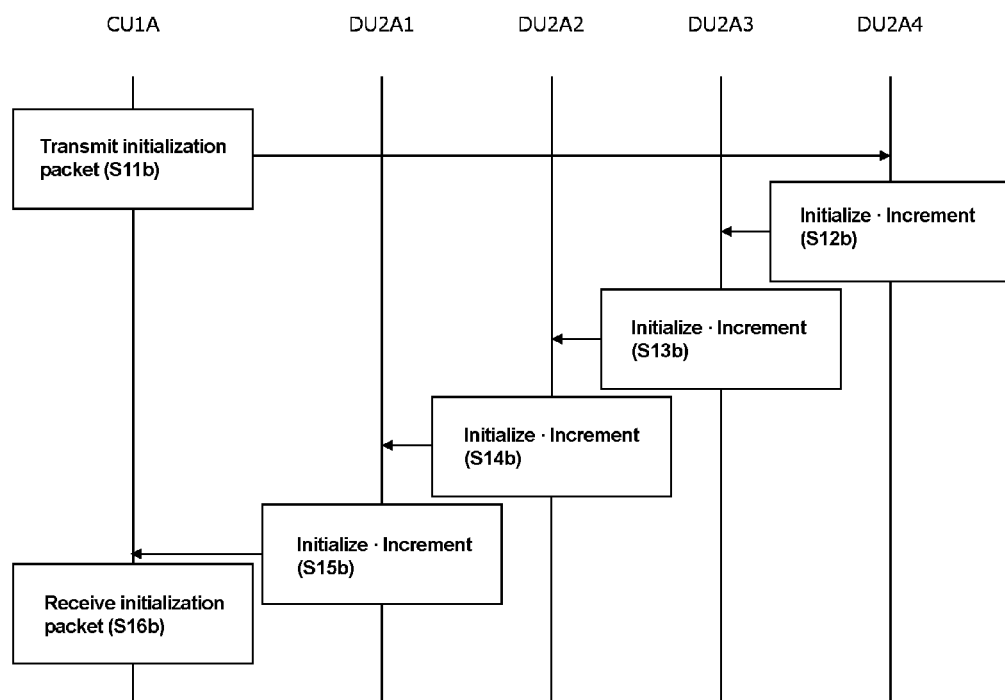
FIG. 14 is another sequence diagram of information processing by the conference system in the initialization processing of FIG. 12.

FIG. 14 is another sequence diagram of information processing by the conference system S in the initialization processing (S1).

From the second terminal of the CU 1A, the initialization packet is transmitted in the backward direction in the order of the DU 2A4, the DU 2A3, the DU 2A2, the DU 2A1, and the first terminal of the CU 1.

The communication portion 11 transmits the initialization packet carrying the initialization command from the second terminal to the DU 2A4 (S11b).

The DU 2A4 initializes the unit settings and increments the count value of the counter flag (S12b). The DU 2A3 initializes the unit settings and increments the count value of the counter flag (S13b). The DU 2A2 initializes the unit settings and increments the count value of the counter flag (S14b). The DU 2A1 initializes the unit settings and increments the count value of the counter flag (S15b).

The communication portion 11 receives the initialization packet from the DU 2A1 via the first terminal (S16b).

The control portion 16 stores, in the storage portion 13, the count value of the counter flag and other information included in the initialization packet received by the communication portion 11.

Figure 15:
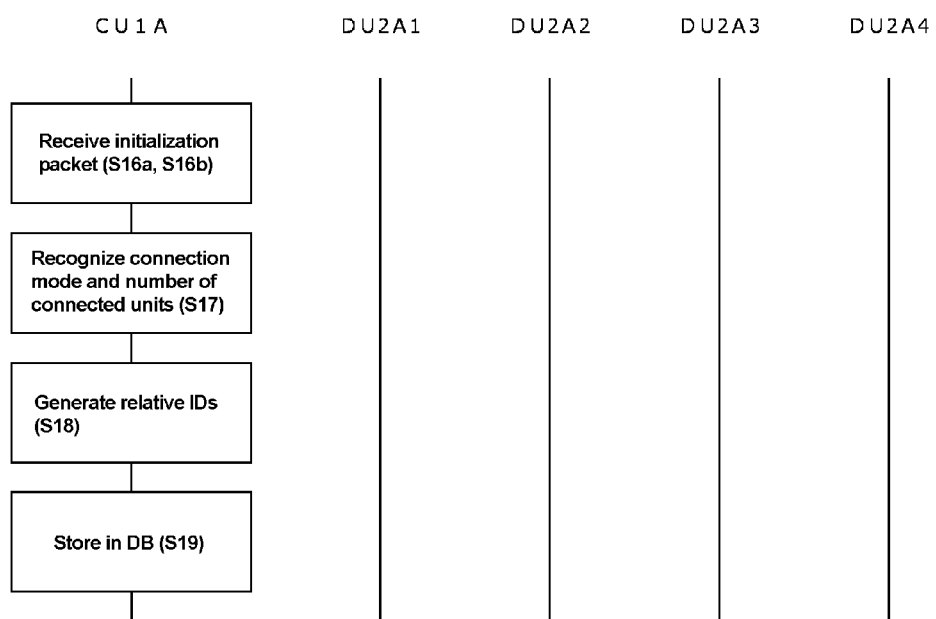
FIG. 15 is yet another sequence diagram of information processing by the conference system in the initialization processing of FIG. 12.

FIG. 15 is a sequence diagram of information processing by the conference system S after initialization packet reception in the initialization processing (S1).

The control portion 16 recognizes, for each terminal, a connection state of the DUs 2, that is, the connection mode and the number of connected units of DUs 2 (S17). The connection mode of the DUs 2 is recognized, for example, by whether or not the terminals of the unit connection portion 12b that transmitted and received a packet are matched (agreement/difference of the terminal No.). That is, if the terminal that transmitted the packet matches the terminal that received the packet, the connection mode of the DUs 2 is the daisy connection. On the other hand, if the terminal that transmitted the packet does not match the terminal that received the packet, the connection mode of the DUs 2 is the ring connection. For example, as described above, the forward direction initialization packet for the DUs 2A1 to 2A4 is transmitted from the first terminal of the CU 1A and is received by the second terminal. That is, the terminal No. of the terminal, by which the CU 1A transmitted the initialization packet, does not match (differs from) the terminal No. of the terminal, by which the CU 1A received the initialization packet. On the other hand, even in the transmission and reception of the backward direction initialization packet, the terminal No. of the terminal (second terminal), by which the CU 1A transmitted the initialization packet, does not match (differs from) the terminal No. of the terminal (first terminal), by which the CU 1A received the initialization packet. The control portion 16 thus recognizes that the connection mode of the DUs 2A1 to 2A4 is the ring connection.

The number of connected units of DUs 2 is recognized by the count value of the counter flag of the initialization packet transmitted and received by all terminals. That is, for example, the initialization packet transmitted between the first terminal and the second terminal of the CU 1A returns to the CU 1A with the count value of the counter flag being "4." The control portion 16 thus recognizes that the number of DUs connected between the first terminal and the second terminal is "4." The counter flag included in each packet is thus used to count the number of DUs 2 connected to the CU 1.

When the control portion 16 recognizes the connection mode and the number of connected units of DUs 2, it generates IDs (referred to hereinafter as "relative IDs") for the respective DUs 2 (S18). The relative ID is, for example, numbered in order from the DU 2 connected to the terminal of lower terminal No. of the unit connection portion 12b and is assigned to each DU 2. That is, for example, the relative ID of the DU 2A1 is "1" and the relative ID of the DU 2A4 is "4."

The control portion 16 stores the recognized connection mode and number of connected units of DUs 2 and the assigned relative IDs in association in the unit connection information DB in the storage portion 13 (S19).

FIG. 16 is a schematic diagram of the information stored in the storage portion 13 of the CU 1 after the initialization processing (S1).

This figure shows that the third terminal and the fourth terminal of the CU 1 are in unconnected states of not being connected to DUs 2.

If the connection mode of the DUs 2 is the daisy connection, the DU 2 at the terminal end determines itself to be at the terminal end because there is no reception from one terminal among the two terminals of the DU 2. The DU 2 at the terminal end adds a flag indicating return (referred to hereinafter as "return flag") to the initialization packet and returns the initialization packet. That is, regardless of the connection mode, the DUs 2 perform transmission and reception of information bidirectionally. The DUs 2 do not increment the count value of the counter flag of an initialization packet to which the return flag is added.

In this process, the control portion 16 recognizes the number of connected units of DUs 2 by means of the count value of the counter flag. The control portion 16 recognizes that the connection mode of the DUs 2 is the daisy connection because the terminal Nos. of the terminals of the unit connection portion 12b transmitting and receiving the initialization packet are matched.

DU Information Acquisition Processing

FIG. 11 is referred to again.

Next, the conference system S executes the DU information acquisition processing (S2). The DU information acquisition processing (S2) is processing by which the unit information of each DU 2 is acquired. The unit information includes a serial number (absolute ID), MAC (Media Access Control) address, etc., of each DU 2. Description of the processing in the backward direction will be omitted in the following description because the processing in the forward direction is the same as the processing in the backward direction.

Figure 17:
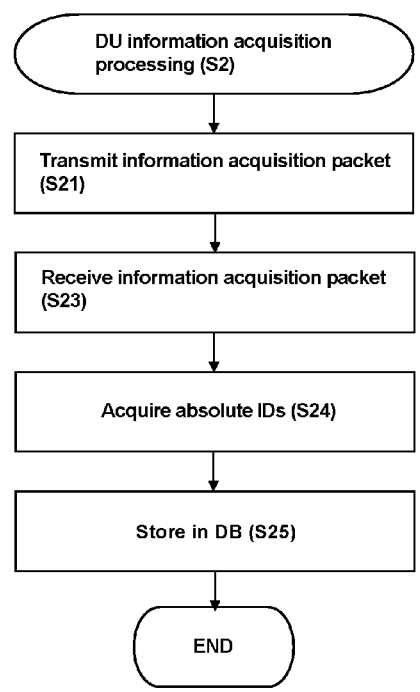
FIG. 17 is a flowchart of information processing by the control unit in DU information acquisition processing of the information processing of FIG. 11.

FIG. 17 is a flowchart of information processing by the CU 1A in the DU information acquisition processing (S2).

Figure 18:
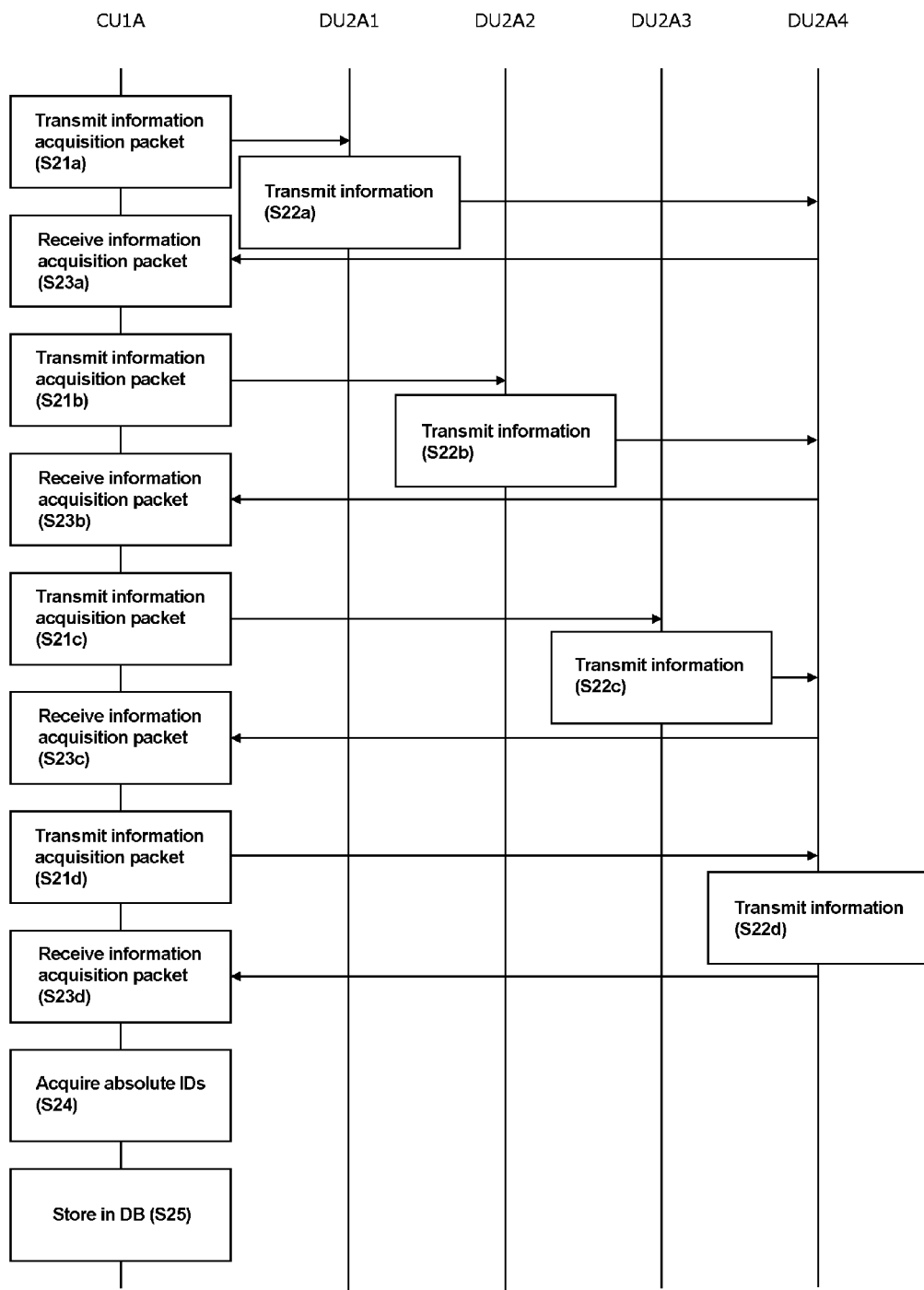
FIG. 18 is a sequence diagram of information processing by the conference system in the DU information acquisition processing of FIG. 17.

FIG. 18 is a sequence diagram of information processing by the conference system S in the DU information acquisition processing (S2).

The control portion 16 transmits an information acquisition command to acquire the unit information of the DUs 2A1 to 2A4 to the communication portion 11. The communication portion 11 transmits an information acquisition packet, carrying the information acquisition command, to each of the DUs 2A1 to 2A4 (S21a to S21d). The address of the information acquisition packet is designated by a relative ID. Therefore, only the DUs 2 of the designated addresses receive the information acquisition packet.

Each of the DUs 2A1 to 2A4 that received the information acquisition command transmits the information acquisition packet, carrying the unit information, to the CU 1A in accordance with the information acquisition command (S22a to S22d).

The communication portion 11 receives the information acquisition packet from each of the DUs 2A1 to 2A4 (S23a to S23d).

The control portion 16 reads the unit information from the information acquisition packet received by the communication portion 11. The control portion 16 acquires the absolute IDs from the unit information (S24). The control portion 16 stores the acquired absolute ID and the relative ID in association with the unit connection information DB in the storage portion 13 (S25). By the control portion 16 acquiring the absolute ID, it becomes possible to perform address designation of the DUs 2 using the absolute IDs in processing subsequent to the DU information acquisition processing (S2).

When in the DU information acquisition processing (S2), there is present a newly connected DU 2, the control portion 16 reads the unit setting information DB from the storage portion 13 and makes the absolute ID and the setting information (initial values) of the DU 2 be stored in association in the unit setting information DB.

FIG. 19 is a schematic diagram of the information stored in the storage portion 13 of the CU 1 after the DU information acquisition processing.

The figure shows that the relative IDs "1," "2," "3," and "4" of the four DUs 2 that are ring-connected to the terminals of terminal Nos. "1" and "2" are associated with the absolute IDs "A," "B," "C," and "D."

By the absolute IDs and the relative IDs being associated, the CU 1 is made capable of notifying information, indicating DUs 2 of which absolute IDs are connected to which relative IDs, to, for example, the system administrator, etc., via the operating station 4, etc. Therefore, the system administrator can, for example, operate the operating station 4 to make the absolute IDs and user names (proper names) of the DUs 2 be stored in association in the storage portion 13 and manage the DUs 2 by means of the proper names. Also, for example, by making the relative IDs and the user names of the DUs 2 be stored in association in the storage portion 13, the system administrator can make the proper names of each seat in a conference room be displayed on the display portion 44 of the operating station 4, etc.

DU Setting Processing

FIG. 11 is referred to again.

Next, the conference system S executes the DU setting processing (S3). The DU setting processing (S3) is processing by which setting of the DUs 2 is performed based on the unit setting information DB. Description of the processing in the backward direction will be omitted in the following description because the processing in the forward direction is the same as the processing in the backward direction.

Figure 20:
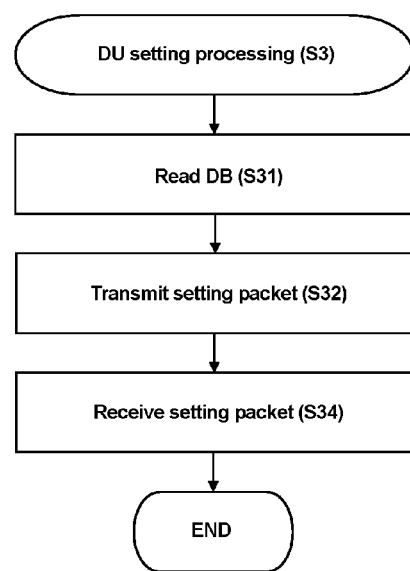
FIG. 20 is a flowchart of information processing by the control unit in DU setting processing of the information processing of FIG. 11.

FIG. 20 is a flowchart of information processing by the CU 1A in the DU setting processing (S3).

Figure 21:
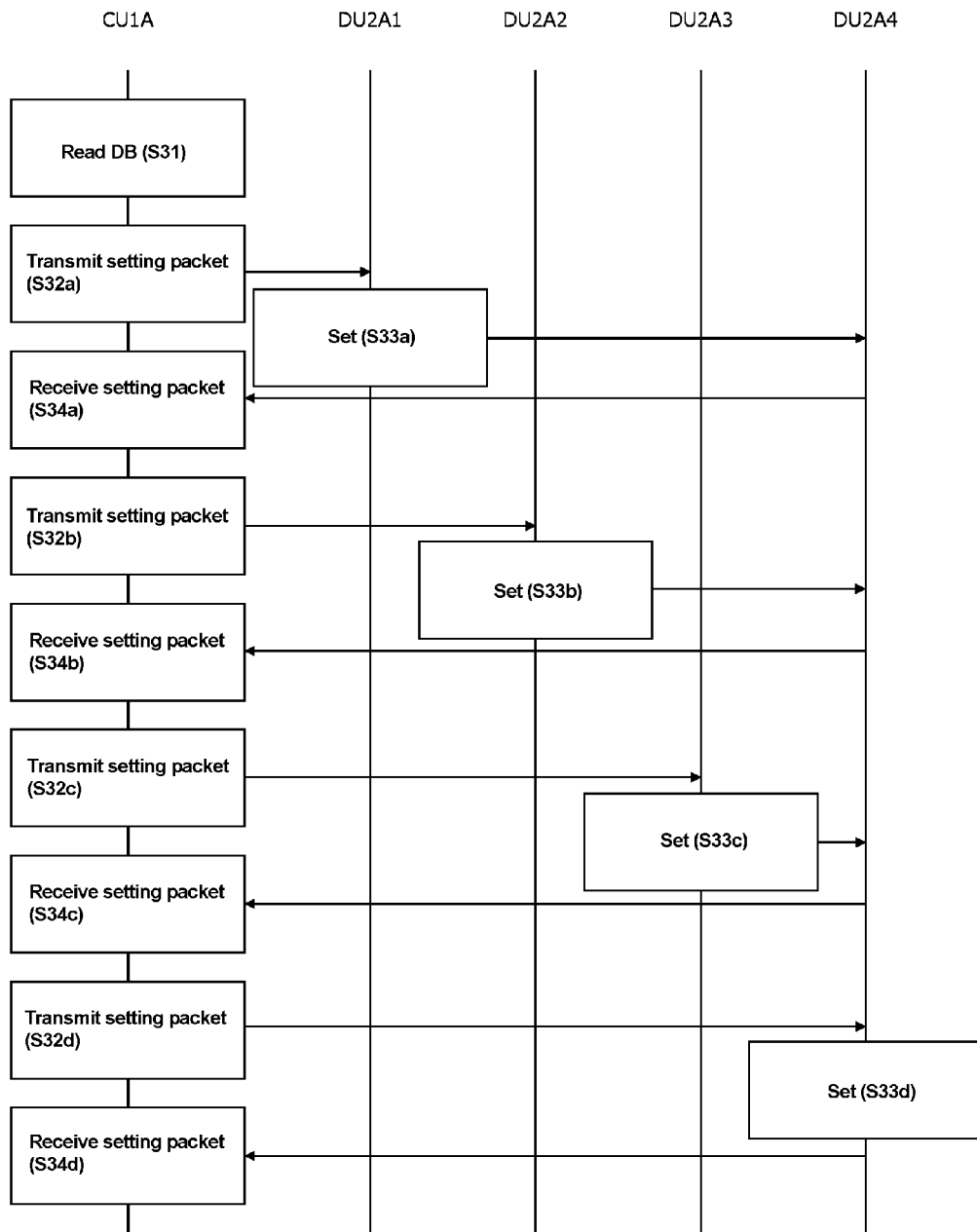
FIG. 21 is a sequence diagram of information processing by the conference system in the DU setting processing of FIG. 20.

FIG. 21 is a sequence diagram of information processing by the conference system S in the DU setting processing (S3).

The control portion 16 reads the unit setting information DB from the storage portion 13 (S31) and transmits a unit setting command, to perform setting of the DUs 2, to the communication portion 11. The communication portion 11 transmits a setting packet, carrying the unit setting command, to each of the DUs 2A1 to 2A4 (S32a to S32d). The setting packet includes the absolute ID of a DU 2 as the transmission destination of the packet. That is, the address of the transmission destination of the setting packet is designated by the absolute ID. Therefore, among the DUs 2 connected to the CU 1, only the DUs 2 of the designated addresses receive the setting packet.

Each of the DUs 2A1 to 2A4 that received the setting packet changes the unit settings in accordance with the unit setting command (S33a to S33d). Each of the DUs 2A1 to 2A4 renews the unit setting information in the storage portion 23. The unit settings are information defining the operations of each DU 2, for example, the priority setting, a setting of the mic on trigger to be described below, a light emitting color setting of the light emitting portion 28, etc.

The communication portion 11 receives the setting packet from each of the DUs 2A1 to 2A4 that changed the unit settings (S34a to S34d). At this point, the setting packet includes information indicating that each of the DUs 2A1 to 2A4 acquired the command correctly.

When the DU setting processing (S3) is completed, running of the conference system S (for example, acquisition of audio information from each DU 2, etc.) is enabled.

Running Processing

FIG. 11 is referred to again.

Next, the conference system S executes the running processing (S4). The running processing (S4) is processing by which a running packet is transmitted periodically (for example, at every 166 μsec) from the CU 1 to the DUs 2 to execute various commands carried by the running packet and monitor the connection state of the DUs 2 by means of the counter flags.

The various commands include, for example, an audio acquisition command, etc. The audio acquisition command is a command by which the CU 1 acquires audio information from the DUs 2 with audio slots and audio regions assigned.

As mentioned above, there is a case where the running packet does not carry (include) a control command. Even in this case, the running packet is transmitted and received repeatedly between the CU 1 and the DUs 2. That is, regardless of whether or not there is a control command, the CU 1 uses the counter flag included in the running packet to monitor the connection state of the DUs 2.

Figure 22:
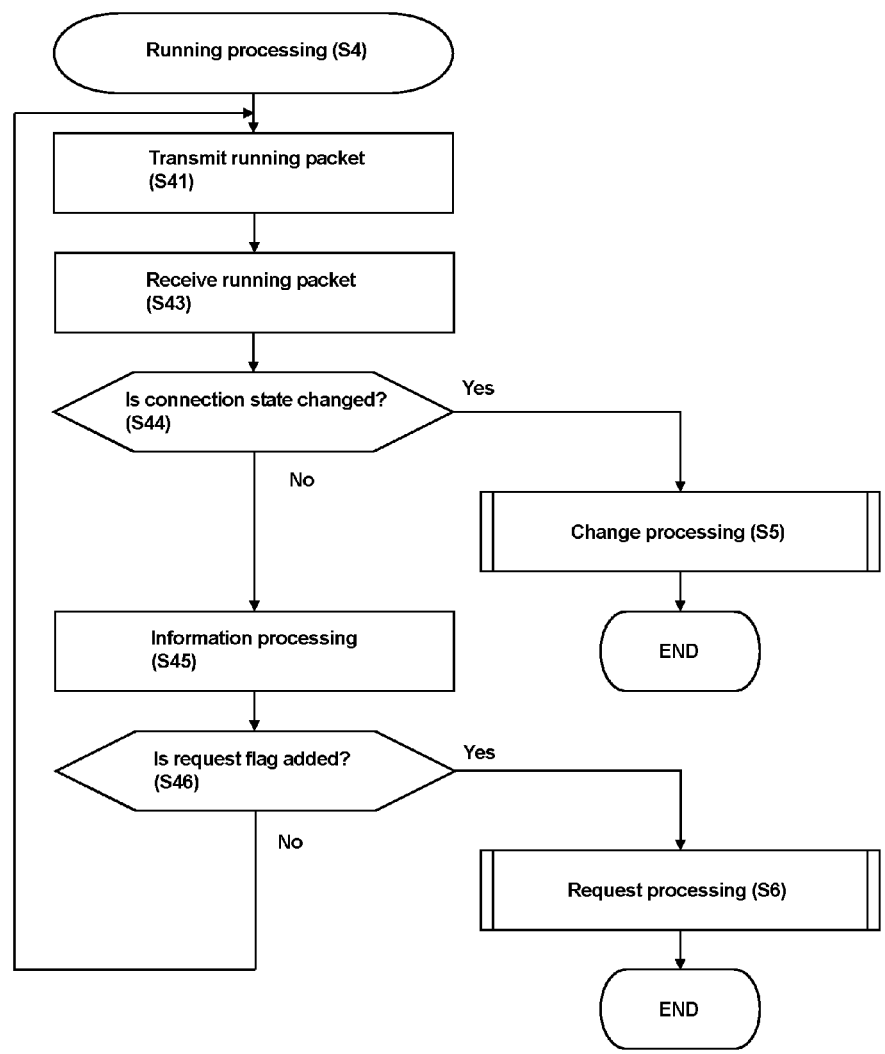
FIG. 22 is a flowchart of information processing by the control unit in running processing of the information processing of FIG. 11.

FIG. 22 is a flowchart of information processing by the CU 1A in the running processing (S4).

Figure 23:
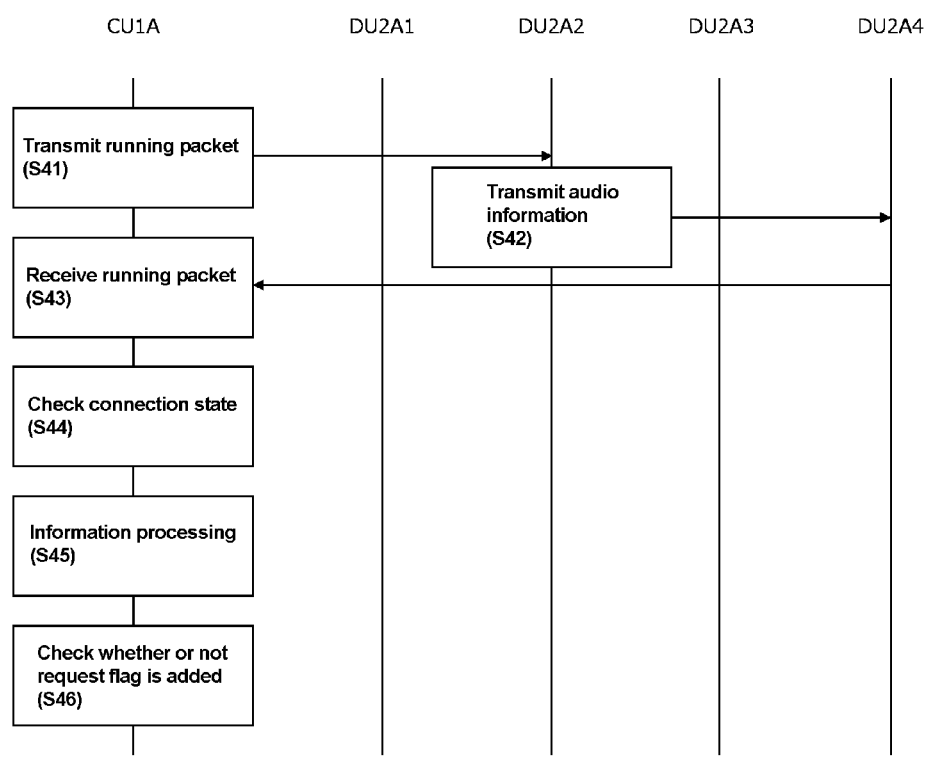
FIG. 23 is a sequence diagram of information processing by the conference system in the running processing of FIG. 22.

FIG. 23 is a sequence diagram of information processing by the conference system S in the running processing (S4).

The running process (S4) will now be described with the acquisition of audio information from the DU 2A2, to which an audio slot and an audio region are assigned, as an example. The assignment of audio slot and audio region will be described below.

The control portion 16 transmits the audio acquisition command to the communication portion 11. The communication portion 11 transmits a running packet, carrying the audio acquisition command, to the DU 2A2, to which an audio slot and an audio region are assigned (S41).

In accordance with the audio acquisition command, the communication portion 21 of the DU 2A2 that received the running packet transmits audio information to the CU 1A by making the information be carried in the audio region, which, among the audio regions of the running packet, is of the number assigned to the DU 2A2 itself (S42).

Here, although not shown, the count value of the counter flag is reset at the CU 1A and incremented at each of the DUs 2A1 to 2A4 as in the initialization processing (S1).

The CU 1A receives the running packet from the DU 2A2 (S43). The communication portion 11 transmits information, such as the count value of the counter flag, audio information, etc., received by all terminals of the unit connection portion 12b to the control portion 16. The audio information is received by the audio slot of the same number as the number of the audio region in which the audio information was stored. Processing of the audio information will be described below. The control portion 16 checks (specifies) the connection state (connection mode and number of connected units) of the DUs 2 by means of the count value of the counter flag and the terminal Nos. of the terminals that transmitted and received the running packet (S44). This check is executed each time the communication portion 11 receives a running packet.

The check of the number of connected units of DUs 2 is executed by comparing the newly acquired counter flag count value (referred to hereinafter as "new DU count value") with the count value stored in the storage portion 13 (referred to hereinafter as "old DU count value"). That is, when the new DU count value matches the old DU count value, the control portion 16 judges that there is no change in the number of connected units of DUs 2. On the other hand, when the new DU count value and the old DU count value are not matched (are mismatched), the control portion 16 judges that there is a change in the number of connected units of DUs 2.

As described above, the check of the connection mode of the DUs 2 is executed by comparing the terminal No. of the terminal that transmitted a running packet and the terminal No. of the terminal that received the running packet. That is, when the terminal Nos. of the terminals that transmitted and received the running packet are matched, the control portion 16 judges the connection mode of the DUs 2 to be the daisy connection. On the other hand, when the terminal Nos. of the terminals that transmitted and received the running packet are not matched (are mismatched), the control portion 16 judges the connection mode of the DUs 2 to be the ring connection.

The control portion 16 reads the unit connection information DB from the storage portion 13 and compares the connection mode of the DUs 2 stored in the unit connection information DB and the newly acquired connection mode of the DUs 2. The control portion 16 judges that there is no change in the connection mode of the DUs 2 when both connection modes are matched (are the same) and judges that there is a change in the connection mode of the DUs 2 when both connection modes are not matched (differ).

When the control portion 16 judges that there is a change in either the number of connected units of DUs 2 or the connection mode of the DUs 2, it judges that there is a change in the connection state of the DUs 2. That is, when the new DU count value and the old DU count value are mismatched, the control portion 16 judges that there is a change in the connection state of the DUs 2. On the other hand, when the control portion 16 judges that there is no change in either, it judges that there is no change in the connection state of the DUs 2.

When there is a change in the connection state of the DUs 2 ("Yes" in S44), the conference system S executes change processing (S5). The change processing (S5) will be described below.

Figure 24:
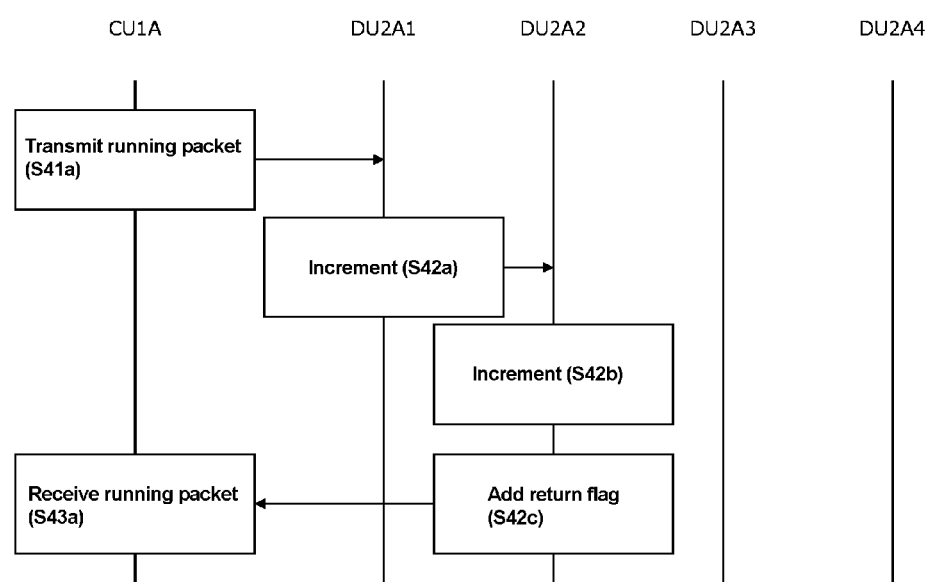
FIG. 24 is a sequence diagram of information processing by the conference system when there is a change in a connection state of the discussion unit in the running processing of FIG. 22.

FIG. 24 is a sequence diagram of information processing by the conference system S when there is a change in the connection state of the DUs 2.

The figure shows an example where the DU 2A3 undergoes a connection abnormality due to malfunction, disconnection, etc. For convenience of description, the figure shows only the processing in the forward direction of a running packet that is not carrying a command.

The communication portion 11 of the CU 1A transmits a running packet to the DU 2A1 via the first terminal (S41a). The DU 2A1 increments the count value of the counter flag in the running packet received (S42a) and transmits the running packet to the DU 2A2. The DU 2A2 increments the count value of the counter flag in the running packet received (S42b).

If a connection abnormality occurs in the DU 2A3, the DU 2A2 recognizes that it itself has become the DU 2 at the terminal end because there is no reception of the running packet from one of the terminals (from the backward direction). The DU 2A2 thus adds the return flag to (makes the return flag be carried by) the running packet (S42c). The DU 2A2 transmits, via the DU 2A1, the running packet, with the return flag added, to the CU 1A. In this process, the DU 2A1 performs, as mentioned above, only the reception and transmission of the running packet and does not increment the count value of the counter flag because the return flag is added to the running packet.

On the other hand, in the processing in the backward direction, the DU 2A4 transmits, in the same manner as the DU 2A2, a running packet, with the return flag added, to the CU 1A (not shown).

The control portion 16 of the CU 1A recognizes a change in the connection mode of the DUs 2A1 to 2A4 (a change from the ring connection to the daisy connection) because the terminal Nos. of the terminals that transmitted and received each running packet are the same. The control portion 16 recognizes a change in the number of connected units of DUs 2 connected to the same terminal from the comparison results of the count values of the counter flags of the running packets. The control portion 16 collates the recognition results and the unit connection information DB to recognize a change in the connection state of the DUs 2A1 to 2A4 (S44).

Here, the control portion 16 recognizes that a connection abnormality occurred in the DU 2A3 from the count value of "2" of the counter flag of the running packet received by the first terminal and the count value of "1" of the counter flag of the running packet received by the second terminal. Thus, when a connection abnormality occurs, the CU 1A immediately recognizes the occurrence of the connection abnormality and specifies the connection abnormality location.

FIG. 22 and FIG. 23 are referred to again.

If there is no change in the connection state of the DUs 2 ("No" in S44), the control portion 16 synthesizes (processes) the audio information received in the audio slots by all terminals and the information stored in association with the absolute IDs of the DUs 2 in the storage portion 13 to generate synthesized audio information (S45). The synthesis of audio information is executed by mutually synthesizing the audio information stored in the audio regions of the same number, among the audio regions of the respective running packets received by all terminals.

The synthesized audio information includes, for example, information on the users (speakers), time information, group information, and other information on the DUs 2 associated with the absolute IDs. The synthesized audio information is stored, for example, in a USB memory, etc., connected to the external equipment connection portion 12a of the CU 1A and is transmitted to each of the DUs 2A1 to 2A4. The synthesized audio information transmitted to each of the DUs 2A1 to 2A4 is processed by the control portion 26 of each of the DUs 2A1 to 2A4 and thereafter converted to sound waves by the loudspeaker 27 and output from the loudspeaker 27.

In the process of generating the synthesized audio information, the control portion 16 checks whether or not the request flag is added to a running packet (S46). The request flag will be described below.

If the request flag is added ("Yes" in S46), the conference system S executes request processing (S6). If the request flag is not added ("No" in S46), the conference system S repeats the running processing (S4).

Change Processing

When there is a change in the connection state of the DUs 2, the conference system S executes the change processing (S5). The change processing (S5) is processing by which the unit connection information stored in the unit connection information DB is renewed after the change in the connection state of the DUs 2 to prevent omission of audio information and problems in the synthesizing processing of audio information.

Figure 25:
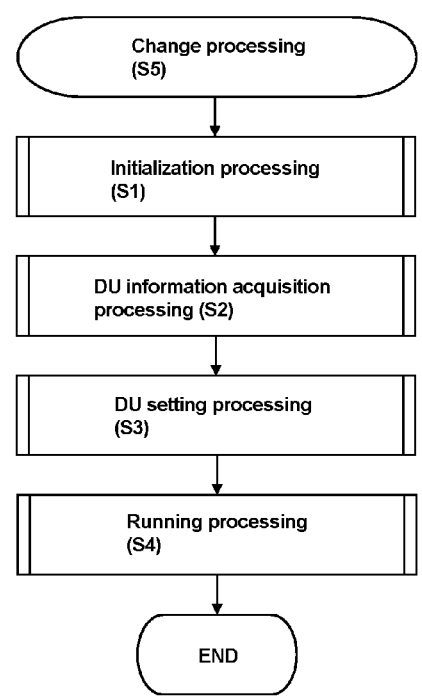
FIG. 25 is a flowchart of information processing by the control unit in change processing of the running processing of FIG. 22.

FIG. 25 is a flowchart of information processing by the CU 1A in the change processing (S5).

The change processing (S5) is processing in which the initialization processing (S1), the DU information acquisition processing (S2), and the DU setting processing (S3) are executed anew to renew the unit connection information stored in the unit connection information DB.

Figure 26:
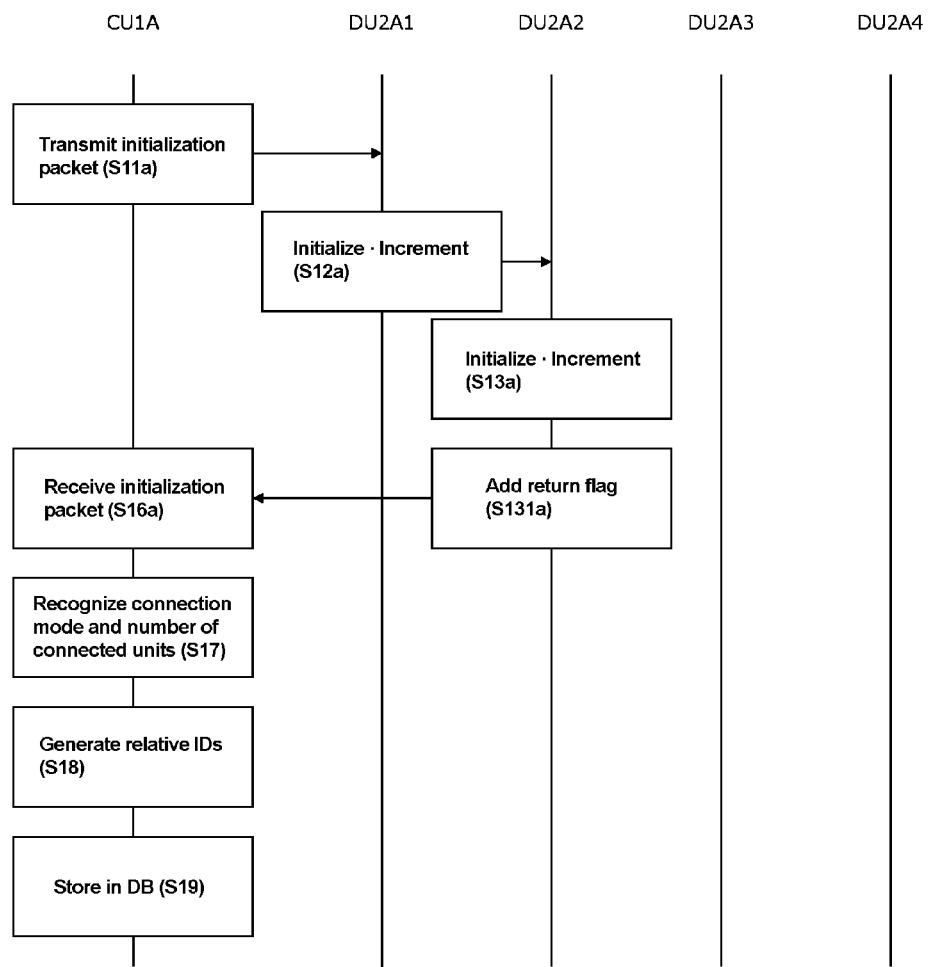
FIG. 26 is a sequence diagram of information processing by the conference system as an example of initialization processing in the change processing of FIG. 25.

FIG. 26 is a sequence diagram of information processing by the conference system S as an example of the initialization processing (S1) in the change processing (S5). The figure shows a state where the DU 2A3 undergoes a connection abnormality due to malfunction, disconnection, etc. For convenience of description, the figure shows only the processing in the forward direction.

In the initialization processing (S1), the communication portion 11 of the CU 1A transmits an initialization packet to the DU 2A1 via the first terminal and transmits an initialization packet to the DU 2A4 via the second terminal. The initialization packet from the first terminal is returned from the DU 2A2. In this process, the DU 2A2 adds a return flag to the initialization packet (S131a). On the other hand, the initialization packet from the second terminal is returned from the DU 2A4 (not shown). In this process, the DU 2A4 adds a return flag to the initialization packet (not shown).

The communication portion 11 receives the initialization packet from the DU 2A1 via the first terminal (S16a) and receives the initialization packet from the DU 2A4 via the second terminal. The control portion 16 stores the new DU count values in the storage portion 13. In this process, the control portion 16 renews the old DU count values with the new DU count values.

The control portion 16 recognizes the connection state of the DUs 2, that is, the connection mode and the number of connected units of DUs 2 at each terminal of the CU 1 (S17). The connection mode of the DU 2A1 and the DU 2A2 connected to the first terminal of the CU 1 and the connection mode of the DU 2A4 connected to the second terminal of the same are daisy connections because the terminals transmitting and receiving the initialization packet are the same. On the other hand, the number of connected units of DUs 2 connected to the first terminal is two and the number of connected units of DUs 2 connected to the second terminal is one.

The control portion 16 generates the relative IDs of the respective DUs 2 when it recognizes the connection modes and the numbers of connected units of the DUs 2 (S18).

The control portion 16 stores the connection modes, the numbers of connected units, and the relative IDs of the DUs 2 in association in the unit connection information DB in the storage portion 13 (S19). Consequently, the association of the connection state of the DUs 2, the relative IDs, and the absolute IDs stored in the unit connection information DB in the storage portion 13 is renewed. Thus, when the new DU count values and the old DU count values are mismatched, the control portion 16 renews the association of the relative IDs and the absolute IDs. When both connection modes differ, the control portion 16 renews the connection modes of the DUs 2 stored in the storage portion 13.

The respective processing contents of the DU information acquisition processing (S2) and the DU setting processing (S3) are the same as the respective processing contents of the DU information acquisition processing (FIG. 17) and the DU setting processing (FIG. 20) described above.

FIG. 27 is a diagram of an example of information stored in a unit connection state DB after the change processing.

This figure, in comparison to FIG. 19, shows that the DU 2A3 is gone and the relative ID of the DU 2A4 is changed from "4" to "3." When such a change in the relative ID occurs, the association of the absolute IDs and the relative IDs is renewed and therefore a problem in the synthesizing processing of audio information before and after the change in the connection state of the DUs 2, etc., does not occur.

In the change processing, if there is no change in the number of connected units of DUs 2, only the connection mode of the DUs 2 may be renewed without renewing the relative IDs of the DUs 2.

Request Processing

FIG. 11 is referred to again.

If in the running processing (S4), the request flag is added to a running packet, the conference system S executes the request processing (S6). The request processing (S6) is processing by which, when a speech request is made from a DU 2, command management up to assignment of an audio slot to the DU 2 is performed.

The request flag is not a command itself but is on/off of a fixed length of bits added to a running packet by operation by a user of a DU 2 when the user makes a speech request. The request flag is added to the running packet by the control portion 26 of the DU 2. The addition of the request flag is executed by the control portion 26 of the DU 2 processing the request flag bits (for example, a bit is set to "1" when on and the bit is set to "0" when off). The DU 2 that added the request flag enters a state of waiting for a command from the CU 1 (request waiting state). The running packet with the request flag added is transmitted from the communication portion 21 of the DU 2 to the CU 1A. The operation by the user is executed by either an operation by depressing of the operating button 25a (referred to hereinafter as "manual trigger") or an operation by the user's voice (referred to hereinafter as "automatic trigger"). That is, the manual trigger and the automatic trigger are triggers for turning "on" the microphone 3.

The DU 2 in the request waiting state is in a state (referred to herein after as "transmission disabled state") of not being capable of transmitting audio information to the CU 1 by means of the communication portion 21. On the other hand, the DU 2 in a state (referred to herein after as "speech enabled state") where the speech request is permitted by the CU 1 is in a state (referred to herein after as "transmission enabled state") of being capable of transmitting audio information to the CU 1 by means of the communication portion 21.

Figure 28:
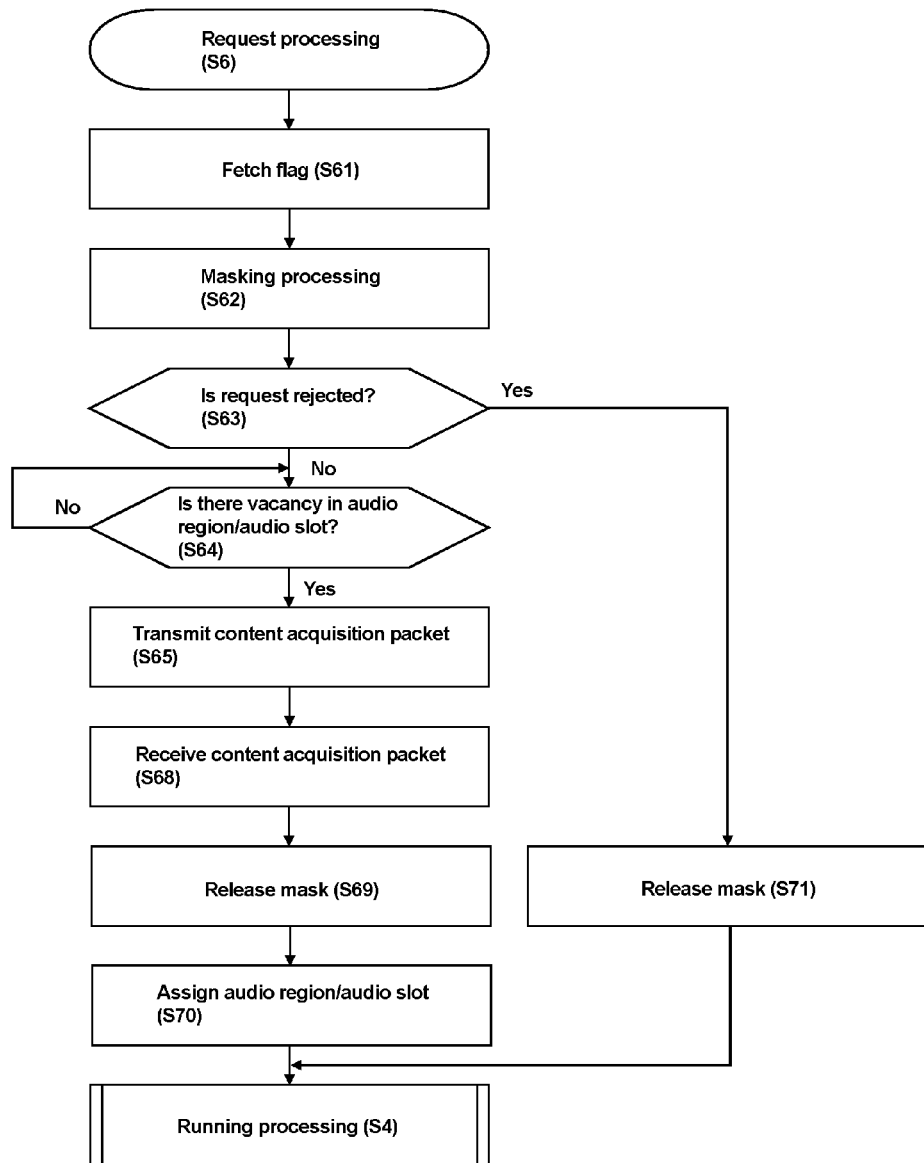
FIG. 28 is a flowchart of information processing by the control unit in request processing of the running processing of FIG. 22.

FIG. 28 is a flowchart of information processing by the CU 1A in the request processing (S6).

Figure 29:
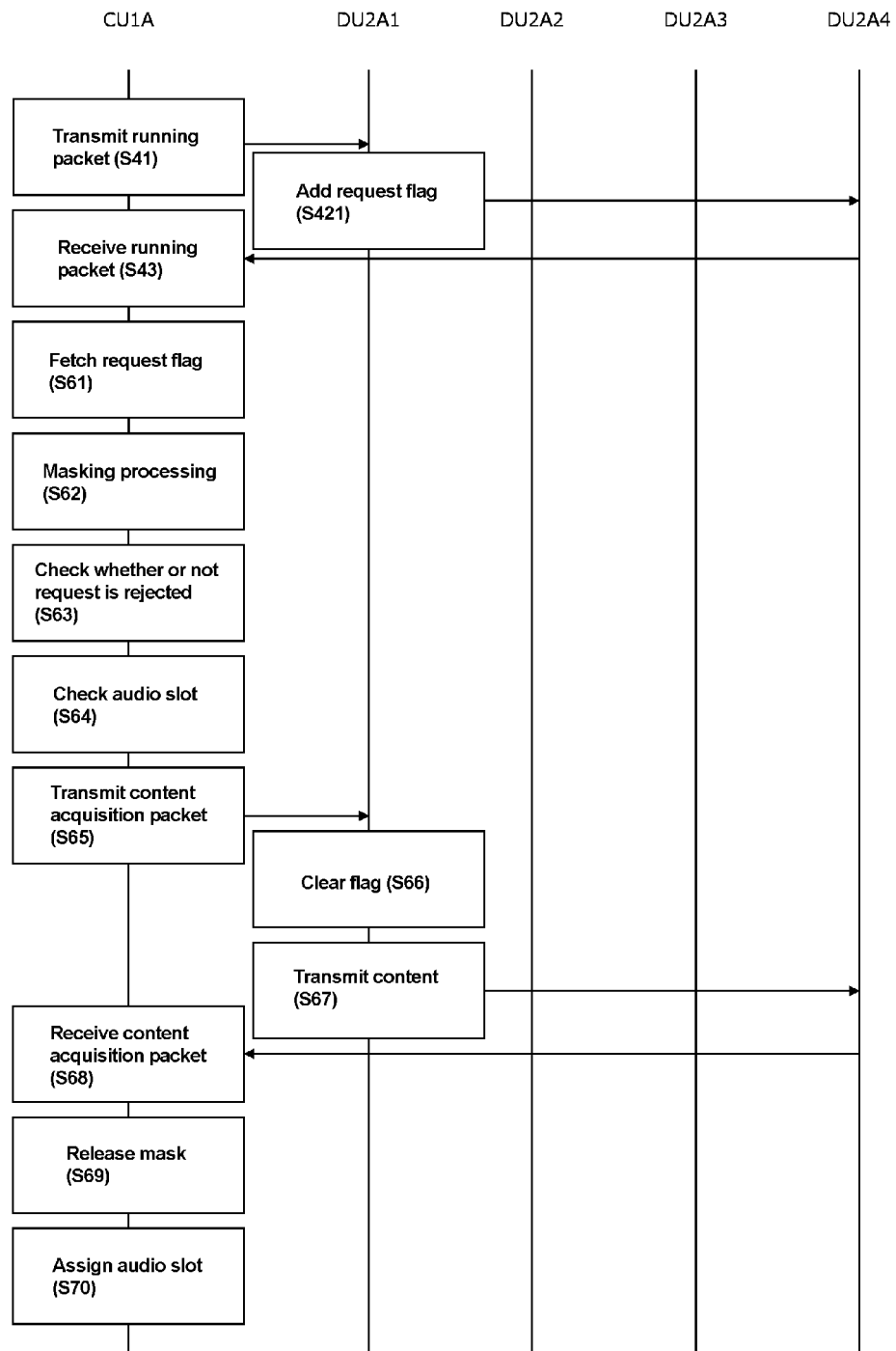
FIG. 29 is a sequence diagram of information processing by the conference system in the request processing of FIG. 28.

FIG. 29 is a sequence diagram of information processing by the conference system S in the request processing (S6). In the figure, only the sequences of the CU 1A and the DU 2A1 are shown for the convenience of description.

When the request flag is added to the running packet received by the CU 1A, the control portion 16 of the CU 1A fetches the request flag into a request flag register (storage portion 13) (S61). In this process, the control portion 16 performs the fetching of the request flag but does not perform transmission of a command to a DU 2. By this processing, the request flag is fetched into the register (storage portion 13) and therefore reception leakage (omission) of the speech request in the hardware is prevented.

Next, the control portion 16 executes masking processing of the bit corresponding to the fetched request flag (S62). By this processing, the request flag inside the request flag register becomes protected, that is, the request flag becomes unrewritable. Consequently, misdetection of the request flag is prevented.

Next, the control portion 16 checks whether or not there is a rejection of the request, for example, from the chairman or the system administrator, etc. (S63). If the request is rejected ("Yes" in S63), the control portion 16 releases the mask (S71).

If the request is not rejected ("No" in S63), the control portion 16 checks whether or not there is a vacancy in audio slot and audio region (S64). If there is a vacancy in audio slot and audio region ("Yes" in S64), the control portion 16 transmits an acquisition command, to acquire the content of the request, to the communication portion 11. The communication portion 11 transmits a content acquisition packet, carrying the acquisition command, to the DU 2A1 (S65).

The communication portion 21 of the DU 2A1 that received the content acquisition packet makes the content of the request (speech request) be carried by the content acquisition packet and transmits it to the CU 1A (S67). The DU 2A1 transmits the content of the request to the CU 1A and clears the request flag (turns of the bit for the request flag) (S66).

The clearing of the request flag may be performed by the CU 1 instead of by a DU 2.

The communication portion 11 receives the content acquisition packet (S68) and transmits the content of the request to the control portion 16. After acquisition of the content of the request, the control portion 16 releases the mask (S69) and assigns an audio slot and an audio region to the DU 2A1 (S70). Thereafter, the speech request from the DU 2A1 is permitted. The control portion 26 of the DU 2A1 switches the state of the communication portion 21 from the transmission disabled state to the transmission enabled state. That is, the DU 2A1 is put in the speech enabled state.

On the other hand, if there is no vacancy in audio slot and audio region ("No" in S64), the control portion 16 waits until there is a vacant audio slot and audio region (no processing is performed on the DU 2A1). At this point, the DU 2A1 is automatically put in the request waiting state. The state of the communication portion 21 of the DU 2A1 is the transmission disabled state.

After the processing of either assigning an audio slot and an audio region to the DU 2 (S70) or releasing of the mask (S71), the conference system S returns to the running processing (S4).

The conference system S thus fetches a speech request from a DU 2 by periodic processing of the request flag and makes the CU 1 transmit the content acquisition command to the DU 2 only when there is a vacant audio slot and audio region. That is, the conference system S does not transmit a command on each speech request. Therefore, with the conference system S, the information processing load does not become excessive even when speech requests are made from a plurality of DUs 2 at once.

Also, if there is no vacancy in audio slot and audio region, the DU 2 that made the speech request is automatically put in the request waiting state. Therefore, the conference system S is not required to accommodate all speech requests from the DUs 2 and the information processing load is lightened.

Further, speech requests from the DUs 2 are made not by a command but by processing of the bits of the request flag. A region of a packet occupied by the request flag may thus be set, for example, to a few bytes. Consequently, the information processing load of the conference system S for speech requests is lightened.

The flow of the request processing in the present invention is not restricted to that of the present embodiment. That is, for example, the check for a vacancy in audio slot and audio region (S64) may be executed after transmission and reception of the content acquisition packet.

Figure 30:
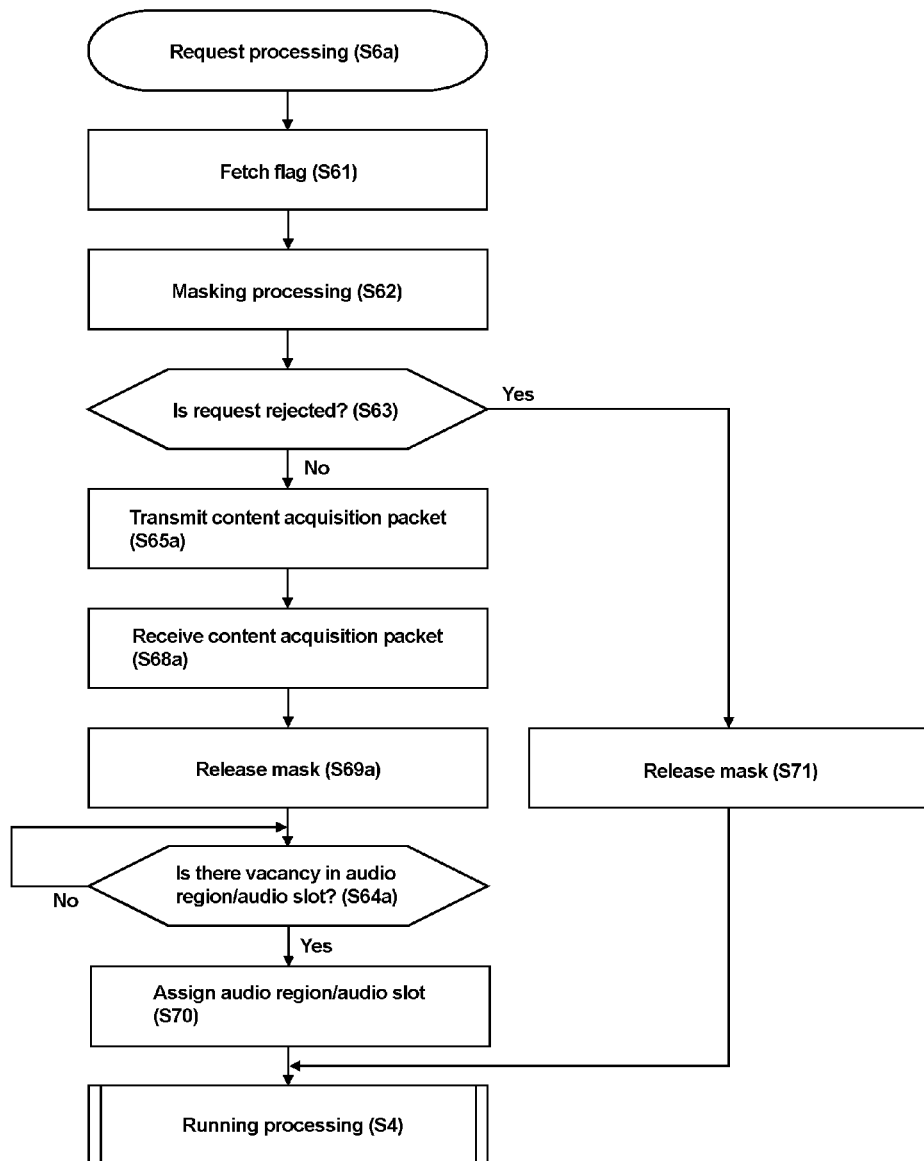
FIG. 30 is a flowchart of other information processing by the control unit in request processing of the running processing of FIG. 22.

FIG. 30 is a flowchart of other information processing by the CU 1A in the request processing.

The request processing (S6a) shown in the figure is the same as the request processing shown in FIG. 28 with the exception that the check for a vacancy in audio slot and audio region (S64a) is executed immediately before the assignment of an audio slot and an audio region (S70). That is, in the request processing (S6a) shown in the figure, the request flag fetching processing (S61), the masking processing (S62), the check processing of whether or not the request is rejected (S63), the processing in the case of rejection of the request ("Yes" in S63) (S71), and the audio slot and audio region assignment processing (S70) are the same as those in the request processing (S6) shown in FIG. 28.

If the request is not rejected ("No" in S63), the control portion 16 transmits the acquisition command to the communication portion 11. The communication portion 11 transmits the content acquisition packet, carrying the acquisition command, to the DU 2A1 (S65a).

The DU 2A1 that received the content acquisition packet clears the request flag (S66) and makes the content of the request (speech request) be carried by the content acquisition packet and transmits it to the CU 1A (S67).

The communication portion 11 receives the content acquisition packet (S68a) and transmits the content of the request to the control portion 16. After acquisition of the content of the request, the control portion 16 releases the mask (S69a) and performs a check for a vacancy in audio slot and audio region (S64a). If there is a vacancy in audio slot and audio region ("Yes" in S64a), the control portion 16 assigns the audio slot and the audio region to the DU 2A1 (S70). At this point, the DU 2A1 is put in the speech enabled state. On the other hand, if there is no vacancy in audio slot and audio region ("No" in S64a), the control portion 16 waits until there is a vacant audio slot and audio region.

The flow of the respective processing by the conference system according to the present invention is not restricted to that of the present embodiment. That is, for example, the conference system S may execute the respective processing not by series processing but by appropriate parallel processing.

Also, as described above, each of the various packets transmitted from the CU 1 to the DUs 2 includes the counter flag and the request flag. That is, the monitoring of the connection state of the DUs 2 by incrementing of the counter flag is always performed, regardless of whether or not there is a command, in the various packets transmitted from the CU 1 to the DUs 2. Also, the request flag can always be added to the various packets transmitted from the CU 1 to the DUs 2.

Operation of the Light Emitting Portion of a DU 2 in the Request Processing

The light emitting state of the light emitting portion 28 changes in accordance with the operation state of the DU 2 during the request processing (S6). That is, for example, the light emitting pattern of the DU 2 becomes the blinking pattern when the DU 2 is in the request waiting state (transmission disabled state) and becomes the lit pattern when the DU 2 is in the speech enabled state (transmission enabled state). Also, when a request from the DU 2 is rejected, only the first light emitting portion 28a of the light emitting portion 28 blinks at a shorter interval than in the blinking pattern in the request waiting state to notify only to the user that the request is rejected. The light emitting pattern of the light emitting portion 28 of the DU 2 without the request flag added exhibits the unlit pattern or the dimmer lit pattern. The light emitting portion 28 thus functions as a notification portion that visually notifies operation circumstances of the DU 2.

Operations of the Conference System Including a Plurality of CUs

Next, the operations of the conference system that includes a plurality of CUs 1 will be described.

Figure 31:
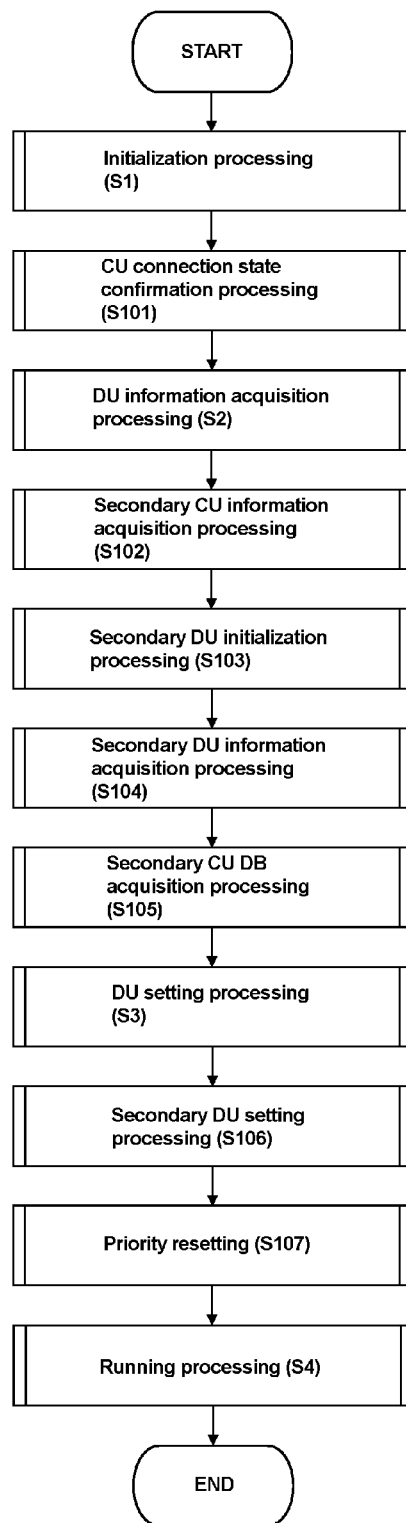
FIG. 31 is a flowchart of information processing by a conference system according to the present invention that includes a plurality of control units.

FIG. 31 is a flowchart of information processing by the conference system S that includes the plurality of CUs 1.

After the conference system S is started, the conference system S executes an initialization processing (S1), a CU connection state check processing (S101), a DU information acquisition processing (S2), a secondary CU information acquisition processing (S102), a secondary DU initialization processing (S103), a secondary DU information acquisition processing (S104), a secondary CU DB information acquisition processing (S105), a DU setting processing (D3), a secondary DU setting processing (S106), a priority resetting processing (S107), and a running processing (S4). A secondary CU is a CU 1 that is set as a secondary unit. A secondary DU is a DU 2 that is connected to a CU 1 that is set as a secondary unit.

The flow of the respective processing by the conference system according to the present invention is not restricted to that of the present embodiment. That is, for example, the conference system S may execute the respective processing not by series processing but by appropriate parallel processing.

In the following, a description will be provided with the CU 1A (referred to hereinafter as "primary CU"), the DUs 2A1 to 2A4 (referred to hereinafter as "primary DUs") connected to the primary CU, the CU 1B (referred to hereinafter as "secondary CU") connected to the primary CU, and the DUs 2B1 to 2B4 (referred to hereinafter as "secondary DUs") connected to the secondary CU of FIG. 1 as an example.

The primary DUs are ring-connected to the first terminal and the second terminal of the primary CU via a communication line. The secondary DUs are ring-connected to the first terminal and the second terminal of the secondary CU via a communication line. The secondary CU is connected to the third terminal of the primary CU.

The primary CU (CU 1A) is set as the primary unit, for example, by the system administrator, etc., changing CU unit information to be described below. The secondary CU (CU 1B) is set as the secondary unit, for example, by the system administrator, etc., changing the CU unit information to be described below. Control of the conference system S that includes the plurality of CUs is performed by the primary CU.

Initialization Processing

First, the conference system S executes the initialization processing (S1) of the primary DUs connected to the primary CU. The initialization processing (S1) is the same as the initialization processing (FIG. 12) described above.

CU Connection State Check Processing

Next, the conference system S executes the CU connection state check processing (S101). The CU connection state check processing (S101) is processing by which the connection mode and the number of connected units of other CUs 1 connected to a CU 1 are recognized. The CU connection state check processing (S101) is executed repeatedly during operation of the conference system S.

Figure 32:
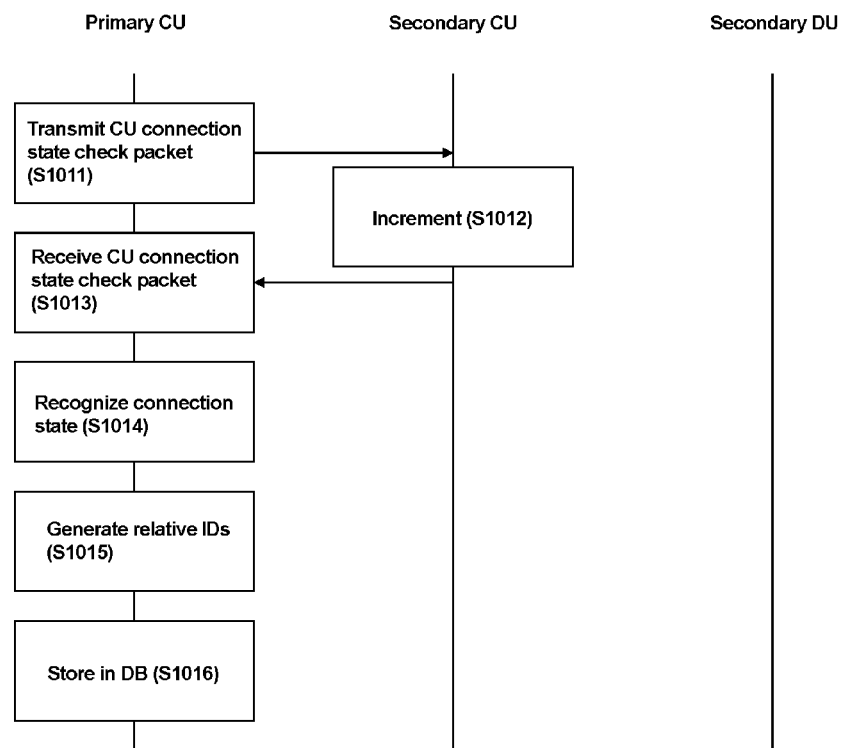
FIG. 32 is a sequence diagram of information processing by the conference system in CU connection state check processing of the information processing of FIG. 31.

FIG. 32 is a sequence diagram of information processing by the conference system S in the CU connection state check processing.

The control portion 16 of the primary CU transmits a CU connection state check command, to check the connection state of the CUs, to the communication portion 11 of the primary CU. The communication portion 11 of the primary CU transmits a CU connection state check packet, carrying the CU connection state check command, to the secondary CU from the third terminal (S1011). The control portion 16 of the primary CU resets the count value of the counter flag included in the packet transmitted to the secondary CU. The count value of the counter flag included in the packet transmitted from the CU 1A to the CU 1B is thus "0." The counter flag included in the packet transmitted from the CU 1A to the CU 1B is used to count the number of secondary CUs connected to the primary CU.

The control portion 16 of the secondary CU that received the CU connection state check packet increments the count value of the counter flag (S1012). The communication portion 11 of the secondary CU transmits the CU connection state check packet, including the incremented counter flag, to the primary CU.

The communication portion 11 of the primary CU receives the CU connection state check packet from the secondary CU via the third terminal (S1013).

The control portion 16 of the primary CU stores, in the storage portion 13 of the primary CU, the count value of the counter flag and other information included in the CU connection state check packet, received by the communication portion 11 of the primary CU.

The control portion 16 of the primary CU recognizes the connection state of the CUs 1 (S1014) in the same manner as in the above-described recognition (S17) of the connection state of the DUs 2. That is, for example, the control portion 16 of the primary CU recognizes, based on the count value of the counter flag, that one secondary CU is daisy-connected.

When the control portion 16 of the primary CU recognizes the connection state of the CUs 1, it generates relative IDs for the respective CUs 1 (S1015).

The control portion 16 of the primary CU stores the connection mode, the number of connected units, and the relative IDs of the CUs 1 in the unit connection information DB in the storage portion 13 of the primary CU (S1016).

The CU connection state check processing (S101) is repeatedly executed periodically during operation of the conference system S. That is, the CU connection state check packet is repeatedly transmitted and received periodically between the primary CU and each secondary CU. Each time it receives the connection state check packet from a secondary CU, the control portion 16 of the primary CU compares the newly acquired counter flag count value (referred to hereinafter as "new CU count value") with the count value stored in the storage portion 13 of the primary CU (referred to hereinafter as "old CU count value"). When the new CU count value matches the old CU count value, the control portion 16 of the primary CU judges that there is no change in the connection state of the CUs 1. On the other hand, when the new CU count value and the old CU count value are not matched (are mismatched), the control portion 16 of the primary CU judges that there is a change in the connection state of the CUs 1. The control portion 16 of the primary CU stores the new CU count value in the storage portion 13 of the primary CU. That is, the control portion 16 of the primary CU renews the old CU count value with the new CU count value.

When the secondary CU connection state changes, as when a connection abnormality occurs in a secondary CU or when a new secondary CU is connected, the comparison of the new CU count value and the old CU count value will result in a mismatch. When the comparison result is a mismatch, the control portion 16 of the primary CU renews the information stored in the unit connection information DB stored in the storage portion 13 with the newly recognized secondary CU connection state. Thus, when a connection abnormality occurs in a secondary CU, the primary CU immediately recognizes the occurrence of the connection abnormality and specifies the connection abnormality location. Also, when a change occurs in the secondary CU connection state, the primary CU renews the information stored in the unit connection information DB so that a problem in the synthesizing processing of audio information before and after the change in the connection state, etc., does not occur.

DU Information Acquisition Processing

Next, the conferencing system S executes the DU information acquisition processing (S2) on the primary DUs. The DU information acquisition processing (S2) is the same as the DU information acquisition processing (FIG. 17) described above.

Secondary CU Information Acquisition Processing

Next, the conferencing system S executes the secondary CU information acquisition processing (S102). The secondary CU information acquisition processing is processing by which CU unit information of each secondary CU is acquired. The CU unit information includes a serial number (absolute ID), MAC address, etc., of each CU 1.

Figure 33:
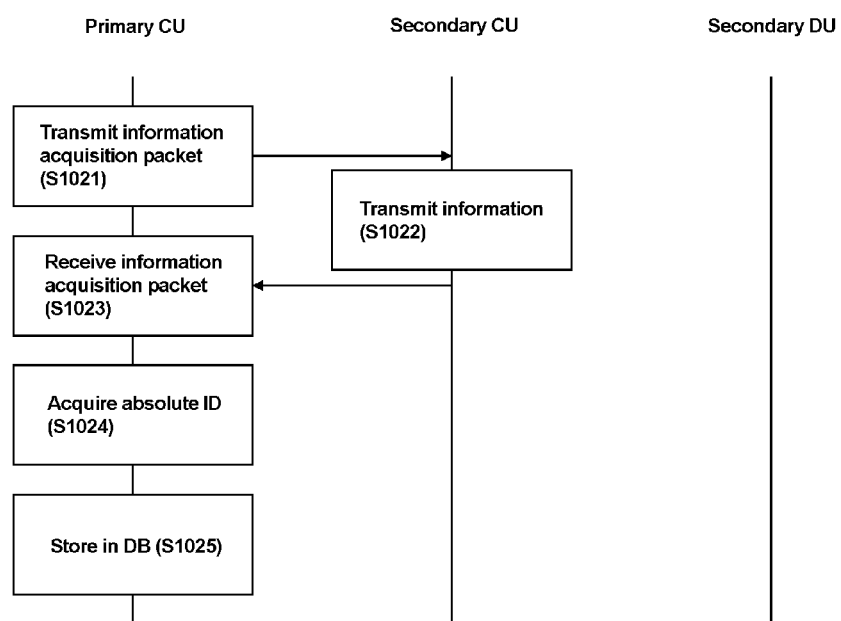
FIG. 33 is a sequence diagram of information processing by the conference system in secondary CU information acquisition processing of the information processing of FIG. 31.

FIG. 33 is a sequence diagram of information processing by the conference system S in the secondary CU information acquisition processing (S102).

The control portion 16 of the primary CU transmits an information acquisition command, to acquire the CU unit information of a secondary CU, to the communication portion 11 of the primary CU. The communication portion 11 of the primary CU transmits an information acquisition packet, carrying the information acquisition command, to the secondary CU (S1021).

The secondary CU that received the information acquisition command makes the CU unit information be carried by the information acquisition packet and transmits it to the primary CU in accordance with the information acquisition command (S1022).

The communication portion 11 of the primary CU receives the information acquisition packet from the secondary CU (S1023). The communication portion 11 of the primary CU transmits the CU unit information to the control portion 16 of the primary CU.

The control portion 16 acquires the absolute ID of the secondary CU from the CU unit information (S1024). The control portion 16 reads the unit connection information DB and stores the absolute ID and the relative ID in association in the unit connection information DB (S1025).

Secondary DU Initialization Processing

Next, the conference system S executes the secondary DU initialization processing (S103). The secondary DU initialization processing (S103) is processing by which the unit settings of the secondary DUs connected to each secondary CU are initialized and the connection state of the secondary DUs is recognized.

Figure 34:
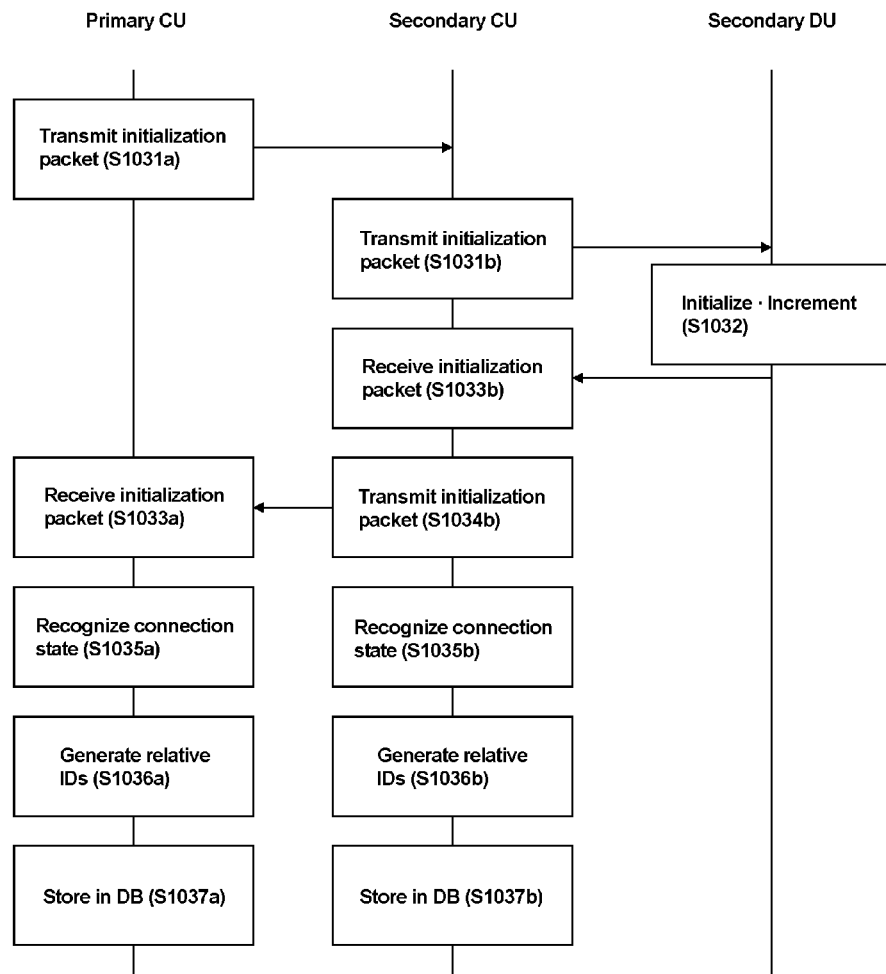
FIG. 34 is a sequence diagram of information processing by the conference system in secondary DU initialization processing of the information processing of FIG. 31.

FIG. 34 is a sequence diagram of information processing by the conference system S in the secondary DU initialization processing (S103).

The control portion 16 of the primary CU transmits an initialization command, to perform initialization of the secondary DUs, to the communication portion 11 of the primary CU. The communication portion 11 of the primary CU transmits an initialization packet carrying the initialization command from the third terminal to the secondary CU (S1031a).

The secondary CU that received the initialization packet transmits the initialization packet bidirectionally from each of the first terminal and the second terminal to the secondary DUs (S1031b). Each secondary DU initializes the unit settings in accordance with the initialization command and increments the count value of the counter flag (S1032). The secondary DUs transmit each initialization packet, with the count value of the counter flag incremented, to the secondary CU. As in the initialization processing (FIG. 12), each initialization packet is transmitted among the secondary DUs.

The communication portion 11 of the secondary CU receives each initialization packet from the secondary DUs via each of the first terminal and the second terminal (S1033b). The control portion 16 of the secondary CU stores, in the storage portion 13 of the secondary CU, the count value of the counter flag and other information included in the initialization packet received by the communication portion 11 of the secondary CU.

The control portion 16 of the secondary CU recognizes the connection state of the secondary DUs (S1035b) and generates relative IDs for the secondary DUs (S1036b). These relative IDs are IDs that the secondary CU uses to control the secondary DUs.

The control portion 16 of the secondary CU stores the connection mode, the number of units connected, and the relative IDs of the secondary DUs in association in the unit connection information DB in the storage portion 13 of the secondary CU (S1037b).

The communication portion 11 of the secondary CU transmits each received initialization packet to the primary CU (S1034b).

The communication portion 11 of the primary CU receives each initialization packet from the secondary CU via the third terminal (S1033a). The communication portion 11 of the primary CU transmits, to the control portion 16 of the primary CU, the count value of the counter flag and other information obtained from each received initialization packet. The control portion 16 of the primary CU stores the count value of the counter flag and other information in the storage portion 13 of the primary CU.

The control portion 16 of the primary CU recognizes the connection state of the secondary DUs (S1035a) and generates relative IDs for the secondary DUs (S1036a). These relative IDs are IDs that the primary CU uses to control the secondary DUs.

The control portion 16 of the primary CU stores the connection mode, the number of connected units, and the relative IDs of the secondary DUs in association in the unit connection information DB in the storage portion 13 of the primary CU (S1037a).

Secondary DU Information Acquisition Processing

Next, the conference system S executes the secondary DU information acquisition processing (S104). The secondary DU information acquisition processing (S104) is processing by which the unit information of the secondary DUs connected to the secondary CU is acquired.

Figure 35:
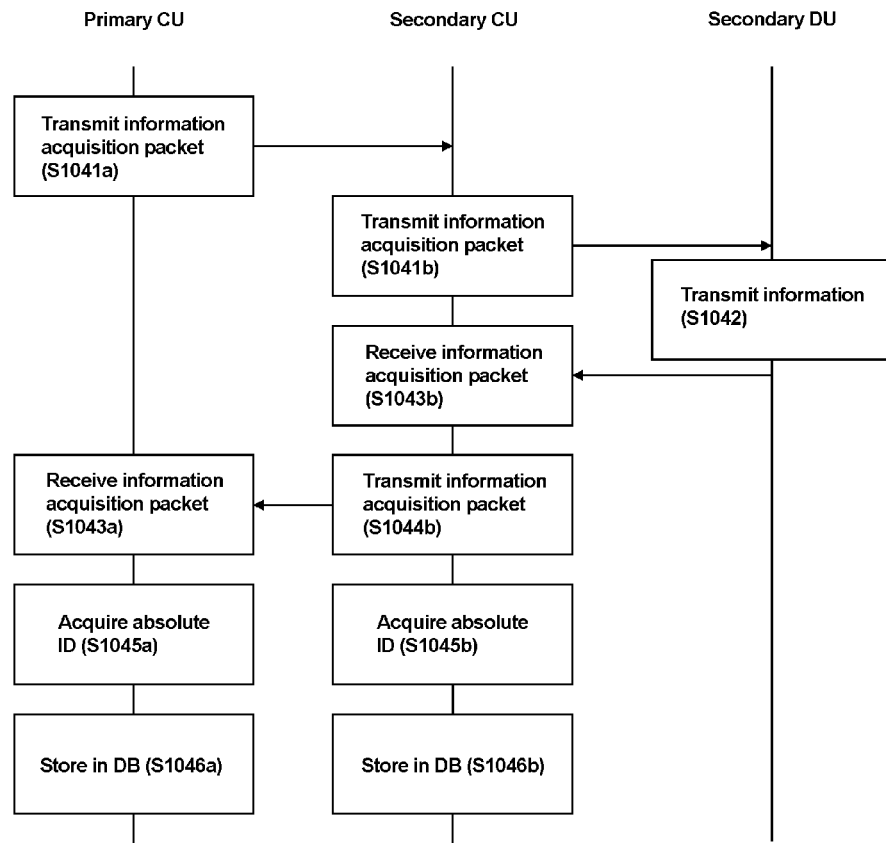
FIG. 35 is a sequence diagram of information processing by the conference system in secondary DU information acquisition processing of the information processing of FIG. 31.

FIG. 35 is a sequence diagram of information processing by the conference system S in the secondary DU information acquisition processing (S104).

The control portion 16 of the primary CU transmits an information acquisition command, to acquire the unit information of the secondary DUs, to the communication portion 11 of the primary CU. The communication portion 11 of the primary CU transmits an information acquisition packet, carrying the information acquisition command, to the secondary CU via the third terminal (S1041a).

The secondary CU that received the information acquisition packet transmits the information acquisition packet bidirectionally from each of the first terminal and the second terminal to the secondary DUs (S1041b). Each secondary DU makes the unit information be carried on each information acquisition packet and transmits it to the secondary CU in accordance with the information acquisition command (S1042). As in the DU information acquisition processing (FIG. 17), each information acquisition packet is transmitted among the secondary DUs.

The communication portion 11 of the secondary CU receives each information acquisition packet from the secondary DUs (S1043b).

The control portion 16 of the secondary CU acquires the absolute IDs of the secondary DUs from the unit information included in each information acquisition packet received by the communication portion 11 of the secondary CU (S1045b). The control portion 16 stores the absolute IDs and the relative IDs in association in the unit connection information DB in the storage portion 13 of the secondary CU (S1046b). That is, the control portion 16 of the secondary CU renews the association of the relative IDs and the absolute IDs in the secondary CU. Therefore, even if a change occurs in the connection state of the primary CU and the secondary CU, the secondary CU is capable of operation as a standalone unit. Consequently, a problem of information in the synthesizing processing of audio information before and after the change in the connection state of the secondary CU, etc., does not occur.

The communication portion 11 of the secondary CU transmits each information acquisition packet to the primary CU (S1044b).

The communication portion 11 of the primary CU receives each information acquisition packet from the secondary CU via the third terminal (S1043a).

The control portion 16 of the primary CU acquires the absolute IDs from the unit information included in each information acquisition packet received by the communication portion 11 of the primary CU (S1045a). The control portion 16 of the primary CU stores the absolute IDs and the relative IDs in association in the unit connection information DB in the storage portion 13 of the primary CU (S1046a).

FIG. 36 is a diagram of an example of information stored in the storage portion 13 of the primary CU after the secondary DU information acquisition processing. The figure shows that the relative IDs "5," "6," "7," and "8" of the four DUs 2 that are ring-connected to the terminal Nos. "1" and "2" (ID: "2") of the secondary CU are respectively associated with the absolute IDs "E," "F," "G," and "H." The figure shows that the relative ID "1" of the single CU 1 that is daisy connected to the terminal No. "3" is associated with the absolute ID "B."

DB Information Acquisition Processing of the Secondary CU

Next, the conference system S executes the secondary CU DB information acquisition processing (S105). The secondary CU DB information acquisition processing (S105) is processing by which the primary CU acquires the unit setting information of the secondary DUs stored in the unit setting information DB stored in the secondary CU.

Figure 37:
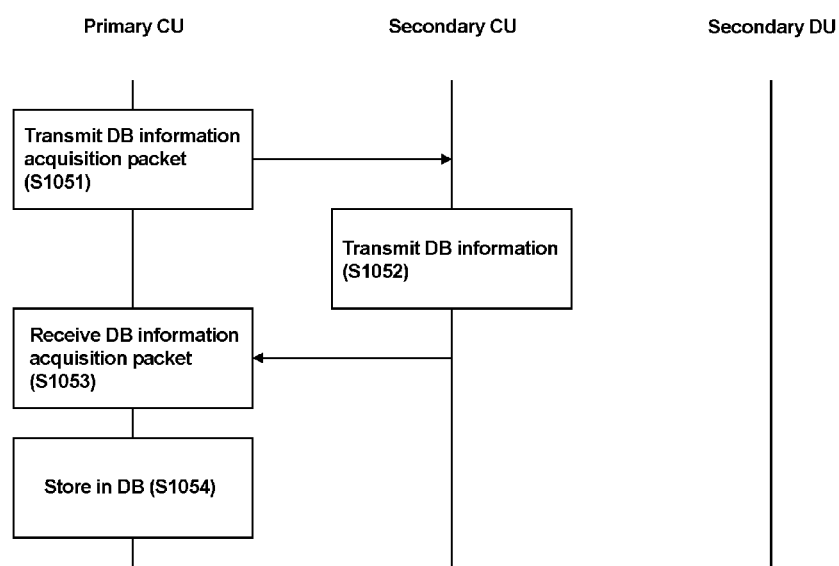
FIG. 37 is a sequence diagram of information processing by the conference system in secondary CU DB information acquisition processing of the information processing of FIG. 31.

FIG. 37 is a sequence diagram of information processing by the conference system S in the secondary CU DB information acquisition processing (S105).

The control portion 16 of the primary CU transmits a DB information acquisition command, to acquire the unit setting information of the secondary CU, to the communication portion 11 of the primary CU. The communication portion 11 of the primary CU transmits a DB information acquisition packet, carrying the DB information acquisition command, to the secondary CU via the third terminal (S1051).

The control portion 16 of the secondary CU reads the unit setting information DB from the storage portion 13 of the secondary CU and transmits the unit setting information of the secondary DUs, designated by the primary CU, to the communication portion 11 of the secondary CU. The communication portion 11 of the secondary CU transmits the DB information acquisition packet, carrying the unit setting information of the secondary DUs, to the primary CU (S1052).

The communication portion 11 of the primary CU receives the DB information acquisition packet from the secondary CU via the third terminal (S1053). The communication portion 11 of the primary CU transmits the unit setting information of the secondary DUs, obtained from the received DB information acquisition packet, to the control portion 16 of the primary CU.

The control portion 16 of the primary CU stores, in the unit setting information DB in the storage portion 13 of the primary CU, the unit setting information of the secondary DUs included in the DB information acquisition packet received by the communication portion 11 of the primary CU (S1054). By this processing, the primary CU can specify the unit setting information of the secondary DUs stored in the secondary CU.

DU Setting Processing

Next, the conference system S executes the DU setting processing (S3) on the primary DUs connected to the primary CU. The DU setting processing (S3) is the same as the DU setting processing (FIG. 20) described above.

Secondary DU Setting Processing

Next, the conference system S executes the secondary DU setting processing (S106). The secondary DU setting processing (S106) is processing by which the setting of secondary DUs connected to the secondary CU is performed.

Figure 38:
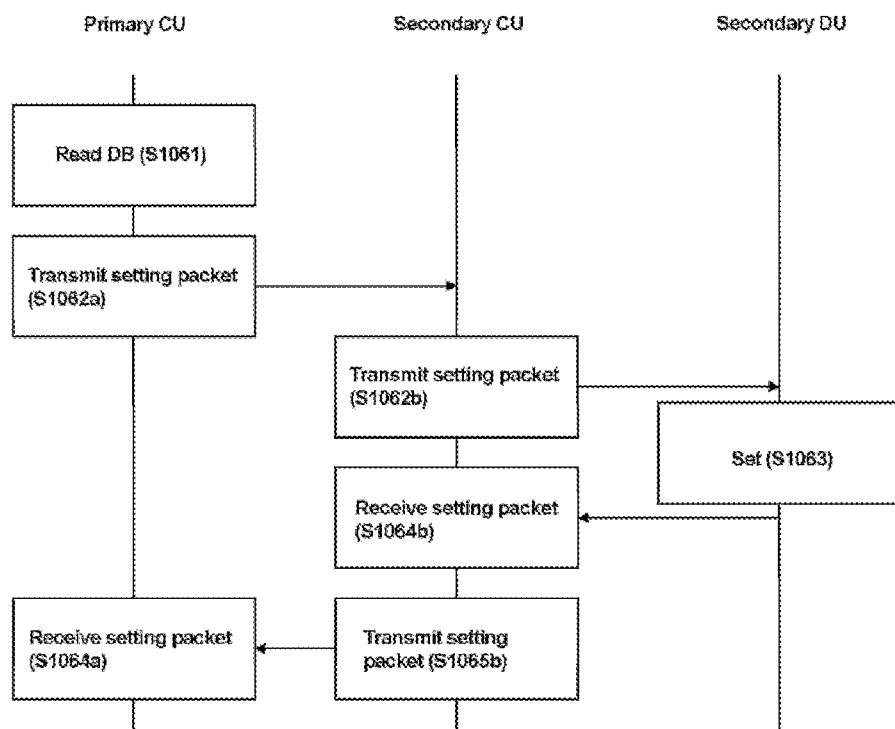
FIG. 38 is a sequence diagram of information processing by the conference system in secondary DU setting processing of the information processing of FIG. 31.

FIG. 38 is a sequence diagram of information processing by the conference system S in secondary DU setting processing (S106).

The control portion 16 of the primary CU reads the unit setting information DB from the storage portion 13 of the primary CU (S1061) and transmits a unit setting command, to perform the setting of secondary DUs, to the communication portion 11 of the primary CU. The communication portion 11 of the primary CU transmits a setting packet, carrying the unit setting command, to the secondary CU (S1062a).

The secondary CU that received the setting packet transmits the setting packet to the secondary DUs (S1062b). The secondary DUs that received the setting packet change the unit settings in accordance with the unit setting command (S1063).

The communication portion 11 of the secondary CU receives the setting packet from the secondary DUs that executed the change of unit settings (S1064*b*).

The communication portion 11 of the secondary CU transmits the received setting packet to the primary CU (S1065*b*).

The communication portion 11 of the primary CU receives the setting packet from the secondary CU (S1064*a*).

Priority Resetting Processing

Next, the conference system S executes the priority resetting processing (S107). The priority resetting processing (S107) is processing by which resolution of an inconsistent state, occurring between the priority settings of the respective CUs 1 and the priority settings of the entire conference system S when a change occurs in the connection state of the CUs 1 to each other (when the new CU count value and the old CU count value become mismatched), is performed automatically. An inconsistent state is a state where the number of DUs 2 for which the priority is set is the same as the maximum number of units enabling speech or is greater than the maximum number of units enabling speech. That is, for example, an inconsistent state is a state where, when the maximum number of units enabling speech in the entire conference system S is five, the number of DUs 2 for which the priority is set in the entire conference system S is seven. This inconsistent state may occur, for example, when a CU 1, with the priority being set for three DUs 2, is connected to a CU 1, with the priority being set for four DUs 2.

Figure 39:
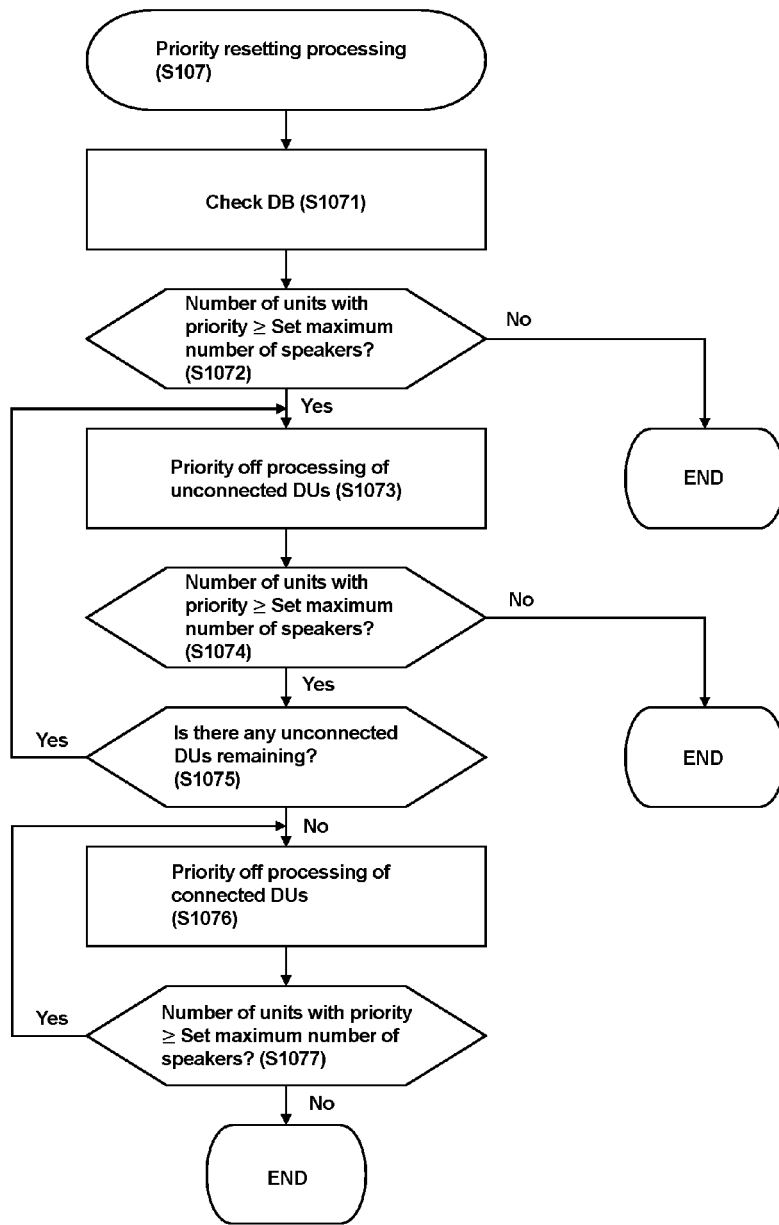
FIG. 39 is a flowchart of information processing by the control units in priority resetting processing of the control units included in the conference system of FIG. 31.

FIG. 39 is a flowchart of information processing by the CUs 1 in the priority resetting processing of the CUs 1 included in the conference system S.

The control portion 16 of the primary CU reads the unit setting information DB from the storage portion 13 of the primary CU (S1071). The control portion 16 of the primary CU references the unit setting information DB and compares the number of DUs 2 for which the priority is set (referred to hereinafter as "number of priority-set units") and the set maximum number of speakers of the entire conference system S that is set in the primary CU (S1072).

When the number of priority-set units is greater than or equal to the set maximum number of speakers ("Yes" in S1072), the control portion 16 of the primary CU turns off, for one unit at a time, the priority setting of the currently unconnected DUs (referred to hereinafter as unconnected DUs) 2 among the DUs 2 for which the unit setting information is stored in the unit setting information DB (S1073). The processing of turning off the priority settings of the unconnected DUs 2 is executed in an order starting from the DUs 2, with the unit setting information stored in the unit setting information DB of the CU 1 with the relative ID of larger numerical value (the CU 1B in the present embodiment). That is, the processing (renewal of the priority) of the secondary DUs that are connected to the secondary CU is given precedence over the processing (renewal of the priority) of the primary DUs that are connected to the primary CU.

When the number of priority-set units is less than the set maximum number of speakers ("No" in S1072), the conference system S ends the priority resetting processing (S107).

Next, the control portion 16 of the primary CU compares the number of priority-set units and the set maximum number of speakers (S1074). When the number of priority-set units is greater than or equal to the set maximum number of speakers ("Yes" in S1074), the control portion 16 of the primary CU checks (specifies) the remaining number of unconnected DUs 2 (S1075). If there is any unconnected DUs 2 remaining ("Yes" in S1075), the control portion 16 of the primary CU continues the processing of turning off the priority settings of the unconnected DUs 2 (S1073).

If there is no unconnected DUs 2 remaining ("No" in S1075), the control portion 16 of the primary CU turns off, for one unit at a time, the priority settings of the currently connected DUs (referred to hereinafter as "connected DUs") 2 (S1076). The processing of turning off the priority settings of the connected DUs 2 is executed in an order starting from the DU 2 with the relative ID of larger numerical value among the DUs 2 connected to the CU 1 with the relative ID of larger numerical value.

Next, the control portion 16 of the primary CU compares the number of priority-set units and the set maximum number of speakers (S1077). When the number of priority-set units is greater than or equal to the set maximum number of speakers ("Yes" in S1077), the control portion 16 of the primary CU continues the processing of turning off the priority settings of the connected DUs 2 (S1076).

When the number of priority-set units has become less than the set maximum number of speakers ("No" in S1074 and "No" in S1077), the control portion 16 of the primary CU renews the unit setting information stored in the unit setting information DB in the storage portion 13 of the primary CU. In conjunction with the renewal of the unit setting information stored in the unit setting information DB in the storage portion 13 of the primary CU, the control portion 16 of the secondary CU renews the unit setting information stored in the unit setting information DB in the storage portion 13 of the secondary CU. Consequently, the priority setting of each DU 2 stored in the storage portion 13 of each CU 1 is renewed. The conference system S ends the priority resetting processing (S107).

The conference system S thus changes the priority settings of the DUs 2 automatically when there is a change in the connection state of the CUs 1 to each other. In other words, when the new CU count value and the old CU count value are mismatched, the conference system S renews the priority setting of each speech-enabled DU 2. Therefore, with the conference system according to the present invention, the abovementioned inconsistent state does not occur. Also, the conference system S makes it unnecessary for the system administrator to perform priority setting in accordance with the connection state of the CUs 1 to each other. The load of priority resetting by the system administrator is thus lightened.

Also, the priority resetting processing may be of a mode that is executed when the number of connected units of secondary CUs is decreased in the CU connection state check processing, that is, when the number of connected units of secondary CUs stored in the storage portion 13 of the primary CU (old CU count value) is greater than (mismatched with) the newly recognized number of connected units of secondary CUs (new CU count value). That is, for example in the priority resetting processing, processing may be performed so that when the number of connected units of secondary CUs decreases, the number of DUs 2 for which the priority is set is the same before and after the change of the number of connected units. Specifically, in the priority resetting processing, processing may be performed so that with the priority rights of the primary DUs stored in the storage portion 13 of the primary CU, the priority ranking of the prior right is raised (or the priority setting is turned on) for a portion of the primary DUs.

Also in the priority resetting processing, processing may be performed so that with the priority rights of the primary DUs stored in the storage portion 13 of the primary CU, the priority ranking of the prior right is lowered (or the priority setting is turned off) for a portion of the primary DUs when an increase of the number of connected units of secondary CUs is checked in the CU connection state check processing. That is, in the priority resetting processing, processing may be performed so that when the number of connected units of secondary CUs stored in the storage portion 13 of the primary CU (old CU count value) is less than (mismatched with) the newly recognized number of connected units of secondary CUs (new CU count value), the priority ranking of the priority right is lowered (or the priority setting is turned off) for a portion of the primary DUs instead of lowering the priority ranking of the priority right starting from the secondary DUs as described above.

Running Processing

Next, the conference system S executes the running processing (S4). With the exception that the primary CU manages the connection states of the secondary CU and the secondary DUs, the audio information of the secondary DUs, etc., the running processing (S4) is the same as the running processing (FIG. 22) described above. That is, the primary CU repeatedly transmits and receives a running packet to and from the primary DUs and repeatedly transmits and receives a running packet to and from the secondary CU via the secondary CU. In this process, the secondary CU repeatedly transmits and receives the running packet to and from the secondary DUs.

Conference Mode

The conference system S includes conference modes. Each conference mode is information (combination information) specifying a combination of the respective setting contents of the setting items "Override," "Mic on trigger (priority set)," and "Mic on trigger (priority not set)" among the various setting items that define the operations of the conference system S. In other words, the conference system S specifies the combination of the respective setting contents of override, mic on trigger (priority set), and mic on trigger (priority not set) based on the conference mode. Each of the setting items will be described below.

FIG. 40 is a schematic diagram of an example of the conference modes.

This figure shows that the conference system S includes the three conference modes of "Free conversation mode," "Request talk mode," and "Full remote mode." The figure shows the combination of the respective setting contents of the override, the mic on trigger (priority set), and the mic on trigger (priority not set) of each conference mode.

The figure shows that, for example, in the case of the conference mode "Free conversation mode," any of "Off" "On/FIFO," and "On/LIFO" is selectable as the setting content of the setting item "Override." Also, the figure shows that, for example, in the case of the conference mode "Request talk mode," either of "Manual trigger" and "Automatic trigger" is selectable as the setting content of the setting item "Mic on trigger (priority set)." Yet further, the figure shows that, for example, in the case of the conference mode "Full remote mode," the setting item "Mic on trigger (priority not set)" cannot be set. The respective setting contents of each of the setting items shown in the figure will be described below.

Before selection of the conference mode, the conference system S stores information, indicating combinations of information specifying the conference modes shown in FIG. 40 and the setting contents of the respective setting contents, in advance in the storage portion 13 of the CU 1. The conference system S references the storage portion 13 based on information specifying the conference mode that is input from the operating station 4 by operation by the system administrator, etc., that is, based on the combination information to specify the respective setting contents of "Override," "Mic on trigger (priority set)," and "Mic on trigger (priority not set)" corresponding to the conference mode. That is, the storage portion 13 stores the combination information and the information specifying the setting contents of each of the setting items in association.

The Setting Item "Override"

The override is a setting item related to an assignment mode that determines "On" or "Off" of the override in the assignment of audio slot and audio region to a DU 2 with the request flag added.

The override is processing by which, when a speech request is made (when the request flag is added to a running packet) in a state where there is no vacancy in audio slot and audio region, an audio slot and an audio region are assigned to a DU 2 making the speech request without waiting for the end of speech at a DU 2 that is already assigned an audio slot and an audio region. The override includes assignment modes when it is "On" and an assignment mode when it is "Off." When the override is "On," processing in accordance with one of either of the assignment modes of FIFO (First In First Out) and LIFO (Last In First Out) is performed in the override.

FIFO is an assignment mode where the assignment of audio slot and audio region is removed from a DU 2, which has been permitted speech first among the DUs 2, each already assigned an audio slot and an audio region. In FIFO, the DUs 2 that are respectively assigned an audio slot and an audio region are successively removed of the assignment of audio slot and audio region.

LIFO is an assignment mode where the assignment of audio slot and audio region is removed from a DU 2, which has been permitted speech last among the DUs 2, each already assigned an audio slot and an audio region. In LIFO, only the DU 2 that was assigned the last vacant audio slot and audio region among the audio slots and audio regions (that was permitted for speech at the immediately previous timing) is replaced.

On the other hand, the assignment mode when the override is "Off" is an assignment mode where the assignment of audio slot and audio region is removed from a DU 2 at which speech is ended among the DUs 2, each already assigned an audio slot and an audio region. That is, a DU 2 at which a speech request is made waits for the end of speech at a DU 2 (referred to as "a") that is already assigned an audio slot and an audio region and is thereupon assigned the audio slot and the audio region assigned to the DU 2(*a*) at which speech is ended. That is, the request processing (FIG. 28) described above is processing that is executed when the override is "Off."

Information (referred to hereinafter as "assignment mode information) that specifies an assignment mode among the plurality of assignment modes is stored in association with the combination information in the storage portion 13. For example, the conference mode "Free conversation mode" is associated with the assignment modes respectively corresponding to the setting contents "Off," "On/FIFO," and "On/LIFO" of the setting item "Override." The assignment mode information is information included in the control information described above. That is, for example, if the setting content "On/FIFO" is selected for the setting item "Override," the conference system S assigns an audio slot and an audio region to a DU 2, at which a speech request is made, in accordance with the assignment mode where the assignment of audio slot and audio region is removed successively.

The Setting Item "Mic on Trigger"

The mic on trigger is a mode related to the setting of the trigger for adding the request flag to the running packet (for making a speech request), that is, a mode related to the request flag addition mode. The mic on trigger includes the setting item "Mic on trigger (priority set)" for a DU (referred to hereinafter as "priority-set DU") 2p for which the priority is set and the setting item "Mic on trigger (priority not set)" for a DU (referred to hereinafter as "priority-not-set DU") 2n for which the priority is not set. The mic on trigger is a trigger for turning on the microphone 3 mounted on a DU 2 and includes the two addition modes of "Manual trigger" and "Automatic trigger." With the mic on trigger, one of either of the addition modes of "Manual trigger" and "Automatic trigger" is selected.

Information (referred to hereinafter as "addition mode information) that specifies an addition mode among the plurality of assignment modes is stored in association with the combination information in the storage portion 13. For example, the conference mode "Request talk mode" is associated with the addition mode corresponding to the setting content "Manual trigger" of the setting item "Mic on trigger (priority set)." The addition mode information is information included in the control information described above. The addition mode information is stored in association with the assignment mode information in the storage portion 13.

The Conference Mode "Free Conversation Mode"

The free conversation mode is a conference mode in which the users of DUs 2, each with an audio slot assigned, is enabled to speak freely. An audio slot and an audio region are always assigned to a priority-set DU 2p. To a priority-not-set DU 2n, an audio slot and an audio region are assigned in accordance with the selected assignment mode. In the free conversation mode, an audio slot and an audio region are assigned automatically and therefore a situation of rejection of a speech request does not occur. The operating station 4 is thus not necessarily required in the free conversation mode.

In the free conversation mode, one of the three setting contents of "Off," "On/FIFO," and "On/LIFO" is selected for the setting item "Override."

In the free conversation mode, the setting item "Mic on trigger" is set individually for each DU 2. That is, for example, a DU 2 with which the manual trigger is selected and a DU 2 with which the automatic trigger is selected may coexist.

The Conference Mode "Request Talk Mode"

The request talk mode is a conference mode in which a speech request is made by a manual trigger at a priority-not-set DU 2n. An audio slot and an audio region are always assigned to a priority-set DU 2p. For a priority-not-set DU 2n, selection between permitting and rejecting a speech request is made based on a request from the operating station 4.

In the request talk mode, the setting content "Off" cannot be selected for the setting item "Override." That is, in the request talk mode, one of either "On/FIFO" or "On/LIFO" is selected as the setting content of the override.

For the setting item "Mic on trigger" in the request talk mode, only the manual trigger is selected as the setting of a priority-not-set DU 2n.

The Conference Mode "Full Remote Mode"

The full remote mode is a conference mode in which speech by a priority-not-set DU 2n becomes enabled by operation from the operating station 4. With a priority-set DU 2p, an audio slot and an audio region are always assigned. With a priority-not-set DU 2n, speech is permitted based on a request from the operating station 4.

In the full remote mode, the setting content "Off" cannot be selected for the setting item "Override." That is, in the full remote mode, one of either "On/FIFO" or "On/LIFO" is selected as the setting content of the override.

For the setting item "Mic on trigger" in the full remote mode, the setting of the trigger cannot be performed for a priority-not-set DU 2n.

Operations of the Conference System based on the Conference Mode

Next, operations of the conference system based on the conference mode will be described. The conference system S operates based on the assignment mode of audio slot and audio region for each DU 2 and the request flag addition mode that are determined in accordance with the conference mode selected from among the plurality of conference modes.

Figure 41:
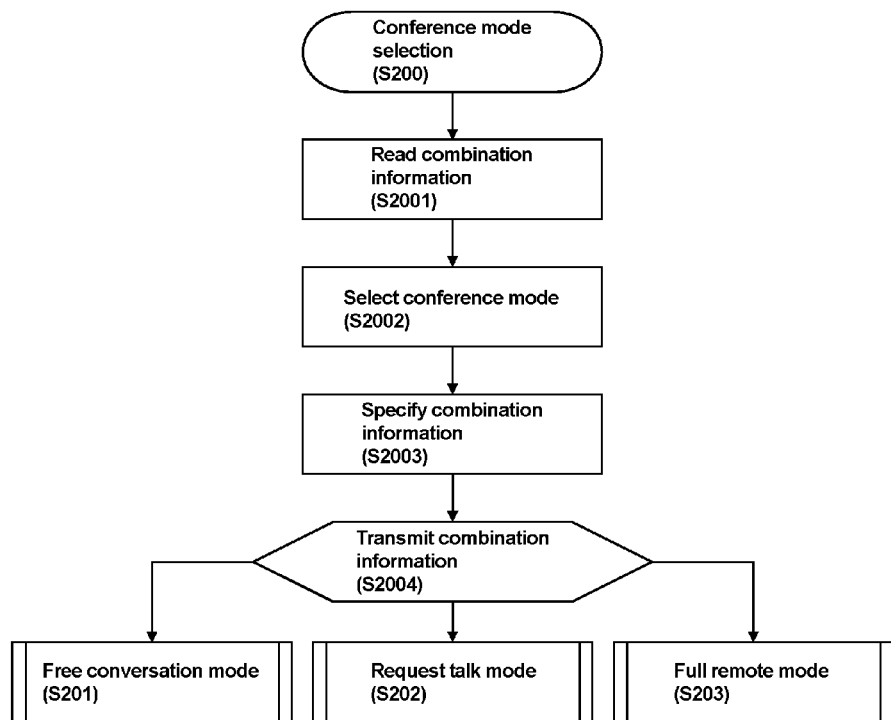
FIG. 41 is a flowchart of information processing in selection of the conference mode of the conference system of FIG. 1.

FIG. 41 is a flowchart of information processing in conference mode selection (S200).

The conference mode selection (S200) is executed, for example, between the DU information acquisition processing (FIG. 17 and FIG. 18) and the DU setting processing (FIG. 20 and FIG. 21) in the information processing executed by the conference system S described above.

First, by operation by the system administrator, etc., the operating station 4 reads the combination information from the storage portion 13 of the CU 1 (primary CU) connected to the operating station 4 and stores the information in the storage portion 43 (S2001).

Next, the conference mode is selected (S2002). That is, for example, via a preparation screen to be described below, the operating station 4 makes one conference mode be selected from among the free conversation mode (S201), the request talk mode (S202), and the full remote mode (S203) by the system administrator, etc., based on the conference contents, etc. The control portion 46 of the operating station 4 specifies, from among the plurality of combination information stored in the storage portion 43, the combination information that is in accordance with the selected conference mode (S2003). Here, for example, when the conference mode "Free conversation mode" shown in FIG. 40 is selected, the control portion 46 of the operating station 4 makes the display portion 44 display a screen by which the system administrator, etc., makes a selection from among "Off," "On/FIFO," and "On/LIFO" as the setting content of the setting item "Override" for each DU 2. Similarly, the control portion 46 of the operating station 4 makes the display portion 44 display a screen by which the system administrator, etc., make selections from between "Manual trigger" and "Automatic trigger" as the setting contents of the setting items "Mic on trigger (priority set)" and "Mic on trigger (priority not set)" for each DU 2. By the screen displayed on the display portion 44 being operated, the assignment mode of audio slot and audio region for each DU 2 and the request flag addition mode are determined. The communication portion 41 of the operating station 4 transmits the determined assignment mode of audio slot and audio region for each DU 2 and request flag addition mode as the specified combination information to the CU 1 (S2004). The CU 1 stores the combination information, received from the operating station 4, as the unit setting information for each DU 2 in the storage portion 13 (in regard to a DU 2 for which the unit setting information is stored already, the unit setting information stored in the storage portion 13 is renewed). Based on the renewed unit setting information, the CU 1 executes the above-described DU setting processing (FIGS. 20 and 21) to change the unit setting of each DU 2. Consequently, the conference system S operates based on the selected conference mode.

When the Conference Mode is "Free Conversation Mode"

As described above, each DU 2 makes a speech request based on the individually set mic on trigger.

Figure 42:
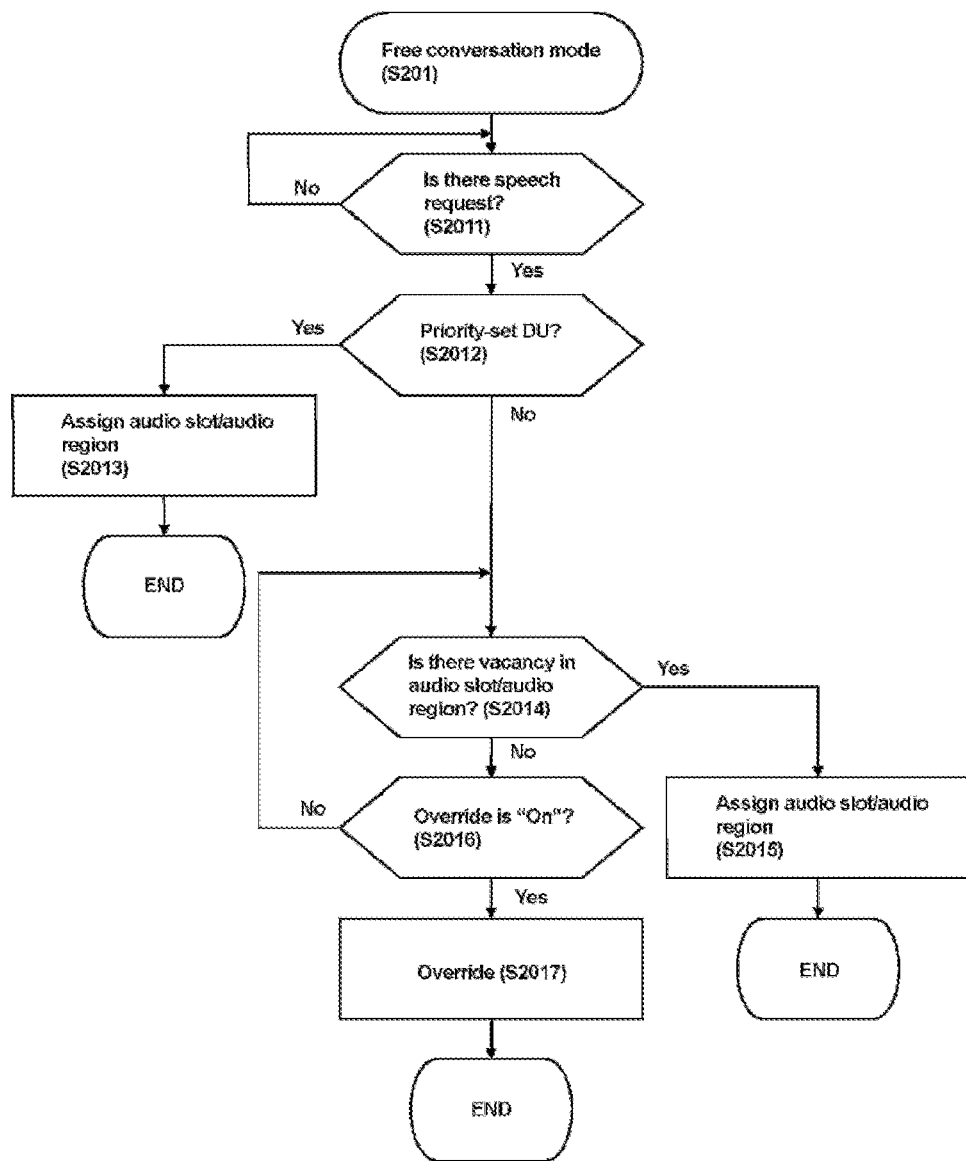
FIG. 42 is a flowchart of information processing by a control unit in a free conversation mode among the conference modes of FIG. 41.

FIG. 42 is a flowchart of information processing by the CU 1 in the free conversation mode.

First, the control portion 16 of the CU 1 waits for a speech request from the DU 2 ("No" in S2011). When there is a speech request from a DU 2 ("Yes" in S2011), the control portion 16 of the CU 1 checks whether the DU 2 that made the speech request is a priority-set DU 2p or a priority-not-set DU 2n (S2012).

When the DU 2 that made the speech request is a priority-set DU 2p ("Yes" in S2012), the control portion 16 of the CU 1 assigns a predetermined audio slot and audio region to the priority-set DU 2p (S2013).

When the DU 2 that made the speech request is a priority-not-set DU 2n ("No" in S2012), the control portion 16 of the CU 1 checks for a vacancy in audio slot and audio region (S2014).

When there is a vacancy in audio slot and audio region ("Yes" in S2014), the control portion 16 of the CU 1 assigns the vacant audio slot and audio region to the priority-not-set DU 2n (S2015).

When there is no vacancy in audio slot and audio region ("No" in S2014), the control portion 16 of the CU 1 checks the override setting content of the priority-not-set DU 2n (S2016).

When the override setting content is "On" ("Yes" in S2016), the control portion 16 of the CU 1 forcibly assigns an audio slot and an audio region to the priority-not-set DU 2n (performs override) in accordance with the setting content of either FIFO or LIFO (S2017).

When the override setting content is "Off" ("No" in S2016), the control portion 16 of the CU 1 checks for a vacancy in audio slot and audio region again (S2014). During this time, the priority-not-set DU 2n is put in a speech waiting state (request waiting state) until an audio slot and an audio region become vacant.

When the Conference Mode is "Request Talk Mode"

As described above, in the request talk mode, the mic on trigger of a priority-not-set DU 2n is set in advance to the manual mode. The mic on trigger of a priority-set DU 2p is set in advance to one of either the automatic mode or the manual mode.

Figure 43:
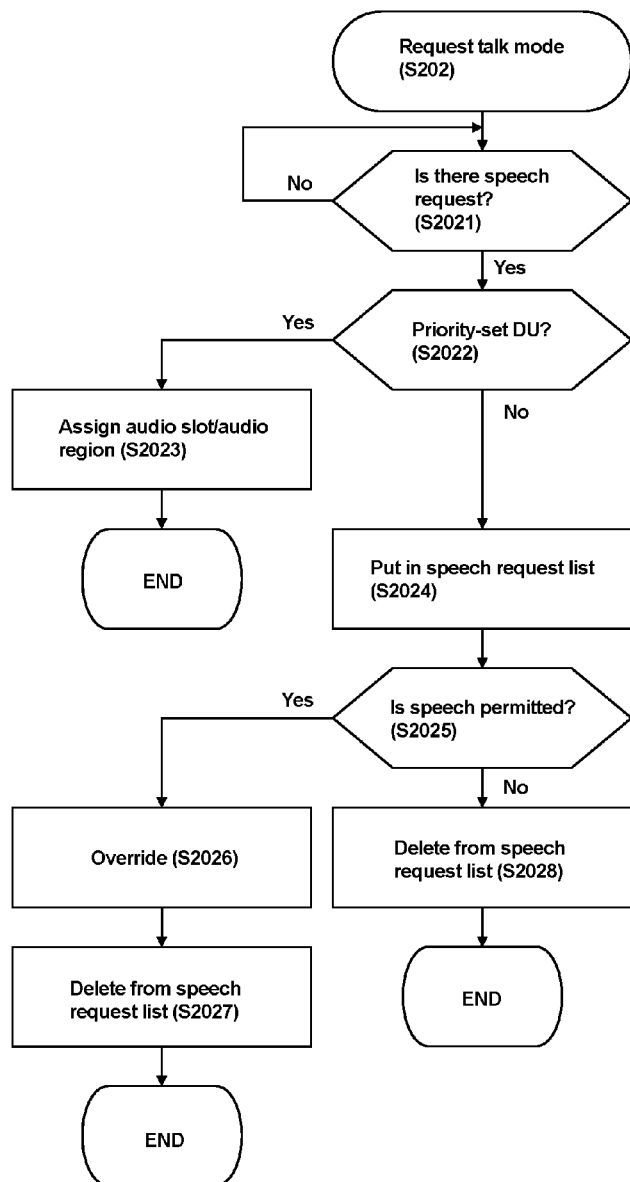
FIG. 43 is a flowchart of information processing by the control unit in a request talk mode among the conference modes of FIG. 41.

FIG. 43 is a flowchart of information processing by the CU 1 in the request talk mode.

The control portion 16 of the CU 1 waits for a speech request from the DU 2 ("No" in S2021). When there is a speech request from a DU 2 ("Yes" in S2021), the control portion 16 of the CU 1 checks whether the DU 2 that made the speech request is a priority-set DU 2p or a priority-not-set DU 2n (S2022).

When the DU 2 that made the speech request is a priority-set DU 2p ("Yes" in S2022), the control portion 16 of the CU 1 assigns a predetermined audio slot and audio region to the priority-set DU 2p (S2023).

When the DU 2 that made the speech request is a priority-not-set DU 2n ("No" in S2022), the control portion 16 of the CU 1 puts the priority-not-set DU 2n on the speech request list (S2024). The speech request list is, for example, a table in which the DUs 2 that made a speech request are listed in the order of request.

A priority-not-set DU 2n listed in the speech request list is put in the request waiting state until one of either permission or rejection of the speech request is selected. Permission or rejection of the speech request selected, for example, by operation of the operating station 4 by the chairman, etc.

When permission of the speech request is selected ("Yes" in S2025), the control portion 16 of the CU 1 forcibly assigns an audio slot and an audio region to the priority-not-set DU 2n in accordance with the setting content of either FIFO or LIFO (S2026). At this point, the control portion 16 of the CU 1 deletes the priority-not-set DU 2n, of which the speech request was permitted, from the speech request list (S2027).

When the speech request is rejected ("No" in S2025), the control portion 16 of the CU 1 deletes the priority-not-set DU 2n from the speech request list (S2028).

When the Conference Mode is "Full Remote Mode"

As described above, in the full remote mode, the mic on trigger of a priority-not-set DU 2n is not set to any setting (is off). That is, a priority-not-set DU 2n cannot make a speech request. The mic on trigger of a priority-set DU 2p is set in advance to one of either the automatic mode or the manual mode.

Figure 44:
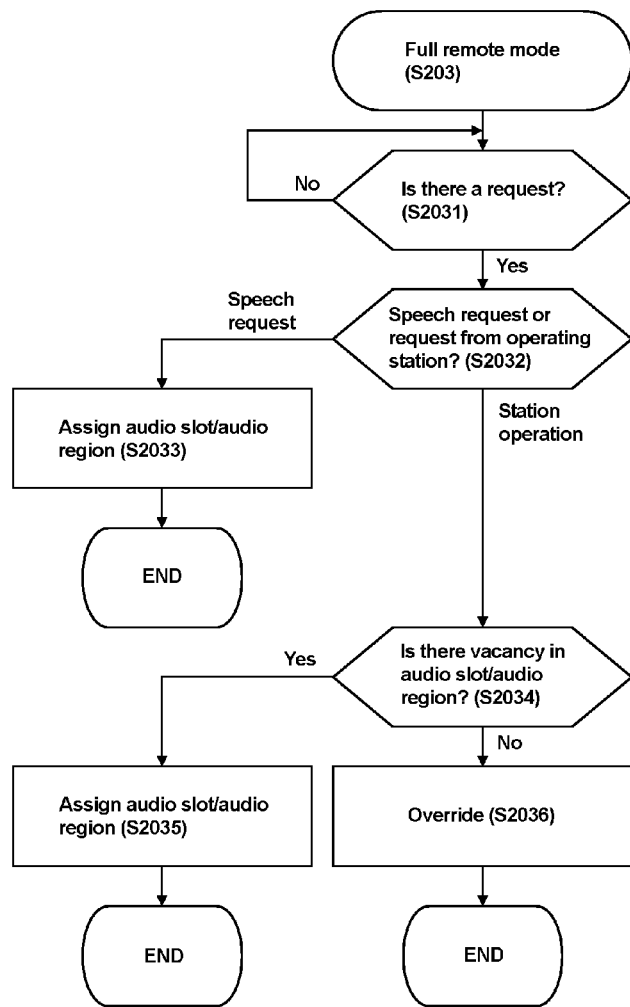
FIG. 44 is a flowchart of information processing by the control unit in a full remote mode among the conference modes of FIG. 41.

FIG. 44 is a flowchart of information processing by the CU 1 in the full remote mode.

First, the control portion 16 of the CU 1 waits for a request that is either a speech request from a DU 2 or a request from the operating station 4 ("No" in S2031). When there is a request ("Yes" in S2031), the control portion 16 of the CU 1 checks whether the request is a speech request from a DU 2 or a request from the operating station 4 (S2032). As mentioned above, a speech request is only made by a priority-set DU 2p. A request from the operating station 4 is made for a priority-not-set DU 2n.

When the request is a speech request ("Speech request" in S2032), the control portion 16 of the CU 1 assigns a predetermined audio slot and audio region to the priority-set DU 2p that made the speech request (S2033).

When the request is a request from the operating station 4 ("Station operation" in S2032), the control portion 16 of the CU 1 checks for a vacancy in audio slot and audio region (S2034).

When there is a vacancy in audio slot and audio region ("Yes" in S2034), the control portion 16 of the CU 1 assigns the vacant audio slot and audio region to the priority-not-set DU 2n, for which speech is requested by the operating station 4 (S2035).

When there is no vacancy in audio slot and audio region ("No" in S2034), the control portion 16 of the CU 1 forcibly assigns an audio slot and an audio region to the priority-not-set DU 2n in accordance with the setting content of either FIFO or LIFO (S2036).

Summary of the Conference Modes

The conference system S thus includes a plurality of conference modes, which are selectable and in which the setting contents of the mic on trigger mode and the override mode are combined. Therefore, for example, when a person, who is an employee in a general affairs department, etc., and performs preparation of operation setting of the conference system S immediately before the start of a conference, can suitably select the optimal conference mode from among the plurality of conference modes and thereby readily perform preparation of the operation setting of the conference system S.

Input Screens of the Operating Station

The various control information for controlling the operations of the conference system S is input, for example, via input screens displayed on the display portion 44 of the operating station 4 and stored in the storage portion 13 of the CU 1. The input screens are screens used by the system administrator, etc., in inputting and changing the control information. That is, for example, the input screens are screens for inputting settings of the CU 1 and the DUs 2. As mentioned above, the control information includes, for example, information related to system settings of the conference system S, information related to the priority, the speech request list, etc. The control portion 46 of the operating station 4 reads control information corresponding to each input screen from the storage portion 13 of the CU 1 and makes the information be displayed on the display portion 44.

The input screens include, for example, a conference system initial setting screen (referred to hereinafter as "initial screen"), a conference preparation screen (referred to hereinafter as "preparation screen"), and a conference progress screen (referred to hereinafter as "progress screen"). One of the input screens is selected by the control portion 46 of the operating station 4 based on predetermined conditions to be described below. That is, for example, the control portion 46 judges whether or not the predetermined conditions are met and, based on the judgment result, selects the input screen to be displayed on the display portion 44 from among the initial screen, the preparation screen, and the progress screen. The predetermined conditions are, for example, states of physical/communicational connection between the CU 1 and the DUs 2 (whether or not there is connection, etc.), completion of setting of a specific item, occurrence of an abnormality in the connection state of the DUs 2, connection state of a specific DU (for example, an interpreter unit, etc.), etc. That is, for example, the control portion 46 selects the input screen to be displayed on the display portion 44 based on a result of judging whether or not specific control information, among the plurality of control information, is stored in the storage portion 13 of the CU 1, a result of judging whether or not a DU 2 is connected to the unit connection portion 12*b*, a result of judging whether or not a specific DU 2, among a plurality of DUs 2, is connected to the unit connection portion 12*b*, a result of judging whether or not a connection abnormality of the DUs 2 connected to the unit connection portion 12*b* is occurring, etc.

Figure 45:
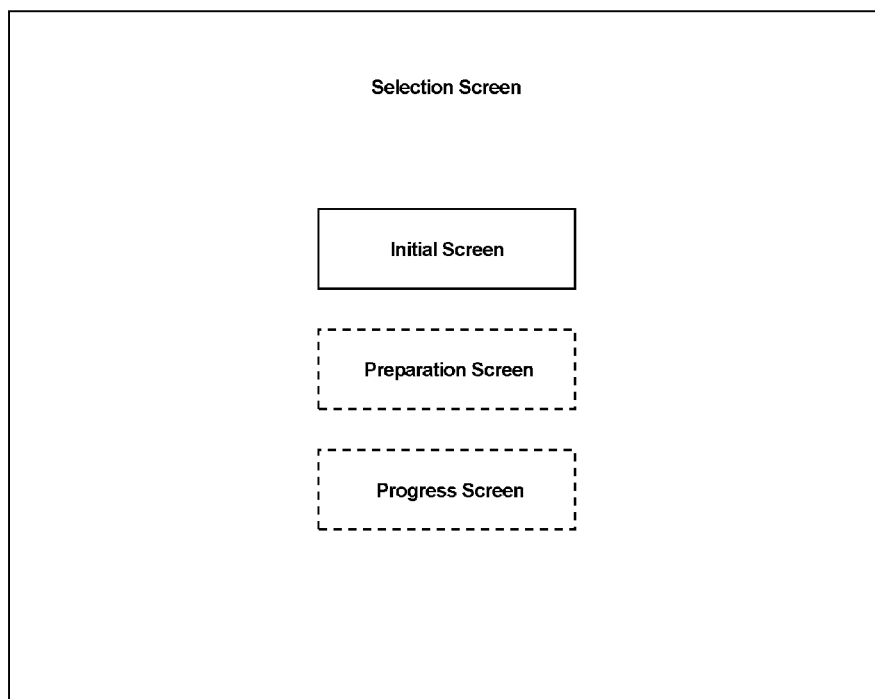
FIG. 45 is a schematic diagram of a selection screen for input screens that is displayed on a display portion of the operating station included in the conference system of FIG. 1.

FIG. 45 is a schematic diagram of a selection screen for input screens that is displayed on the display portion 44 of the operating station 4 included in the conference system S.

In the figure, an item that can be selected is indicated by solid lines and an item that cannot be selected is indicated by broken lines.

When the conference system S is started, the selection screen is displayed on the display portion 44 of the operating station 4. The selection screen is, for example, a screen by which a system administrator or a person performing preparation of the operation setting of the conference system S, etc., performs selection of a screen from among the initial screen, the preparation screen, and the progress screen.

The input screens that are displayed as being selectable in the selection screen change, for example, in accordance with the communication state of the CU 1 and the DUs 2. That is, for example, when the CU 1 and the DUs 2 are communication-disabled, only the initial screen is selectable among the input screens displayed in the selection screen. That the CU 1 and the DUs 2 are communication-disabled refers, for example, to a state where the DUs 2 are not connected to the CU 1, etc. When the CU 1 and the DUs 2 are communication-enabled, the preparation screen and the progress screen are selectable among the input screens displayed in the selection screen. That the CU 1 and the DUs 2 are communication-enabled refers, for example, to a state where the DUs 2 are connected to the CU 1, etc. The input screens that are displayed as being selectable in the selection screen are determined by the control portion 46 of the operating station 4. By the selectable input screens thus changing in accordance with predetermined conditions, selection of an input screen by a person performing input of information is made easy and erroneous operations and erroneous inputs such that the set contents become inconsistent with each other, etc., are reduced because various settings based on the predetermined conditions can be performed.

With the selection screen in the present embodiment, the selectable input screens may change, for example, in accordance with authentication information input in a login screen, etc.

Also, the selection screen may display a screen, for example, in which information related to the priority setting is input when the CU 1 and a plurality of DUs 2 are communication-enabled.

Further, the selection screen may display a screen, for example, in which communication information is input in the initial screen when the CU 1 and a plurality of DUs 2 are communication-disabled.

Yet further, the selection screen may be of mode where, when a DU corresponding to a specific application, such as an interpreter unit, etc., is connected to the CU 1, a screen is displayed in which information related to settings corresponding to the specific application are input.

Yet further, the input screens selectable in the selection screen are not restricted to those of the present embodiment. That is, for example, the input screens selectable in the selection screen may include other input screens, such as a maintenance screen, etc.

Initial Screen

Figure 46:
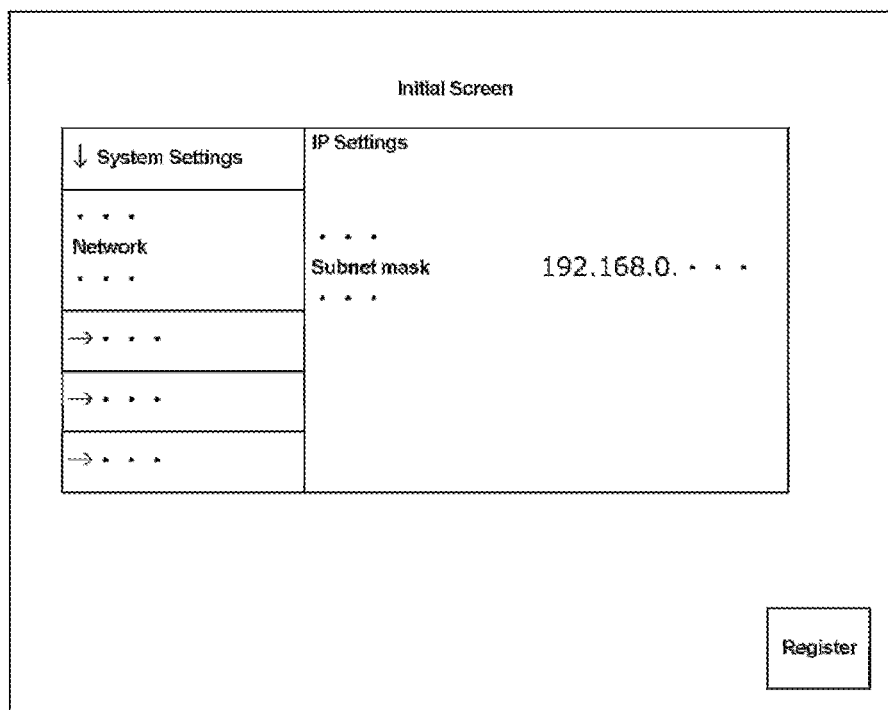
FIG. 46 is a schematic diagram of an initial screen, which is an example of an input screen of FIG. 45.

FIG. 46 is a schematic diagram of the initial screen.

The initial screen is a screen by which, for example, the system administrator inputs/changes settings of the conference system S. The information displayed in the initial screen is information related to system settings of the conference system S, for example, information for initial setting of the conference system S, such as communication information, such as a subnet mask, etc., used by the CU 1 to specify DUs 2 (used for the CU 1 and the DUs 2 to communicate), information related to firmware, terminal setting information of the CU 1, etc.

By completion of input of the information in the initial screen, the CU 1 and the DUs 2 become communication-enabled. By completion of input of the information in the initial screen, the preparation screen and the progress screen become selectable in the selection screen.

Preparation Screen

Figure 47:
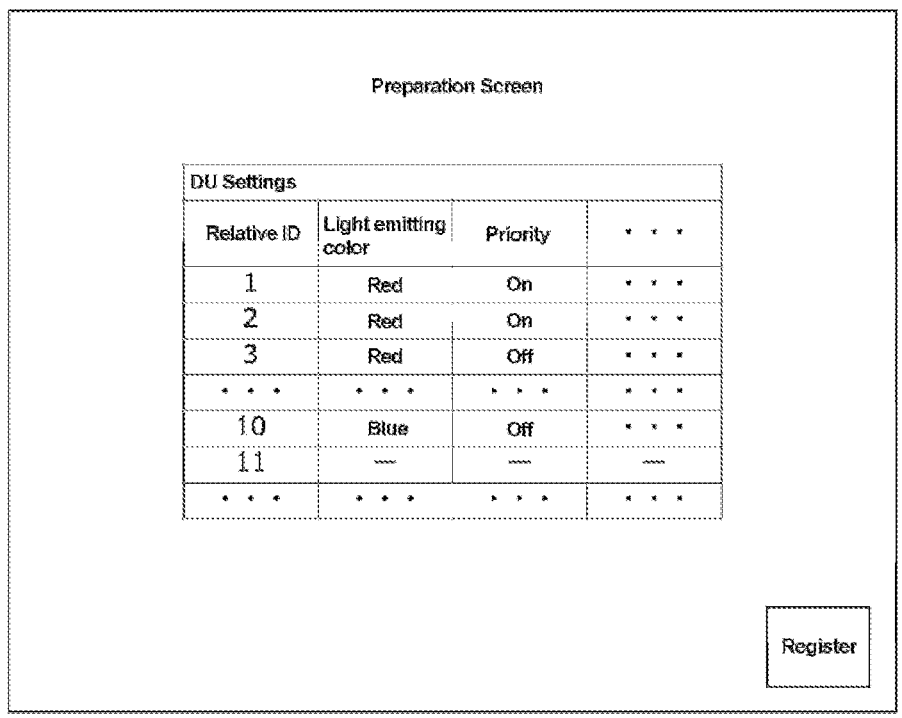
FIG. 47 is a schematic diagram of a preparation screen, which is another example of an input screen of FIG. 45.

FIG. 47 is a schematic diagram of the preparation screen.

The preparation screen is a screen by which, for example, a person performing preparation of the operation setting of the conference system S inputs settings of the respective DUs 2. The information displayed in the preparation screen is the unit setting information of the respective DUs 2, for example, information related to priority settings, information related to mic on trigger settings, the light emitting colors of the light emitting portions 28 of the DUs 2 and other notification information, etc. The information is displayed in the preparation screen, for example, in association with the relative IDs of the DUs 2.

The unit setting information displayed in the preparation screen, for example, the unit setting information of DUs 2 connected to the CU 1 in the past is information stored in the unit setting information DB. On the other hand, the unit setting information of DUs 2 that are newly connected to the CU 1 includes settings (initial values) of the DUs 2 at the time of shipment as described above.

FIG. 48 is a schematic diagram of the preparation screen after input of information.

In the figure, information newly input from the preparation screen shown in FIG. 47 is indicated by underlining.

Progress Screen

FIG. 49 is a schematic diagram of the progress screen.

The progress screen is a screen by which, for example, a person overseeing the progress of a conference, such as the chairman, etc., inputs information for controlling the operations of the respective DUs 2. The information displayed in the progress screen is information related to the control of the respective DUs 2, for example, information related to the speech request list and the conference mode, etc.

The progress screen is used by the chairman, etc., for example, when the above-described conference mode of request talk mode or full remote mode is selected. For example, the operating station 4 displays the speech request list in the progress screen to enable the chairman to select between permitting and rejecting a speech request in the progress screen.

Summary of the Input Screen

Thus, with the conference system S, one input screen is selected by the control portion 46 of the operating station 4 based on predetermined conditions. Therefore, the conference system S avoids mutual inconsistency of the input setting contents. That is, the conference system according to the present embodiment realizes reliable setting work with a simple configuration.

The respective input screens in the present information may differ in GUI (Graphic User Interface) display mode in accordance with the items displayed on the screens. That is, for example, the conference system S may display the initial screen in an accordion form, the preparation screen in a wizard form, and the progress screen in a tab form.

Also, the respective input screens in the present invention may differ in the items displayed on the display portion 44 in accordance with the rights of the person operating the operating station 4. Consequently, input or change of information that is in disagreement with the rights of the person operating the operating station 4 is prevented.

Summary

In the conference system S according to the embodiment described above, the conference system S periodically transmits packets, each including a counter flag, from the CU 1 to the DUs 2 to renew the information stored in the database associating the relative IDs and the absolute IDs. With the conference system S, even if a connection abnormality occurs in a DU 2 and a change in relative ID occurs, the association of the relative IDs and the absolute IDs is renewed and therefore discrepancy of information, such as the audio information, etc., before and after the change of connection state of the DUs 2 does not occur. That is, the conference system according to the present invention is capable of reliably managing the connection state of the CU and the DUs 2 and continuously acquiring information from the DUs when a connection abnormality occurs.

Also, in the conference system according to the embodiment described above, when connection or disconnection of CUs 1 to or from each other occurs, the conference system S automatically changes the priority settings. Therefore, with the conference system according to the present invention, the inconsistent state described above does not occur. Also, the conference system according to the present invention makes it unnecessary for the system administrator to perform the setting of the priority in accordance with the connection state of CUs to each other. The conference system according to the present invention thus lightens the load of priority resetting by the system administrator.

Further, in the conference system according to the embodiment described above, the conference system S fetches speech requests from the DUs 2 by periodic processing of the request flag and makes the CU 1 transmit commands in accordance with the vacancy of audio slot and audio region. That is, the conference system S does not transmit a command from a DU 2 to the CU 1 on each speech request. Therefore, with the conference system according to the present invention, an excessive information processing load is not received even when speech requests are made from a plurality of DUs 2 at once. Consequently, the conference system S according to the present invention does not require a high processing ability in comparison to a system where a DU receives a command from a CU on each speech request.

Yet further, in the conference system according to the embodiment described above, a DU 2 that makes a speech request is automatically put in the request waiting state if there is no vacancy in audio slot and audio region. The conference system according to the present invention is thus not required to answer all speech requests by software and the information processing load in terms of software is lightened.

Yet further, in the conference system according to the embodiment described above, the conference system S has one input screen selected by the control portion 46 of the operating station 4 based on predetermined conditions. Therefore, the conference system according to the present invention is capable of avoiding mutual inconsistency of the setting contents set by a person performing input of information. That is, the conference system according to the present invention realizes reliable setting work with a simple configuration.

Yet further, in the conference system according to the embodiment described above, the conference system S makes a conference mode, which is associated with the override and the mic on trigger, be selected to set the assignment mode of audio slot and audio region for each DU 2 and the request flag addition mode. Therefore, for example, even a person, who is not a person having expert knowledge, such as an operator, etc., can suitably select, from among the plurality of conference modes, the conference mode, which is optimal in terms of the conference contents, constitution of participants, etc., and thereby readily perform preparation of the operation setting of the conference system S. That is, the conference system according to the present invention is excellent in convenience of setting work.

Summary of the Conference System According to the Present Invention

Features of the conference system according to the present invention described above are summarized below.

(Feature 1)

A conference system comprising:
a control unit (CU 1); and
a discussion unit (DU 2), wherein
the discussion unit is connected via a communication line to the control unit,
the control unit repeatedly transmits and receives a running packet to and from the discussion unit,
the running packet includes a counter flag,
the control unit includes a CU communication portion (communication portion 11),
a CU storage portion (storage portion 13), and
a CU control portion (control portion 16),
the discussion unit includes
a DU control portion (control portion 26) and
a DU communication portion (communication portion 21),
the CU control portion resets a count value of the counter flag included in the running packet transmitted to the discussion unit,
the CU communication portion transmits the running packet to the discussion unit,
the DU control portion increments the count value of the counter flag,
the DU communication portion transmits the running packet, which includes the counter flag with the incremented count value, to the control unit,
the CU storage portion stores the count value of the counter flag included in the running packet received by the control unit from the discussion unit, and
each time the control unit receives the running packet from the discussion unit, the CU control portion compares the count value stored in the CU storage portion and the count value of the counter flag included in the running packet received by the control unit from the discussion unit.

(Feature 2)

The conference system according to feature 1, where, when the count value stored in the CU storage portion and the count value of the counter flag included in the running packet received by the control unit from the discussion unit are mismatched, the CU control portion renews the count value stored in the CU storage portion with the count value of the counter flag included in the running packet.

(Feature 3)

The conference system according to feature 1, where the control unit is connected to a plurality of the discussion units,
the CU storage portion stores, in association,
a relative ID of each discussion unit that is numbered based on the count value of the counter flag included in the running packet received by the control unit from the discussion units, and
an absolute ID of each discussion unit, and,
when the count value stored in the CU storage portion and the count value of the counter flag included in the running packet received by the control unit from the discussion units are mismatched, the CU control portion renews the association of the relative IDs and the absolute IDs.

(Feature 4)

The conference system according to feature 3, where the control unit includes
a CU connection portion (unit connection portion 12b) and
the discussion units are connected to the CU connection portion.

(Feature 5)

The conference system according to feature 4, where the CU connection portion includes a plurality of connection terminals.

(Feature 6)

The conference system according to feature 5, where, each time the control unit receives the running packet from the discussion units, the CU control portion compares a transmission connection terminal, which, among the plurality of connection terminals, transmitted the running packet from the control unit to the discussion units, and a reception connection terminal, which, among the plurality of connection terminals, is the terminal by which the control unit received the running packet from the discussion units, to judge a connection mode of the control unit and the discussion units.

(Feature 7)

The conference system according to feature 6, where the CU control portion
judges the connection mode to be a daisy chain connection mode when the transmission connection terminal and the reception connection terminal are matched, and
judges the connection mode to be a ring connection mode when the transmission connection terminal and the reception connection terminal are not matched, and
the judged connection mode is stored in the CU storage portion in association with the absolute IDs of the discussion units.

(Feature 8)

The conference system according to feature 7, where, when the connection mode stored in the CU storage portion and the judged connection mode differ, the CU control portion renews the connection mode stored in the CU storage portion with the judged connection mode.

(Feature 9)

The conference system according to feature 2, where the control unit is connected to a plurality of the discussion units,
the CU storage portion stores, in association,
a relative ID of each discussion unit that is numbered based on the count value of the counter flag included in the running packet received by the control unit from the discussion units, and
an absolute ID of each discussion unit,
the CU communication portion transmits a setting packet, carrying a unit setting command, to perform setting of the discussion units, to the discussion units, and
the setting packet has the absolute IDs of the discussion units as the transmission destinations of the setting packet.

The invention claimed is:

1. A conference system comprising:
a control unit; and
a plurality of discussion units, wherein
the plurality of discussion units are connected by a ring connection to the control unit,
the control unit repeatedly transmits and receives a running packet to and from the plurality of discussion units,
the running packet includes a counter flag,
the plurality of discussion units includes:
a first discussion unit that receives the running packet from the control unit, and
a second discussion unit that transmit the running packet to the control unit,
the control unit comprises:
a CU communication portion,
a CU storage portion, and
a CU control portion,
the first discussion unit comprises:
a first DU control portion, and
a first DU communication portion,
the second discussion unit comprises:
a second DU control portion, and
a second DU communication portion,
the CU control portion resets a count value of the counter flag included in the running packet before the running packet is transmitted to the first discussion unit, the CU communication portion transmits the running packet with the reset count value to the first discussion unit, the first DU control portion increments the count value of the counter flag, the first DU communication portion transmits the running packet, which includes the counter flag with the incremented count value, to a discussion unit connected to the first discussion unit, among the plurality of discussion units, the second DU control portion increments the count value of the counter flag received from a discussion unit connected to the second discussion unit, among the plurality of discussion units, the second DU communication portion transmits the running packet, which includes the counter flag with the incremented count value, to the control unit, the CU storage portion stores the incremented count value of the counter flag included in the running packet, and each time the control unit receives the running packet, the CU control portion compares the count value stored in the CU storage portion and the incremented count value of the counter flag included in the running packet.

2. The conference system according to claim 1, wherein, when the count value stored in the CU storage portion and the incremented count value of the counter flag included in the running packet are mismatched, the CU control portion renews the count value stored in the CU storage portion with the incremented count value of the counter flag included in the running packet.

3. The conference system according to claim 1, wherein the CU storage portion stores, in association,
a relative ID of each discussion unit that is numbered based on the incremented count value of the counter flag included in the running packet, and
an absolute ID of each discussion unit, and,
when the count value stored in the CU storage portion and the incremented count value of the counter flag included in the running packet are mismatched, the CU control portion renews the association of the relative IDs and the absolute IDs.

4. The conference system according to claim 3, wherein the control unit comprises:
a CU connection portion, and
the first discussion unit and the second discussion unit are connected to the CU connection portion.

5. The conference system according to claim 4, wherein the CU connection portion includes a plurality of connection terminals.

6. The conference system according to claim 5, wherein, each time the control unit receives the running packet, the CU control portion compares a transmission connection terminal, which, among the plurality of connection terminals, transmitted the running packet, and a reception connection terminal, which, among the plurality of connection terminals, received the running packet, to judge a connection mode of the control unit and the discussion units.

7. The conference system according to claim 6, wherein
when a discussion unit, among the plurality of discussion units, undergoes a connection abnormality, the first DU communication portion transmits the running packet, which includes the counter flag with the incremented count value, to the control unit,
the CU control portion
judges the connection mode to be a daisy chain connection mode when the transmission connection terminal and the reception connection terminal are matched, and
judges the connection mode to be a ring connection mode when the transmission connection terminal and the reception connection terminal are not matched, and
the judged connection mode is stored in the CU storage portion in association with the absolute IDs of the discussion units.

8. The conference system according to claim 7, wherein, when the connection mode stored in the CU storage portion and the judged connection mode differ, the CU control portion renews the connection mode stored in the CU storage portion with the judged connection mode.

9. The conference system according to claim 2, wherein the CU storage portion stores, in association,
a relative ID of each discussion unit that is numbered based on the incremented count value of the counter flag included in the running packet, and
an absolute ID of each discussion unit,
the CU communication portion transmits a setting packet, carrying a unit setting command, to perform setting of the discussion units, to the discussion units, and
the setting packet includes the absolute IDs of the discussion units as the transmission destinations of the setting packet.

* * * * *